United States Patent
Joao

(10) Patent No.: US 12,333,500 B2
(45) Date of Patent: Jun. 17, 2025

(54) DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, APPARATUS AND METHOD

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 101 days.

(21) Appl. No.: 17/218,202

(22) Filed: Mar. 31, 2021

(65) Prior Publication Data

US 2021/0357870 A1 Nov. 18, 2021

Related U.S. Application Data

(60) Provisional application No. 63/026,005, filed on May 16, 2020.

(51) Int. Cl.
*G06Q 10/1053* (2023.01)
*G06F 16/21* (2019.01)
(Continued)

(52) U.S. Cl.
CPC ....... *G06Q 10/1053* (2013.01); *G06F 16/219* (2019.01); *G06Q 10/103* (2013.01); *G06Q 10/1093* (2013.01); *H04N 7/15* (2013.01)

(58) Field of Classification Search
CPC ........... G06Q 50/184; G06Q 10/06315; G06Q 10/1053
See application file for complete search history.

(56) References Cited

U.S. PATENT DOCUMENTS 6,662,194 B1 12/2003 Joao
7,490,086 B2 2/2009 Joao
(Continued)

FOREIGN PATENT DOCUMENTS

WO WO-2019244129 A2 * 12/2019 ......... G06F 21/6245

OTHER PUBLICATIONS

Badra; Aziz, System and Method for Efficient Retention of Temporary Services (U.S. Appl. No. 62/935,959), Nov. 15, 2019 (Year: 2019).*

(Continued)

*Primary Examiner* — Andrew Chase Lakhani
*Assistant Examiner* — Karma A El-Chanti
(74) *Attorney, Agent, or Firm* — Raymond A. Joao, Esq.

(57) ABSTRACT

An apparatus, including a central processing computer which is specially programmed to process recruitment, job searching, project searching, or scheduling, information; and a distributed ledger and blockchain technology system. The central processing computer provides or transmits an electronic forum to a user communication device, wherein the central processing computer receives, from a user communication device, information for engaging in a recruitment, job searching, project searching, or scheduling, activity, in or via the electronic forum, and the central processing computer provides a videoconference call between the individual and an employer or hiring entity or between the individual and a job applicant. Upon a conclusion of the electronic forum, the central processing computer generates an electronic forum report containing information regarding an activity or activities of the individual in or during the electronic forum. The electronic forum report is stored in the distributed ledger and blockchain technology system.

25 Claims, 14 Drawing Sheets

(51) Int. Cl.
*G06Q 10/10* (2023.01)
*G06Q 10/1093* (2023.01)
*H04N 7/15* (2006.01)

(56) References Cited

U.S. PATENT DOCUMENTS

| | | | |
|---|---|---|---|
| 9,152,943 B2 | 10/2015 | Joao | |
| 9,760,864 B2 | 9/2017 | Joao | |
| 10,096,000 B2 | 10/2018 | Joao | |
| 10,693,872 B1* | 6/2020 | Larson | H04L 9/3231 |
| 10,713,737 B1 | 7/2020 | Blackburn et al. | |
| 10,726,470 B1* | 7/2020 | Traina | G06Q 30/0633 |
| 10,990,928 B1* | 4/2021 | Wong | G06N 5/022 |
| 2002/0029163 A1 | 3/2002 | Joao | |
| 2003/0033161 A1* | 2/2003 | Walker | G06Q 10/10 |
| | | | 705/1.1 |
| 2003/0110215 A1 | 6/2003 | Joao | |
| 2003/0149588 A1 | 8/2003 | Joao | |
| 2003/0182171 A1* | 9/2003 | Vianello | G06Q 10/063112 |
| | | | 705/7.14 |
| 2003/0229510 A1* | 12/2003 | Kerr | G06Q 10/10 |
| | | | 705/321 |
| 2007/0043608 A1 | 2/2007 | May et al. | |
| 2008/0133245 A1* | 6/2008 | Proulx | G06F 40/55 |
| | | | 704/277 |
| 2011/0231329 A1* | 9/2011 | Vianello | G06Q 10/1053 |
| | | | 705/321 |
| 2012/0123958 A1* | 5/2012 | Wahls | G06Q 10/1053 |
| | | | 705/321 |
| 2013/0097093 A1* | 4/2013 | Kolber | G06Q 10/1053 |
| | | | 705/321 |
| 2013/0332377 A1 | 12/2013 | Joao | |
| 2013/0332384 A1 | 12/2013 | Joao | |
| 2014/0006064 A1 | 1/2014 | Joao | |
| 2014/0081667 A1 | 3/2014 | Joao | |
| 2014/0122152 A1* | 5/2014 | Lee | G06Q 10/1053 |
| | | | 705/7.19 |
| 2014/0368601 A1 | 12/2014 | Decharms | |
| 2015/0193895 A1 | 7/2015 | Joao | |
| 2015/0302436 A1* | 10/2015 | Reynolds | G06Q 10/06 |
| | | | 705/7.32 |
| 2016/0028736 A1* | 1/2016 | Gehring | H04W 12/08 |
| | | | 726/4 |
| 2016/0034851 A1* | 2/2016 | Xiao | G06Q 10/1053 |
| | | | 348/14.02 |
| 2016/0042651 A1 | 2/2016 | Joao | |
| 2017/0039523 A1* | 2/2017 | Rotimi | G06Q 10/1053 |
| 2017/0041296 A1 | 2/2017 | Ford et al. | |
| 2017/0116870 A1* | 4/2017 | Brem | G09B 5/04 |
| 2018/0232828 A1* | 8/2018 | Joao | H04L 9/0637 |
| 2018/0330385 A1* | 11/2018 | Johnson | G06Q 30/018 |
| 2019/0019160 A1* | 1/2019 | Champaneria | G06N 5/04 |
| 2019/0020696 A1* | 1/2019 | Winawer | H04L 51/046 |
| 2019/0096534 A1 | 3/2019 | Joao | |
| 2019/0108493 A1 | 4/2019 | Nelson et al. | |
| 2019/0114593 A1 | 4/2019 | Champaneria | |
| 2019/0171653 A1* | 6/2019 | Balderson Junod | |
| | | | G06F 16/3326 |
| 2019/0272504 A1* | 9/2019 | Pande | G06Q 10/10 |
| 2020/0143329 A1* | 5/2020 | Gamaliel | H04N 21/45455 |
| 2020/0151928 A1* | 5/2020 | Hawker | G06T 1/0021 |
| 2020/0176095 A1 | 6/2020 | Ansari et al. | |
| 2020/0184583 A1 | 6/2020 | Richards et al. | |
| 2020/0242561 A1* | 7/2020 | Kulkarni | G06F 9/451 |
| 2021/0150447 A1* | 5/2021 | Badra | G06Q 10/063112 |
| 2021/0165973 A1* | 6/2021 | Kofman | G06F 40/30 |
| 2021/0256478 A1* | 8/2021 | Hood | G06Q 10/1053 |
| 2021/0383489 A1 | 12/2021 | Hutchinson | |
| 2022/0028017 A1* | 1/2022 | Joao | G06Q 50/184 |
| 2022/0051503 A1 | 2/2022 | Joao | |

OTHER PUBLICATIONS

Sedgwick, M., & Spiers, J. The Use of Videoconferencing as a Medium for the Qualitative Interview. 2009. International Journal of Qualitative Methods, 8(1), 1-11. (Year: 2009).*
Office Action, mailed May 17, 2024, U.S. Appl. No. 17/861,511.
Office Action, mailed Sep. 22, 2023, U.S. Appl. No. 17/693,321.
Office Action, mailed May 2, 2023, U.S. Appl. No. 17/693,321.
Office Action, mailed Mar. 26, 2024, U.S. Appl. No. 17/498,804.
Office Action, mailed Nov. 17, 2023, U.S. Appl. No. 17/498,804.
Office Action, mailed Jul. 12, 2023, U.S. Appl. No. 17/498,804.
Office Action, mailed Jan. 18, 2023, U.S. Appl. No. 17/498,804.
U.S. Appl. No. 62/935,959, Badra.
Office Action, mailed Aug. 26, 2024, U.S. Appl. No. 17/861,511.

* cited by examiner

DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, APPARATUS AND METHOD

RELATED APPLICATIONS

This application claims the benefit of the priority of U.S. Provisional Patent Application Ser. No. 63/026,005, filed May 16, 2020, and entitled "DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, APPARATUS AND METHOD", the subject matter and teachings of which are hereby incorporated by reference herein in their entirety.

FIELD OF THE INVENTION

The present invention pertains to a distributed ledger and blockchain technology-based recruitment, job searching and/or project searching, scheduling, and/or asset tracking and/or monitoring, apparatus and method and, in particular, the present invention pertains to a distributed ledger and blockchain technology-based recruitment, job searching and/or project searching, scheduling, and/or asset tracking and/or monitoring, apparatus and method which can provide for enhanced transparency and/or security for, in, or regarding, various recruitment activities, job searching and/or project searching activities, and/or scheduling activities, and/or which can provide for the tracking, monitoring, and/or authentication, of assets, digital or otherwise.

BACKGROUND OF THE INVENTION

There can be no doubt that individuals, independent contractors, and/or freelancers, can expend great efforts, and a great deal of time, in searching for, and in securing permanent, temporary, or other, jobs or other employment relationships, contract work opportunities and/or independent contracting opportunities, and/or work and/or freelance projects, opportunities, or assignments. These individuals, independent contractors, and/or freelancers, have been known to turn to employment agencies, recruiters, on-line recruitment websites, company websites, and/or other individuals, websites, or entities, in seeking and/or in applying for work, a job, an independent contractor project, a freelance project or assignment, or any other employment or work-related relationship or situation.

Employers and/or hiring entities, of any and/or all types or kinds, also need or require a satisfactory workforce in order to meet the demands of doing business. In this regard, employers and/or hiring entities very often need to find and/or recruit new employees, replace former employees, find employees with new skills to meet their business needs, and/or obtain the services of temporary workers, independent contractors, and/or freelancers. These employers or hiring entities have also been known to employment agencies, recruiters, on-line recruitment websites, and/or other individuals, websites, or entities, in order to attempt to meet their needs.

While the use of on-line recruitment websites and/or on-line job searching websites might appear to be best equipped to allow individuals, independent contractors, and/or freelancers, to find or to locate job, project, or other work, opportunities, with employers or hiring entities, and vice versa, these on-line recruitment websites and/or on-line job searching websites do not appear to yield positive results in many instances. For example, it is not uncommon for individuals to expend a great amount of time and effort in searching for, in identifying, and/or in applying for, a job or work opportunity with an employer or hiring entity, only to never hear back, one way or another, from that employer or hiring entity. Such efforts typically entail time consuming efforts in submitting a resume and/or in filling out a job application. The same holds true for those individuals who apply for a job or position directly on an employer's website. Notwithstanding the time involved in job or project applicants filling out a sometimes lengthy job or employment application, in many instances, these job or project applicants never hear back from, or receive any substantive feedback from, those employers or hiring entities to whom they have submitted an application.

There can be no doubt that the above-described on-line recruitment websites and/or on-line job searching websites, of the various and/or respective on-line recruitment companies or employers or hiring entities, lack the needed and/or desired transparency and accountability to those numerous individuals, independent contractors, and/or freelancers, who seek to secure permanent, temporary, or other, jobs or other employment relationships, contract work opportunities and/or independent contracting opportunities, and/or work and/or freelance projects, opportunities, or assignments.

It is submitted that the herein-described individuals, independent contractors, and/or freelancers, and the herein-described employers and/or hiring entities would be much better served by a system which overcomes the shortcomings of the herein-described prior art systems.

SUMMARY OF THE INVENTION

The present invention pertains to a distributed ledger and blockchain technology-based recruitment, job searching and/or project searching, scheduling, and/or asset tracking and/or monitoring, apparatus and method and, in particular, the present invention pertains to a distributed ledger and blockchain technology-based recruitment, job searching and/or project searching, scheduling, and/or asset tracking and/or monitoring, apparatus and method which can provide for enhanced transparency and/or security for, in, or regarding, various recruitment activities, job searching and/or project searching activities, and/or scheduling activities, and/or which can provide for the tracking, monitoring, and/or authentication, of assets, digital or otherwise, which overcomes the shortcomings of the prior art.

The present invention can be utilized in numerous types and/or kinds of recruitment applications, on-line recruitment or on-line recruiting applications, on-line job searching applications, on-line scheduling applications, and/or in numerous applications involving or relating to the tracking, monitoring, and/or authentication of, assets, digital or otherwise, and/or consideration of all types or kinds.

The present invention can be utilized by an individual, an independent contractor, or a freelancer, to find and apply for a job, project, or assignment, of any kind or type, and allow the respective individual, independent contractor, or freelancer, to be kept appraised as to when and how his or her application is being, or has been, considered by an employer or hiring entity as well as the status of, or a decision, regarding the same.

The present invention can also be utilized by an employer or hiring entity to reach out to an individual, an independent contractor, or a freelancer, regarding a request for a proposal ("RFP"), request for bid ("RFB"), or an offer of employment or an offer to perform a job, project, or assignment, and to be kept appraised as to when and how his, her, or its, respective request or offer is being, or has been, considered by the individual, independent contractor, or freelancer, as well as the status of, or a decision, regarding the same.

The present invention can be utilized by an individual, an independent contractor, or a freelancer, to schedule an appointment with an employer or hiring entity, or can be utilized by an employer or hiring entity to schedule an appointment with any individual, independent contractor, freelancer, athlete, former athlete, celebrity, or any other person.

The present invention can also be utilized by any individual, independent contractor, or freelancer, described herein, or can be utilized by any employer or hiring entity, in order to track, monitor, and/or authenticate, any type or kind of asset(s), digital asset(s), and/or consideration or digital consideration, which be exchanged between, or which might otherwise be transferred between, or exchanged between, any of the users of the present invention.

The present invention can be utilized in connection with a distributed ledger and blockchain technology system to provide a secured record keeping system of and for any other information and/or data processed and/or stored by the present invention in any and/or all of the embodiments described herein or otherwise.

The apparatus of the present invention includes a central processing computer and distributed ledger and Blockchain technology system (hereinafter referred to as "central processing computer/distributed ledger/Blockchain technology system"). The central processing computer/distributed ledger/Blockchain technology system can include a central processing computer or central processing computer system and a distributed ledger and Blockchain technology system. The central processing computer can be any computer or computer system or can be any server computer or any computer or computer system which can be used in a communication network. Any number of central processing computers can be utilized in conjunction with, or in connection, with the present invention.

The central processing computer can provide control over the apparatus and can perform any of the various processing services and/or functions described herein as being performed by the present invention. The central processing computer may be a single computer or system of computers and/or may include a plurality of computers or computer systems which are utilized in conjunction with one another. The central processing computer can also provide services for any of the other communications devices and/or computers and/or computer systems described herein as being associated with any of the users, individuals, persons, or entities, who or which utilize the present invention.

The apparatus also includes a user communication device or computer (hereinafter referred to as "user communication device") which is associated with, or which can be used by, any one or more of any of the herein-described users, individuals, persons, or entities, who or which utilize the present invention.

Any number of user communication devices can be utilized by, or can be associated with, each of the users, individuals, persons, or entities, who or which utilize the present invention. The user communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any user, individual, person, or entity, who or which utilizes the present invention. The user communication device can also be a server computer, a mainframe computer, a mini-computer, a microcomputer, or any other computer or device for suiting the needs of the particular user. The user communication device can also be any device or computer, or a kiosk, that can be located at public places or locations or which can also be publicly available. Any number of user communication devices can be utilized in conjunction with, or in connection with, the present invention.

The user communication device(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes an employer or hiring entity communication device or computer (hereinafter referred to as "employer communication device") which is associated with, or which can be used by, any one or more of any of the herein-described employers or hiring entities who or which utilize the present invention.

Any number of employer communication devices can be utilized by, or can be associated with, each of the employers or hiring entities who or which utilize the present invention. The employer communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any employer or hiring entity who or which utilizes the present invention. The employer communication device can also be a server computer, a mainframe computer, a mini-computer, a microcomputer, or any other computer or device for suiting the needs of the particular user. The employer communication device can also be any device or computer, or a kiosk, that can be located at public places or locations or which can also be publicly available. Any number of employer communication devices can be utilized in conjunction with, or in connection with, the present invention.

The employer communication device(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes a counterparty communication device or computer (hereinafter referred to as "counterparty communication device") which is associated with, or which can be used by, any one or more of any of the herein-described counterparties who or which utilize the present invention.

Any number of employer communication devices can be utilized by, or can be associated with, each of the counterparties who or which utilize the present invention. The counterparty communication device can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any counterparty who or which utilizes the present invention. The counterparty communication device can also be a server computer, a mainframe computer, a mini-computer, a microcomputer, or any other computer or device for suiting the needs of the particular user. The counterparty communication device can also be any device or computer, or a kiosk, that can be located at public places or locations or which can also be publicly available. Any number of counterparty communication devices can be utilized in conjunction with, or in connection with, the present invention.

The counterparty communication device(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes a media provider or content provider communication device or computer (hereinafter referred to as "media/content provider computer") which is associated with, or which can be used by, any one or more of any of the herein-described media providers or content providers who or which can utilize the present invention in order to provide or distribute its/their respective media or content to any of the herein-described users, individuals, persons, or entities, who or which utilize the present invention.

Any number of media/content provider computers can be utilized by, or can be associated with, each of the respective media providers or content providers who or which utilize the present invention. The media/content provider computer can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any media provider or content provider who or which utilizes the present invention. The media/content provider computer can also be a server computer, a mainframe computer, a mini-computer, a microcomputer, or any other computer or device for suiting the needs of the particular user. The media/content provider computer can also be any device or computer, or a kiosk, that can be located at public places or locations or which can also be publicly available. Any number of media/content provider computers can be utilized in conjunction with, or in connection with, the present invention.

The media/content provider computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes a digital assets/records storage computer which is associated with, or which can be used by, any one or more of any of the herein-described digital assets/records storage providers, which can provide services for or regarding the storage and/or the safeguarding of or for digital assets and/or information regarding same, and/or of or for records and/or information regarding the same, who or which can utilize the present invention.

Any number of digital assets/records storage computers can be utilized by, or can be associated with, each of the respective digital assets/records storage providers who or which utilize the present invention. The digital assets/records storage computer can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any digital assets/records storage provider who or which utilizes the of the present invention. The digital assets/records storage computer can also be a server computer, a mainframe computer, a mini-computer, a microcomputer, or any other computer or device for suiting the needs of the particular user. The digital assets/records storage computer can also be any device or computer, or a kiosk, that can be located at public places or locations or which can also be publicly available. Any number of digital assets/records storage computers can be utilized in conjunction with, or in connection with, the present invention.

The digital assets/records storage computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus also includes an educational facility or instructional facility communication device or computer (hereinafter referred to as "educational/instructional provider computer") which is associated with, or which can be used by, any one or more of any of the herein-described individuals, instructional facilities, educational facilities, training facilities, gyms, health clubs, country clubs, fitness centers, wellness centers, athletic training centers or facilities, physical education schools, centers, or programs, martial arts schools, exercise schools or centers, schools, colleges, universities, trade schools, tutors, and/or instructors, who or which provide instruction, classes, courses, or training, of any type or kind, who or which utilize the present invention.

Any number of educational/instructional provider computers can be utilized by, or in conjunction with, any individual, instructional facility, educational facility, training facility, gym, health club, country club, fitness center, wellness center, athletic training center or facility, physical education school, center, or program, martial arts school, exercise school or center, school, college, university, trade school, tutor, and/or instructor, or any group of same or combination of same, described herein, who or which utilize the present invention (hereinafter referred to interchangeably as an "educational provider" or as an "instructional provider").

The educational/instructional provider computer can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any of the herein-described educational providers or instructional providers. The educational/instructional provider computer can also be a server computer, a mainframe computer, a mini-computer, a microcomputer, or any other computer or device for suiting the needs of the particular user. The educational/instructional provider computer can also be any device or computer, or a kiosk, that can be located at public places or locations or which can also be publicly available. Any number of educational/instructional provider computers can be utilized in conjunction with, or in connection with, the present invention.

The educational/instructional provider computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus can also include a social networking computer. The social networking computer can be linked with, and utilized in connection with, the apparatus so as to allow and/or facilitate integrating the present invention with social networks and social media. The social networking computer can be associated with a social networking company, a social networking website, or social networking entity, website, group, organization, or association. The social networking computer can be associated with any one or any number of social networking companies, social networking websites, or social networking entities, websites, groups, organizations, or associations. The social networking computer can also provide links to any computers associated with any one or any number of social networking companies, social networking websites, or social networking entities, websites, groups, organizations, or associations. The social networking computer can perform any and all of the functions performed by any social networking company, a social networking website, or social networking entity, website, group, organization, or association. Any number of social networking computers can be utilized in connection with the present invention. Any number of social networking computers can be utilized by or in conjunction with any social network or social networking provider who or which utilizes the present invention.

The social networking computer can be a server computer, a personal computer, a mainframe computer, a mini-computer, a microcomputer, or any other computer or device for suiting the needs of the particular social network or social networking provider. The social networking computer can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any social network or social networking provider who or which utilizes the present invention. The social networking computer can also be any device or computer, or a kiosk, that can be located at public places or locations or which can also be publicly available. Any number of social networking computers can be utilized in conjunction with, or in connection with, the present invention.

The social networking computer(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

The apparatus can also include any number of RFID tags/RFID reader system(s), each of which can include any number of RFID tags and RFID reader systems. The RFID tags/RFID reader system(s) can be utilized in or for any number of a variety ways as described herein and/or otherwise. The RFID tags/RFID reader system(s) can be connected to, and/or linked with, the central processing computer/distributed ledger/Blockchain technology system, using any suitable and/or appropriate wired connection, wireless connection, or any combination of same, on, via, or using, any suitable and/or appropriate communication network or any combination of communication networks.

The RFID tags/RFID reader system(s) can communicate with, and/or can operate in conjunction with, the central processing computer/distributed ledger/Blockchain technology system and/or any of the other communication devices, computers, and/or computer systems, described herein as being associated with, or used by, any of the users, individuals, persons, or entities, who or which utilize the present invention.

Any of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can be any computer or communication device, including, but not limited to, a personal computer, a home computer, a server computer, a computer capable of being utilized in a network, a hand-held computer, a palmtop computer, a laptop computer, a personal communication device, a cellular telephone, a wireless telephone, wireless communication device, a mobile telephone, a digital television, an interactive television, a digital television, a personal digital assistant, a telephone, a digital telephone, a television, an interactive television, a beeper, a pager, and/or a watch or a Smart watch, and/or any wearable device, computer or communication device.

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can transmit information to, as well as receive information from, any of the computers or communication devices described herein. In this regard, each of the computers or communication devices can communicate with, process information transmitted from or received from, and/or share data and/or information with, each other and/or any other computer(s) or communication device(s) described herein and/or utilized in conjunction with the present invention. In this manner, any of the computer(s) or communication device(s) described herein can communicate with any other computer(s) or communication device(s) in a bi-directional manner.

The present invention can be utilized on, and/or over, the Internet and/or the World Wide Web. The present invention can also utilize wireless Internet and/or World Wide Web services, equipment and/or devices. The central processing computer(s) can have a web site or web sites associated therewith. Each of the other computers or communication devices described herein can also have a web site or web sites associated with same.

Although the Internet and/or the World Wide Web is a preferred communication system and/or medium utilized, the present invention, in any and/or all of the embodiments described herein, can also be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

Any of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can communicate with one another, and/or can be linked to one another, on, over, or via, any suitable communication network, telecommunication network, telephone network, a line-connected network, and/or a wireless communication network, and/or the Internet and/or the World Wide Web. Each of the computers or communication devices described herein can be linked with any other computer or computers directly or indirectly with one another so as to facilitate a direct or indirect bi-directional communication between said respective computers or communication devices. Communications between each of the computers or communication devices described herein can also involve an e-mail server or e-mail servers in those instances when e-mails are described as being used to transmit, or to send, any of the information, signals, messages, reports, notification messages, or any other communications, described herein, by or between any of the computers or communication devices described herein, or when any of the information, signals, messages, reports, notification messages, or any other computers or communications, described herein, are transmitted by and/or between any of the parties described herein and/or by or between any of the herein-described computers or communication devices, or any other computers or communication devices, computer systems, communication network equipment, server computers, etc., or any other devices used or needed, in order to facilitate communications or the transmission of any of the herein-described information, signals, messages, reports, notification messages, or any other communications.

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can communicate in a bi-directional manner with, and/or can send and/or receive signals, messages, reports, notification messages, alerts, or any other communications or electronic communication transmissions, to, from, and/or between, any other, or any number of, other central processing computer(s), the user communication device(s), the employer communication device(s), the counterparty communication device(s), the media/content provider computer(s), the digital assets/records storage computer(s), the educational/instructional provider computer(s), and/or the social networking computer(s).

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can be linked to or with any other central processing computer(s), the user communication device(s), the employer communication device(s), the counterparty communication device(s), the media/content provider computer(s), the digital assets/records storage computer(s), the educational/instructional provider computer(s), and/or the social networking computer(s), via a wired link or line or a wireless link.

Each of the user communication device(s), the employer communication device(s), the counterparty communication device(s), the media/content provider computer(s), the digital assets/records storage computer(s), the educational/instructional provider computer(s) and/or the social networking computer(s), can be connected with, or linked with, the central processing computer(s). Each of the user communication device(s), the employer communication device(s), the counterparty communication device(s), the media/content provider computer(s), the digital assets/records storage computer(s), the educational/instructional provider computer(s), and/or the social networking computer(s), can be connected with, or linked with, the central processing computer(s) via a wired line or wired link, via a wireless line, and/or via any combination of same.

Any and/or all of the signals, messages, reports, notification messages, or any other communications, described herein as being transmitted from one device, computer, or communication device, to another, can be, or can be included in, or be attached to, an e-mail message, an instant messaging message, an electronic transmission, or an electronic data transmission or electronic data interchange, or can be transmitted via any other data or information transmission, and/or can be transmitted via or using any appropriate or necessary computer(s) or device(s).

Each of the central processing computer(s), the user communication device(s), the employer communication device(s), the counterparty communication device(s), the media/content provider computer(s), the digital assets/records storage computer(s), the educational/instructional provider computer(s), and/or the social networking computer(s), can transmit data and/or information using TCP/IP, as well as any other Internet and/or World Wide Web, and/or communication, protocols.

The present invention can utilize electronic commerce technologies and security methods, techniques and technologies, including any encryption or security technologies and/or techniques, in any and/or all of the instances of, or involving, data and/or information processing, and/or data and/or information transmission, described herein.

The central processing computer can be a computer or computer system, a server computer, a network computer, or any other communication device, which can provide the functionality of, and which can be utilized as a central processing computer, such as an Internet server computer and/or a web site server computer. The central processing computer includes a central processing unit or CPU, which can be a microprocessor. The CPU can also be a microcomputer, a minicomputer, a macro-computer, and/or a mainframe computer, depending upon the application.

The central processing computer also includes a random access memory device(s) (RAM) and a read only memory device(s) (ROM), each of which is connected to, or linked with, the CPU, and a user input device, for entering data and/or information and/or commands into the central processing computer, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the central processing computer. The user input device(s) is/are also connected to, or linked with, the CPU. The central processing computer also includes a display device for displaying data and/or information to a user or operator.

The central processing computer also includes a transmitter(s), for transmitting signals and/or data and/or information to any one or more of the user communication device(s), the employer communication device(s), the counterparty communication device(s), the media/content provider computer(s), the digital assets/records storage computer(s), the educational/instructional provider computer(s), and/or the social networking computer(s), and/or to any other central processing computer(s) and/or any other individual computer(s) or individual communication device(s) which may be utilized in conjunction with the present invention.

The central processing computer also includes a receiver, for receiving signals and/or data and/or information from any one or more of the user communication device(s), the employer communication device(s), the counterparty communication device(s), the media/content provider computer(s), the digital assets/records storage computer(s), the educational/instructional provider computer(s), and/or the social networking computer(s), and/or to any other central processing computer(s) and/or any other individual computer(s) or individual communication device(s) which may be utilized in conjunction with the present invention.

The central processing computer also includes a database(s) which contains any and/or all of the data and/or information required, needed, or desired, for allowing and/or enabling the central processing computer and/or the apparatus of the present invention to perform any and/or all of the functions and functionalities described herein as being performed, and/or as capable of being performed, by the central processing computer and/or the present invention.

The central processing computer also includes an output device for outputting any of the data, information, or reports, described herein or otherwise. The output device can be a printer, a display, a transmitter, a modem, a speaker, and/or any other device which can be used to output data.

The central processing computer can also include a video and/or audio recording device(s) which can include a camera and/or a video recording device, for recording pictures or video and/or video clips, and/or a microphone or an audio recording device, for recording audio or audio clips, which can be recorded by, and/or transmitted live, by or from the central processing computer, or which can be recorded by, and stored at or in, the central processing computer for transmission by or from the central processing computer at a later time. The video and/or audio recording device(s) can also be utilized to facilitate one-way broadcasts from the central processing computer, and/or can be utilized to facilitate video conferencing, video chatting, and/or audio conferencing, and/or video and audio conferencing, between users of the central processing computer and any of the herein-described users, individuals, persons, or entities, who or which utilize the present invention.

The central processing computer can also include a global positioning device. The global positioning device determines or can determine a position or location of the central processing computer.

The central processing computer can also be equipped, and/or can be programmed, for voice activation operation and/or voice control operation of and/or regarding any and/or all of the herein-described operations and functions which are capable of being performed by the central processing computer.

The user communication device, the employer communication device, and/or the counterparty communication device, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device which can provide the functionality of each respective device. Each of the user communication device, the employer communication device, and/or the counterparty communication device, can include a central processing unit or CPU, a random access memory device(s) (RAM), a read only memory device(s) (ROM), a user input device, a display device, a transmitter, a receiver, a database, an output device, and a video and/or audio recording device(s). The user communication device, the employer communication device, and/or the counterparty communication device, can also include a global positioning device.

Each of the user communication device, the employer communication device, and/or the counterparty communication device, can also be equipped, and/or can be programmed, for voice activation operation and/or voice control operation of and/or regarding any and/or all of the herein-described operations and functions which are capable of being performed by the same.

The media/content provider computer, the digital assets/records storage computer, educational/instructional provider computer, and/or the social networking computer, can be any computer or computer system, a server computer, an Internet server computer and/or a web site server computer, a network computer, or any other communication device. The media/content provider computer, the digital assets/records storage computer, educational/instructional provider computer, and/or the social networking computer, can be any computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device which can provide the functionality of each respective computer. Each of the media/content provider computer, the digital assets/records storage computer, educational/instructional provider computer, and/or the social networking computer, can include a central processing unit or CPU, a random access memory device(s) (RAM), a read only memory device(s) (ROM), a user input device, a display device, a transmitter, a receiver, a database, an output device, and a video and/or audio recording device(s). The media/content provider computer, the digital assets/records storage computer, educational/instructional provider computer, and/or the social networking computer, can also include a global positioning device.

Each of the media/content provider computer, the digital assets/records storage computer, educational/instructional provider computer, and/or the social networking computer, can also be equipped, and/or can be programmed, for voice activation operation and/or voice control operation of and/or regarding any and/or all of the herein-described operations and functions which are capable of being performed by the same.

The present invention can be utilized by any user, individual, independent contractor, or freelancer, in order to manage and/or monitor his, her, or its, job seeking, employment, and/or work, activities. It is envisioned that each user, individual, independent contractor, or freelancer, and each employer or hiring entity, can create, and/or have associated therewith, a user or member account. The user or member account can be utilized in order to perform any of the herein-described activities described herein as being capable of being performed while using the present invention.

The user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases described herein, along with identification information, contact information, user or member profile information, and/or user work schedule or work calendar information.

The user, individual, independent contractor, or freelancer, can utilize the present invention in order to search for jobs, projects, or assignments, and/or to search for postings or listings for jobs, projects, or assignments, to submit resumes and/or job applications for jobs, projects, or assignments, to submit proposals or bids for jobs, projects, or assignments, to submit cover letters, to submit video messages, to ascertain the status of a submission(s) or application(s) for or regarding a job(s), a project(s), or an assignment(s), to request an interview, to request information, in applying for, or submitting a proposal for, a job, project, or assignment, to check on the status of an application or proposal for a job, project, or assignment, and/or to perform any other action or activity in finding a job, project, or assignment, and/or a listing or posting for same. The user, individual, independent contractor, or freelancer, can also request to be notified when employer or hiring entity receives, views, considers, or acts upon, his or her application for a job, project, or assignment. The user, individual, independent contractor, or freelancer, can also request to be notified regarding new job, project, or assignment, postings or listings.

Any of the status alerts and/or status messages described herein can be generated and transmitted, from an employer communication device and/or by the central processing computer to the user communication device at any time and/or upon the any occurrence or happening of any event or activity of interest to the user or individual. In addition to containing information regarding the occurrence or happening, the status alert or status message can also contain a link or hyperlink to an electronic forum or a web page associated with, or provided by, the central processing computer.

The user or individual can also use his or her user communication device in order to program the central processing computer in order to detect the posting of jobs, projects, or assignments, of interest to the user or individual. Upon detecting the posting of any jobs, projects, or assignments, of interest to the user or individual, the central processing computer can generate a job alert message or a project alert message automatically and can automatically transmit the same to the user's or individual's user communication device. The job alert message or a project alert message can contain information regarding the job, project, or assignment, and can also contain a link or hyperlink to the electronic forum.

The present invention can also be utilized by any employer or hiring entity in order to manage and/or monitor his, her, or its, recruitment and/or manpower procurement and/or management activities. It is envisioned that each user, individual, independent contractor, or freelancer, and each employer or hiring entity, will create, and/or have associated therewith, a user or member account. The user or member account can be utilized in order to perform any of the herein-described activities described herein as being capable of being performed while using the present invention. The user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases describe herein, along with identification information, contact information, user or member profile information, and/or user work schedule or work calendar information.

The employer or hiring entity, can utilize the present invention in order to search for individuals, independent contractors, or freelancers, who can perform services for the employer or hiring entity, and/or to search for employees or candidates for jobs, projects, or assignments, to receive and review resumes and/or job applications from individuals, independent contractors, or freelancers, to submit requests for proposals or bids for jobs, projects, or assignments to individuals, independent contractors, or freelancers, to receive cover letters, to receive video messages, to ascertain the status of an individual, independent contractor, or freelancer, to request an interview, to request information, and/or to check on the status of an applicant for a job, project, or assignment, and/or to perform any other action or activity in finding an employee or candidate for a job, project, or assignment.

Any of the herein-described status alerts and/or status messages can be generated and transmitted, by and/or from a user communication device, or from the central processing computer, to the employer communication device at any time and/or upon the any occurrence or happening of any event or activity of interest to the employer or hiring entity. In addition to containing information regarding the occurrence or happening, the status alert or status message can also contain a link or hyperlink to an electronic forum or a web page associated with, or provided by, the central processing computer.

The employer or hiring entity can use his or her employer communication device in order to program the central processing computer in order to detect the posting of a user or member profile or a resume of or for potential candidates, potential employees, independent contractors, or freelancers, who may be of interest to the employer or hiring entity. Upon detecting the posting of a user or member profile or a resume of or for a potential candidate, a potential employee, an independent contractor, or a freelancer, of interest to the employer or hiring entity, the central processing computer can generate a candidate alert message automatically and can automatically transmit the same to the employer communication device of the employer or hiring entity. The candidate alert message can contain information regarding the potential candidate, potential employee, independent contractor, or freelancer, and can also contain a link or hyperlink to the electronic forum.

The present invention can also be utilized in order to allow any of the herein-described users or individuals to schedule an appointment with an independent contractor or a freelancer for or regarding the performing of a work project or an assignment, or for or regarding obtaining a consultation, or a work estimate, and/or for or regarding a project or an assignment. In this regard, the present invention can be utilized to schedule appointments with independent contractors and/or freelancers for any and/or all types of kinds of services. The present invention can also be utilized to schedule appointments with independent contractors and/or freelancers who can perform any service or services in any field or sector of the global economy.

The present invention can also be utilized in order to allow any of the herein-described users or individuals to schedule, and/or to participate in, videoconference calls, video chat sessions, telephone calls, or telephone conference calls, with any independent contractor, freelancer, consultant, or other user or individual.

In the case of a video conference call or video chat session, the user or individual and/or the respective independent contractor, freelancer, consultant, or counterparty, can also, at any time during the video conference call or video chat session, take a screenshot picture or photograph of the user or individual and the respective independent contractor, freelancer, consultant, or counterparty, so as to record any information provided during the video conference call or video chat session.

A user or individual can, at any time, access the central processing computer, the distributed ledger/Blockchain technology system of the central processing computer and distributed ledger and Blockchain technology system, and/or the digital assets/records storage computer, and can request access to, and can be provided, via his or her user communication device, with access to, any videoconference call summary report, any digital videoconference call recording, any written transcript of the audio conversation during the videoconference call, and/or any information regarding any screenshot picture(s) or photograph(s) taken during any videoconference call or video conference calls involving the user or individual. The user or individual can access the central processing computer and can obtain, and can be provided with via his or her user communication device, a translation of any written transcript from one language to another. The user or individual can also access the central processing computer and can request, and can be provided with, a written transcript of any video conference call. Any written transcript can also be digitally signed, with a digital signature of the user or individual or of the consultant who participated in the respective videoconference call, and such digital signature can be assigned a serial number or an authentication number.

The present invention can be utilized in connection with allowing a user or individual to engage in a video conference call, a video chat session, a telephone call, or a telephone conference call, with any independent contractor, freelancer, consultant, or counterparty. The present invention can also be utilized by any user or individual to create, store, and/or collect, information as a digital asset of any type or kind.

The present invention can also be utilized in order to allow any of the herein-described users or individuals to schedule, and/or to participate in, videoconference calls, video chat sessions, telephone calls, or telephone conference calls, with athletes, active or retired, of any and/or all ages and/or of any and/or all types or kinds, with actors or actresses, active or retired, of any and/or all ages and/or of any and/or all types or kinds, with entertainers, active or retired, of any and/or all ages and/or of any and/or all types or kinds, with any other celebrities, active or retired, of any and/or all ages and/or of any and/or all types or kinds, or with any other notable individuals or groups of individuals of any and/or all ages and/or of any and/or all types or kinds. The athletes, actors, actresses, or entertainers, can be professional, amateur, college, high school or secondary school-aged, athletes, actors, actresses, entertainers, celebrities, and/or other notable people. A respective athlete, actor or actress, entertainer, or celebrity, can utilize the present invention as an independent contractor or as a freelancer.

The user or individual and the respective athlete, actor or actress, entertainer, or celebrity, can engage in the video conference call, the video chat session, the telephone call, or the telephone conference call, for any scheduled or unscheduled amount of time. The video conference call, the video chat session, the telephone call, or the telephone conference call, can be recorded, and a digitally recorded copy of the video conference call, the video chat session, the telephone call, or the telephone conference call, between the user or individual and the respective athlete, actor or actress, entertainer, or celebrity, can be stored as a digital memorabilia asset or as digital memorabilia in a digital asset account or in digital memorabilia account of or associated with the user or individual.

In the case of a video conference call or video chat session, the user or individual and/or the respective athlete, actor or actress, entertainer, or celebrity, can also, at any time during the same, take a screenshot picture or photograph of the user or individual and the respective athlete, actor or actress, entertainer, or celebrity, and can affix, attach, or digitally sign, a digital autograph to or on the same. The digital autograph can be a digitized copy of any actual autograph of the respective athlete, actor or actress, entertainer, or celebrity, or any other recognized electronic, or other digital, signature. A digital autograph can also be affixed, attached, or digitally signed, to or on the digitally recorded copy of the video conference call, the video chat session, the telephone call, or the telephone conference call. The present invention can assign a serial number, or an authentication number, to the digitally recorded copy of the video conference call, the video chat session, the telephone call, or the telephone conference call, and/or to each screenshot picture or photograph of the user or individual and the respective athlete, actor or actress, entertainer, or celebrity, taken during the respective video conference call or video chat session, and can store the same, along with information regarding the same, in the distributed ledger/Blockchain technology system of the central processing computer and distributed ledger and Blockchain technology system.

In this regard, the present invention can be utilized by any user or individual to create, store, and/or collect, digital memorabilia of any and/or all types or kinds. Further, the present invention can also be utilized in order to facilitate and/or to provide athlete, actor or actress, entertainer, or celebrity, meetings, introductions, meet and greets, and/or personalized autograph sessions, with any of the herein-described users or individuals.

Any of the herein-described digital assets, digital autographs, digital memorabilia, or digital souvenirs, can be tracked, monitored, and/or authenticated, and/or safeguarded, by using the serial numbers and/or authentication numbers which can be or have been assigned to the same.

Any digital asset or digital memorabilia described herein can be stored in, and/or accessed via, any number of digital asset accounts, digital memorabilia accounts, or digital souvenir accounts, of or associated with the user or individual. An RFID tag, or any number of RFID tags, can be assigned to each digital asset account, digital memorabilia account, or digital souvenir account, of the user or individual.

An RFID tag can also be provided to the user or individual so that the user or individual can access any of his or her digital asset accounts, digital memorabilia accounts, or digital souvenir accounts, at any time and from or at any location, and/or via a kiosk or other public communication device or computer system. An RFID tag, which the user or individual possesses or can possess, can be read or scanned by an RFID reader system located at, or associated with, a respective kiosk or other private or public communication device or computer system. The data and/or information read or scanned by the RFID reader system can be transmitted to the central processing computer, which can process the same and can verify or authenticate the user or individual and/or the respective digital asset account, digital memorabilia account, or digital souvenir account.

Once the user or individual and/or the respective digital asset account, digital memorabilia account, or digital souvenir account, has been verified or authenticated, the user or individual can be provided with access to his or her digital asset account, digital memorabilia account, or digital souvenir account, which is stored in the digital assets/records storage computer. The user or individual can access and/or can view any digital asset, digital memorabilia, or digital souvenir, or any number of digital assets, digital memorabilia, or digital souvenirs, which is/are stored in the respective digital asset account, digital memorabilia account, or digital souvenir account, via the respective kiosk or other private or public communication device or computer system. An RFID tag can also be affixed to, attached to, or associated with the user communication device of or associated with the user or individual.

The educational/instructional records computer can contain, in its database, video recordings and/or audio recordings of lessons, classes, courses, seminars, educational materials, instructional materials, training materials, fitness materials, sports materials, athletic materials, or any other recordings or materials. Any of the herein-described athletes, actors or actresses, entertainers, celebrities, or other notable persons, or any educational provider or any instructional provider, can produce, record, and/or can post any of the herein-described video recordings and/or audio recordings of lessons, classes, courses, seminars, educational materials, instructional materials, training materials, fitness materials, sports materials, athletic materials, or any other recordings or materials (hereinafter referred to as "educational/instructional content"), with the educational/instructional records computer, which can be stored in the database of same. Any user or individual can access the educational/instructional records computer at any time using his or her user communication device and can request to receive any of the herein-described educational/instructional content. Thereafter, the educational/instructional records computer can transmit the request educational/instructional content to the user's or individual's user communication device and the same can be viewed via the display device of same.

The herein-described educational/instructional content can be used by any of the herein-described users, individuals, independent contractors, and/or freelancers, and/or by any of the herein-described employers or hiring entities, for any educational, training, re-training, certification, change of career, continuing training, and/or any other, purpose(s).

Any user, individual, independent contractor, freelancer, employer, or hiring entity, can enroll in, and can participate in, any distance learning activities offered by any of the operators of any of the herein-described educational providers and/or instructional providers. The above-referenced distance learning activities can be, or can include, classes, lessons, seminars, degree programs, certificate programs, and/or any other educational and/or instructional products, services, offerings, and/or activities.

Any user, individual, independent contractor, freelancer, employer, or hiring entity, can also access the social networking computer of a social network in or to which he or she belongs for any social networking, socializing, and/or information gathering, purpose or purposes.

Any data and/or information received by, processed by, generated by, and/or transmitted from, the central processing computer(s), any user communication device(s), any employer communication device(s), any counterparty communication device(s), any media/content provider computer(s), any digital assets/records storage computer(s), any other educational/instructional provider computer(s), and/or any social networking computer(s), can be stored in the distributed ledger/Blockchain technology system of the central processing computer and distributed ledger and Blockchain technology system as well as in the database of the central processing computer.

Any data and/or information regarding, pertaining to, indicative of, or representative of, any action(s) taken by, or any activity or activities performed by, or engaged in by, any herein-described user, individual, independent contractor, freelancer, employer, or hiring entity, can be stored in the distributed ledger/Blockchain technology system of the central processing computer and distributed ledger and Blockchain technology system as well as in the database of the central processing computer.

As provided herein, the present invention can provide a distributed ledger and blockchain technology-based recruitment, job searching and/or project searching, scheduling, and/or asset and/or consideration tracking, and/or monitoring, apparatus and method, which can be used in any number and/or variety of ways.

DESCRIPTION OF THE PREFERRED EMBODIMENTS

Figure 1:
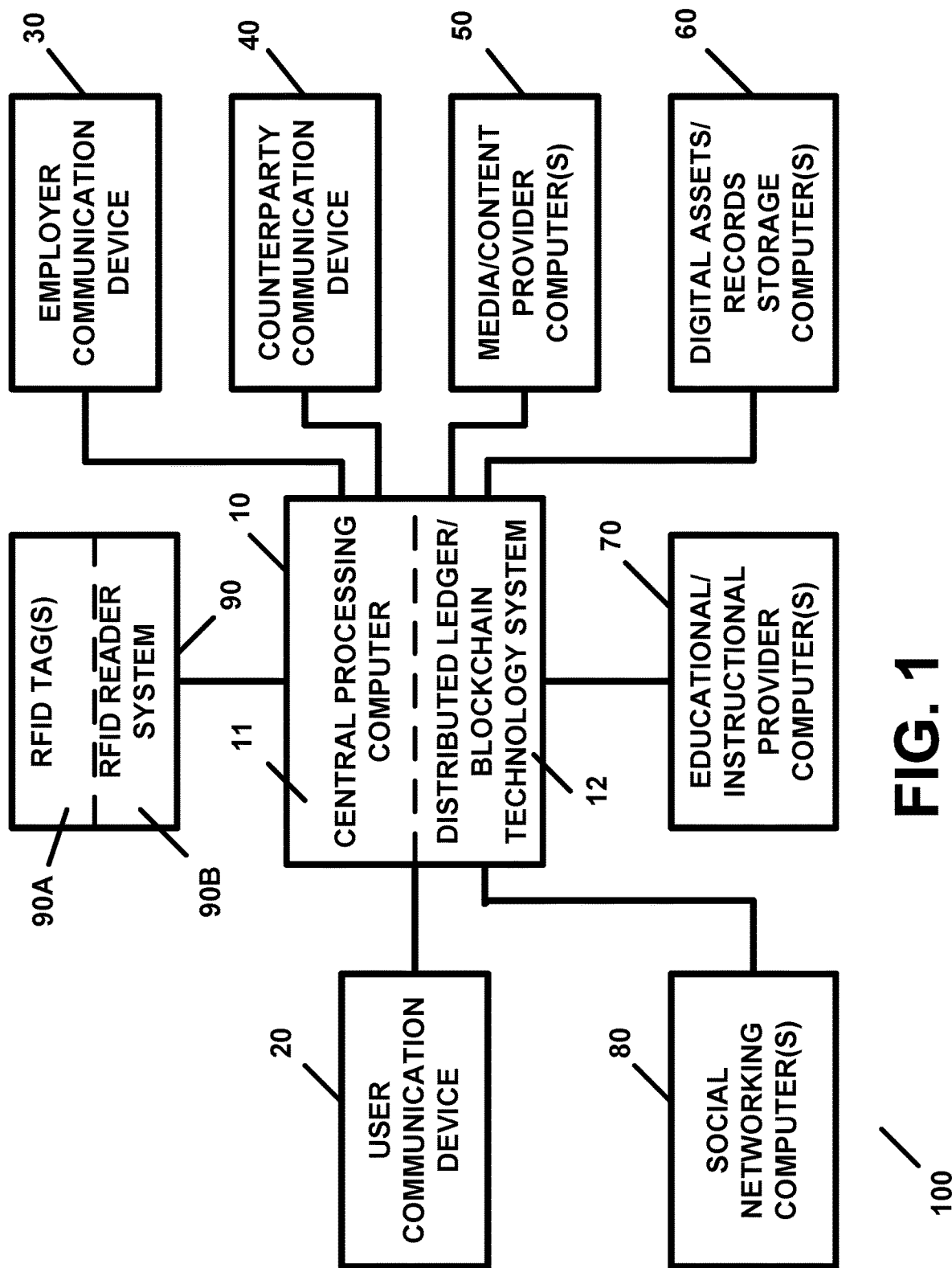
FIG. 1 illustrates a preferred embodiment of the apparatus of the present invention, in block diagram form.

The present invention pertains to a distributed ledger and blockchain technology-based recruitment, job searching and/or project searching, scheduling, and/or asset tracking and/or monitoring, apparatus and method and, in particular, the present invention pertains to a distributed ledger and blockchain technology-based recruitment, job searching and/or project searching, scheduling, and/or asset tracking and/or monitoring, apparatus and method which can provide for enhanced transparency and/or security for, in, or regarding, various recruitment activities, job searching and/or project searching activities, and/or scheduling activities, and/or which can provide for the tracking, monitoring, and/or authentication, of assets, digital or otherwise.

The apparatus and methods of the present invention can be utilized in numerous types and/or kinds of recruitment applications, on-line recruitment or on-line recruiting applications, on-line job searching applications, on-line scheduling applications, and/or in numerous applications involving or relating to the tracking, monitoring, and/or authentication of, assets, digital or otherwise, and/or consideration of all types or kinds.

The apparatus and methods of the present invention can be utilized by an individual, an independent contractor, or a freelancer, to find and apply for a job, project, or assignment, of any kind or type, and allow the respective individual, independent contractor, or freelancer, to be kept appraised as to when and how his or her application is being, or has been, considered by an employer or hiring entity as well as the status of, or a decision, regarding the same.

The apparatus and methods of the present invention can also be utilized by an employer or hiring entity to reach out to an individual, an independent contractor, or a freelancer, regarding a request for a proposal ("RFP"), request for bid ("RFB"), or an offer of employment or an offer to perform a job, project, or assignment, and to be kept appraised as to when and how his, her, or its, respective request or offer is being, or has been, considered by the individual, independent contractor, or freelancer, as well as the status of, or a decision, regarding the same.

The apparatus and methods of the present invention can be utilized by an individual, an independent contractor, or a freelancer, to schedule an appointment with an employer or hiring entity, or can be utilized by an employer or hiring entity to schedule an appointment with any individual, independent contractor, freelancer, athlete, former athlete, celebrity, or any other person.

The apparatus and methods of the present invention can also be utilized by any individual, independent contractor, or freelancer, described herein, or can be utilized by any employer or hiring entity, in order to track, monitor, and/or authenticate, any type or kind of asset(s), digital asset(s), and/or consideration or digital consideration, which be exchanged between, or which might otherwise be transferred between, or exchanged between, any of the users of the present invention.

The apparatus and methods of the present invention can be utilized in connection with a distributed ledger and blockchain technology system to provide a secured record keeping system of and for any other information and/or data processed and/or stored by the present invention in any and/or all of the embodiments described herein or otherwise.

Applicant hereby incorporates by reference herein the subject matter and teachings of U.S. Provisional Patent Application Ser. No. 63/026,005, filed May 16, 2020, and entitled "DISTRIBUTED LEDGER AND BLOCKCHAIN TECHNOLOGY-BASED RECRUITMENT, JOB SEARCHING AND/OR PROJECT SEARCHING, SCHEDULING, AND/OR ASSET TRACKING AND/OR MONITORING, APPARATUS AND METHOD", the subject matter and teachings of which are hereby incorporated by reference herein in their entirety.

FIG. 1 illustrates the apparatus of the present invention, in block diagram form. The apparatus of the present invention is denoted generally by the reference numeral 100. In the preferred embodiment, the apparatus 100 of the present invention includes a central processing computer and distributed ledger and Blockchain technology system 10 (hereinafter referred to as "central processing computer/distributed ledger/Blockchain technology system 10"). In a preferred embodiment, the central processing computer/distributed ledger/Blockchain technology system 10 includes a central processing computer or central processing computer system 11 (hereinafter referred to as "central processing computer 11" or "central processing computer 11 component") and a distributed ledger and Blockchain technology system 12 (hereinafter referred to as "distributed ledger/Blockchain technology system 12" or "distributed ledger/Blockchain technology system 12 component"). In the preferred embodiment, the central processing computer 11 can be any computer or computer system or can be any server computer or any computer or computer system which can be used in a communication network. Any number of central processing computers 11 can be utilized in conjunction with, or in connection, with the apparatus 100 of the present invention.

In the preferred embodiment, the central processing computer 11 can provide control over the apparatus 100 and can perform any of the various processing services and/or functions described herein as being performed by the apparatus 100 of the present invention. In a preferred embodiment, the central processing computer 11 may be a single computer or system of computers and/or may include a plurality of computers or computer systems which are utilized in conjunction with one another. The central processing computer 11, in the preferred embodiment, can provide services for any of the other communications devices and/or computers and/or computer systems described herein as being associated with any of the users, individuals, persons, or entities, who or which utilize the apparatus 100 of the present invention.

With reference once again to FIG. 1, the apparatus 100 also includes a user communication device or computer 20 (hereinafter referred to as "user communication device 20" or "user computer 20") which is associated with, or which can be used by, any one or more of any of the herein-described users, individuals, persons, or entities, who or which utilize the apparatus 100 of the present invention.

Any number of user communication devices 20 can be utilized by, or can be associated with, each of the users, individuals, persons, or entities, who or which utilize the apparatus 100 of the present invention. The user communication device 20 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any user, individual, person, or entity, who or which utilizes the apparatus 100 and method of the present invention. The user communication device 20 can also be a server computer, a mainframe computer, a mini-computer, a microcomputer, or any other computer or device for suiting the needs of the particular user. The user communication device 20 can also be any device or computer, or a kiosk, that can be located at public places or locations or which can also be publicly available. Any number of user communication devices 20 can be utilized in conjunction with, or in connection with, the apparatus 100 of the present invention.

The user communication device(s) 20 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes an employer or hiring entity communication device or computer 30 (hereinafter referred to as "employer communication device 30") which is associated with, or which can be used by, any one or more of any of the herein-described employers or hiring entities who or which utilize the apparatus 100 of the present invention.

Any number of employer communication devices 30 can be utilized by, or can be associated with, each of the employers or hiring entities who or which utilize the apparatus 100 of the present invention. The employer communication device 30 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any employer or hiring entity who or which utilizes the apparatus 100 and method of the present invention. The employer communication device 30 can also be a server computer, a mainframe computer, a mini-computer, a microcomputer, or any other computer or device for suiting the needs of the particular user. The employer communication device 30 can also be any device or computer, or a kiosk, that can be located at public places or locations or which can also be publicly available. Any number of employer communication devices 30 can be utilized in conjunction with, or in connection with, the apparatus 100 of the present invention.

The employer communication device(s) 30 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes a counterparty communication device or computer 40 (hereinafter referred to as "counterparty communication device 40") which is associated with, or which can be used by, any one or more of any of the herein-described counterparties who or which utilize the apparatus 100 of the present invention.

Any number of employer communication devices 40 can be utilized by, or can be associated with, each of the counterparties who or which utilize the apparatus 100 of the present invention. The counterparty communication device 40 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any counterparty who or which utilizes the apparatus 100 and method of the present invention. The counterparty communication device 40 can also be a server computer, a mainframe computer, a mini-computer, a microcomputer, or any other computer or device for suiting the needs of the particular user. The counterparty communication device 40 can also be any device or computer, or a kiosk, that can be located at public places or locations or which can also be publicly available. Any number of counterparty communication devices 40 can be utilized in conjunction with, or in connection with, the apparatus 100 of the present invention.

The counterparty communication device(s) 40 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes a media provider or content provider communication device or computer 50 (hereinafter referred to as "media/content provider computer 50") which is associated with, or which can be used by, any one or more of any of the herein-described media providers or content providers who or which can utilize the apparatus 100 of the present invention in order to provide or distribute its/their respective media or content to any of the herein-described users, individuals, persons, or entities, who or which utilize the apparatus 100 and method of the present invention.

Any number of media/content provider computers 50 can be utilized by, or can be associated with, each of the respective media providers or content providers who or which utilize the apparatus 100 of the present invention. The media/content provider computer 50 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any media provider or content provider who or which utilizes the apparatus 100 and method of the present invention. The media/content provider computer 50 can also be a server computer, a mainframe computer, a mini-computer, a microcomputer, or any other computer or device for suiting the needs of the particular user. The media/content provider computer 50 can also be any device or computer, or a kiosk, that can be located at public places or locations or which can also be publicly available. Any number of media/content provider computers 50 can be utilized in conjunction with, or in connection with, the apparatus 100 of the present invention.

The media/content provider computer(s) 50 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes a digital assets/records storage computer 60 which is associated with, or which can be used by, any one or more of any of the herein-described digital assets/records storage providers, which can provide services for or regarding the storage and/or the safeguarding of or for digital assets and/or information regarding same, and/or of or for records and/or information regarding the same, who or which can utilize the apparatus 100 of the present invention.

Any number of digital assets/records storage computers 60 can be utilized by, or can be associated with, each of the respective digital assets/records storage providers who or which utilize the apparatus 100 of the present invention. The digital assets/records storage computer 60 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any digital assets/records storage provider who or which utilizes the apparatus 100 and method of the present invention. The digital assets/records storage computer 60 can also be a server computer, a mainframe computer, a mini-computer, a microcomputer, or any other computer or device for suiting the needs of the particular user. The digital assets/records storage computer 60 can also be any device or computer, or a kiosk, that can be located at public places or locations or which can also be publicly available. Any number of digital assets/records storage computers 60 can be utilized in conjunction with, or in connection with, the apparatus 100 of the present invention.

The digital assets/records storage computer(s) 60 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes an educational facility or instructional facility communication device or computer 70 (hereinafter referred to as "educational/instructional provider computer 70") which is associated with, or which can be used by, any one or more of any of the herein-described individuals, instructional facilities, educational facilities, training facilities, gyms, health clubs, country clubs, fitness centers, wellness centers, athletic training centers or facilities, physical education schools, centers, or programs, martial arts schools, exercise schools or centers, schools, colleges, universities, trade schools, tutors, and/or instructors, who or which provide instruction, classes, courses, or training, of any type or kind, who or which utilize the apparatus 100 and method of the present invention.

Any number of educational/instructional provider computers 70 can be utilized by, or in conjunction with, any individual, instructional facility, educational facility, training facility, gym, health club, country club, fitness center, wellness center, athletic training center or facility, physical education school, center, or program, martial arts school, exercise school or center, school, college, university, trade school, tutor, and/or instructor, or any group of same or combination of same, described herein, who or which utilize the apparatus 100 and method of the present invention (hereinafter referred to interchangeably as an "educational provider" or as an "instructional provider").

The educational/instructional provider computer 70 can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any of the herein-described educational providers or instructional providers. The educational/instructional provider computer 70 can also be a server computer, a mainframe computer, a mini-computer, a microcomputer, or any other computer or device for suiting the needs of the particular user. The educational/instructional provider computer 70 can also be any device or computer, or a kiosk, that can be located at public places or locations or which can also be publicly available. Any number of educational/instructional provider computers 70 can be utilized in conjunction with, or in connection with, the apparatus 100 of the present invention.

The educational/instructional provider computer(s) 70 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

The apparatus 100 can also include a social networking computer 80. The social networking computer 80 can be linked with, and utilized in connection with, the apparatus 100 so as to allow and/or facilitate integrating the apparatus 100 of the present invention with social networks and/or social media. In a preferred embodiment, for example, the social networking computer 80 can be associated with a social networking company, a social networking website, or social networking entity, website, group, organization, or association. The social networking computer 80 can be associated with any one or any number of social networking companies, social networking websites, or social networking entities, websites, groups, organizations, or associations. The social networking computer 80 can also provide links to any computers associated with any one or any number of social networking companies, social networking websites, or social networking entities, websites, groups, organizations, or associations. In the preferred embodiment, the social networking computer 80 can perform any and all of the functions performed by any social networking company, a social networking website, or social networking entity, website, group, organization, or association. In a preferred embodiment, any number of social networking computers 80 can be utilized in connection with the apparatus 100 of the present invention. Any number of social networking computers 80 can be utilized by or in conjunction with any social network or social networking provider who or which utilizes the apparatus 100 of the present invention.

The social networking computer 80 can be a server computer, a personal computer, a mainframe computer, a mini-computer, a microcomputer, or any other computer or device for suiting the needs of the particular social network or social networking provider. The social networking computer 80 can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, which can be utilized by any social network or social networking provider who or which utilizes the apparatus 100 and method of the present invention. The social networking computer 80 can also be any device or computer, or a kiosk, that can be located at public places or locations or which can also be publicly available. Any number of social networking computers 80 can be utilized in conjunction with, or in connection with, the apparatus 100 of the present invention.

The social networking computer(s) 80 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, in a preferred embodiment, the apparatus 100 can also include any number of RFID tags/RFID reader system(s) 90, each of which can include any number of RFID tags 90A and RFID reader systems 90B. In a preferred embodiment, the RFID tags/RFID reader system(s) 90 can be utilized in or for any number of a variety ways as described herein and/or otherwise. In a preferred embodiment, the RFID tags/RFID reader system(s) 90 can be connected to, and/or linked with, the central processing computer/distributed ledger/Blockchain technology system 10, using any suitable and/or appropriate wired connection, wireless connection, or any combination of same, on, via, or using, any suitable and/or appropriate communication network or any combination of communication networks.

The RFID tags/RFID reader system(s) 90 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

In the preferred embodiment, any of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be any computer or communication device, including, but not limited to, a personal computer, a home computer, a server computer, a computer capable of being utilized in a network, a hand-held computer, a palmtop computer, a laptop computer, a personal communication device, a cellular telephone, a wireless telephone, wireless communication device, a mobile telephone, a digital television, an interactive television, a digital television, a personal digital assistant, a telephone, a digital telephone, a television, an interactive television, a beeper, a pager, and/or a watch or a Smart watch, and/or any wearable device, computer or communication device.

Each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can transmit information to, as well as receive information from, any of the computers or communication devices 11, 20, 30, 40, 50, 60, 70, and/or 80, described herein. In this regard, each of the computers or communication devices 11, 20, 30, 40, 50, 60, 70, and/or 80, can communicate with, process information transmitted from or received from, and/or share data and/or information with, each other and/or any other computer(s) or communication device(s) 11, 20, 30, 40, 50, 60, 70, and/or 80, described herein and/or utilized in conjunction with the apparatus 100 of the present invention. In this manner, data and/or information transfer, between any of the computer(s) or communication device(s) 11, 20, 30, 40, 50, 60, 70, and/or 80, can communicate with any other computer(s) or communication device(s) 11, 20, 30, 40, 50, 60, 70, and/or 80, in a bi-directional manner. In this manner, any of the computer(s) or communication device(s) 11, 20, 30, 40, 50, 60, 70, and/or 80, can communicate with any other computer(s) or communication device(s) 11, 20, 30, 40, 50, 60, 70, and/or 80, in a bi-directional manner.

In the preferred embodiment, the present invention can be utilized on, and/or over, the Internet and/or the World Wide Web. The apparatus 100 of the present invention, in the preferred embodiment, can also utilize wireless Internet and/or World Wide Web services, equipment and/or devices. The central processing computer(s) 11, in the preferred embodiment, has a web site or web sites associated therewith. Each of the other computers or communication devices described herein can also have a web site or web sites associated with same.

Although the Internet and/or the World Wide Web is a preferred communication system and/or medium utilized, the present invention, in any and/or all of the embodiments described herein, can also be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

Any of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can communicate with one another, and/or can be linked to one another, on, over, or via, any suitable communication network, telecommunication network, telephone network, a line-connected network, and/or a wireless communication network, and/or the Internet and/or the World Wide Web. Each of the computers or communication devices 11, 20, 30, 40, 50, 60, 70, and/or 80, can be linked with any other computer or computers directly or indirectly with one another so as to facilitate a direct or indirect bi-directional communication between said respective computers or communication devices. Communications between each of the computers or communication devices 11, 20, 30, 40, 50, 60, 70, and/or 80, can also involve an e-mail server or e-mail servers in those instances when e-mails are described as being used to transmit, or to send, any of the information, signals, messages, reports, notification messages, or any other communications, described herein, by or between any of the computers or communication devices 11, 20, 30, 40, 50, 60, 70, and/or 80, or when any of the information, signals, messages, reports, notification messages, or any other computers or communications, described herein, are transmitted by and/or between any of the parties described herein and/or by or between any of the computers or communication devices 11, 20, 30, 40, 50, 60, 70, and/or 80, or any other computers or communication devices, computer systems, communication network equipment, server computers, etc., or any other devices used or needed, in order to facilitate communications or the transmission of any of the herein-described information, signals, messages, reports, notification messages, or any other communications.

In a preferred embodiment, each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can communicate in a bi-directional manner with, and/or can send and/or receive signals, messages, reports, notification messages, alerts, or any other communications or electronic communication transmissions, to, from, and/or between, any other, or any number of, other central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80.

In a preferred embodiment, each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be linked to or with any other central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, via a wired link or line or a wireless link.

In a preferred embodiment, each of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be connected with, or linked with, the central processing computer(s) 11 as shown in FIG. 1. In a preferred embodiment, each of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can be connected with, or linked with, the central processing computer(s) 11 via a wired line or wired link, via a wireless line, and/or via any combination of same.

In a preferred embodiment, any and/or all of the signals, messages, reports, notification messages, or any other communications, described herein as being transmitted from one device, computer, or communication device, to another, can be, or can be included in, or be attached to, an e-mail message, an instant messaging message, an electronic transmission, or an electronic data transmission or electronic data interchange, or can be transmitted via any other data or information transmission, and/or can be transmitted via or using any appropriate or necessary computer(s) or device(s).

In the preferred embodiment, each of the central processing computer(s) 11, the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, can transmit data and/or information using TCP/IP, as well as any other Internet and/or World Wide Web, and/or communication, protocols.

The apparatus 100 of the present invention can utilize electronic commerce technologies and security methods, techniques and technologies, including any encryption or security technologies and/or techniques, in any and/or all of the instances of, or involving, data and/or information processing, and/or data and/or information transmission, described herein.

Figure 2:
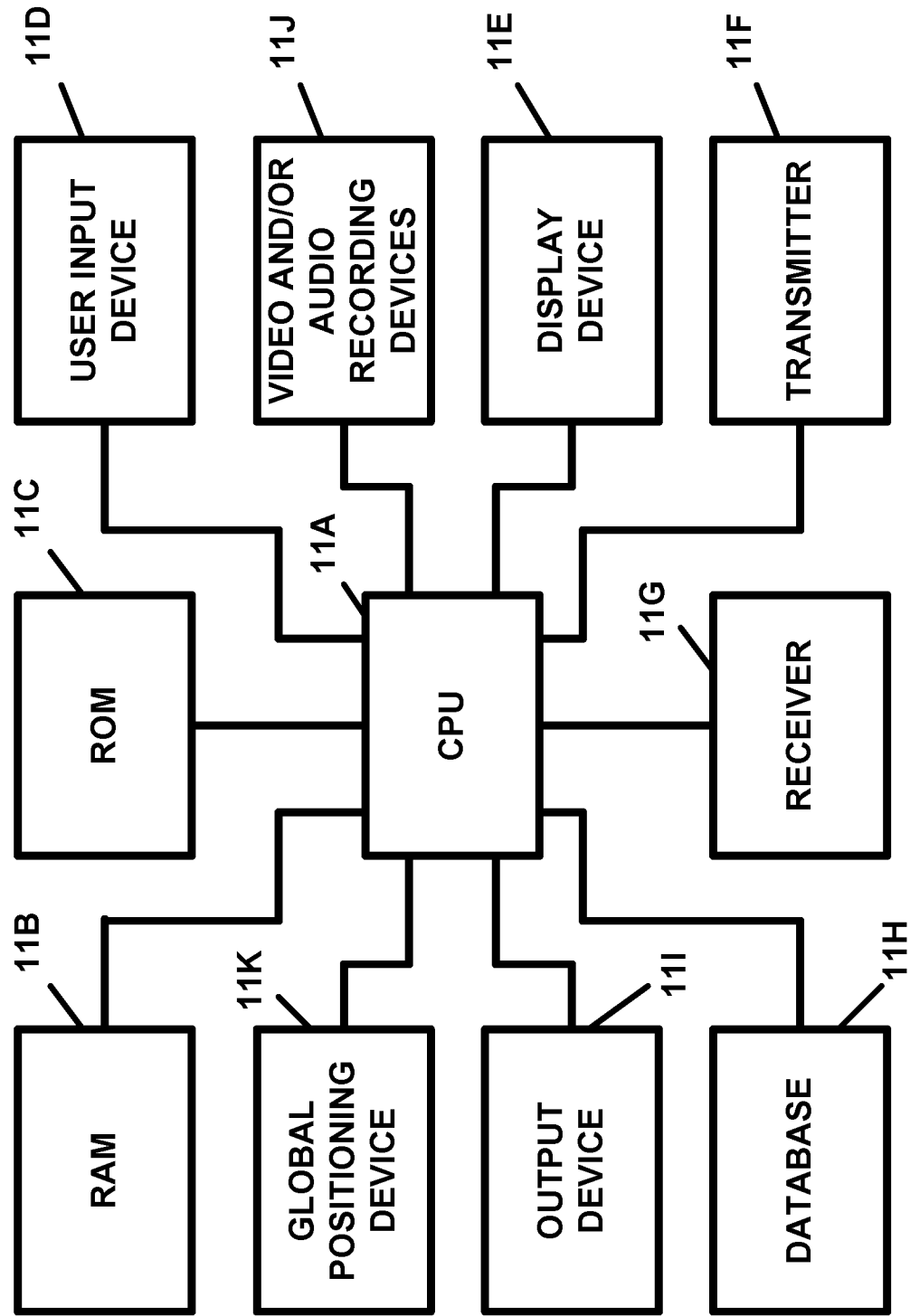
FIG. 2 illustrates the central processing computer component of the central processing computer and distributed ledger and Blockchain technology system of FIG. 1, in block diagram form.

FIG. 2 illustrates the central processing computer 11 component, of the central processing computer/distributed ledger/Blockchain technology system 10 of the apparatus 100, in block diagram form. The central processing computer 11, in the preferred embodiment, can be a computer or computer system, a server computer, a network computer, or any other communication device, which can provide the functionality of, and which can be utilized as a central processing computer 11, such as an Internet server computer and/or a web site server computer. In the preferred embodiment, the central processing computer 11 includes a central processing unit or CPU 11A, which, in the preferred embodiment, is a microprocessor. The CPU 11A can also be a microcomputer, a minicomputer, a macro-computer, and/or a mainframe computer, depending upon the application.

The central processing computer 11 also includes a random access memory device(s) 11B (RAM) and a read only memory device(s) 11C (ROM), each of which is connected to, or linked with, the CPU 11A, and a user input device 11D, for entering data and/or information and/or commands into the central processing computer 11, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the central processing computer 11. The user input device(s) 11D is/are also connected to, or linked with, the CPU 11A. The central processing computer 11 also includes a display device 11E for displaying data and/or information to a user or operator. The display device 11E is also connected to, or linked with, the CPU 11A.

The central processing computer 11 also includes a transmitter(s) 11F, for transmitting signals and/or data and/or information to any one or more of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or to any other central processing computer(s) 11 and/or any other individual computer(s) or individual communication device(s) which may be utilized in conjunction with the apparatus 100 of the present invention. The transmitter 11F is also connected to, or linked with, the CPU 11A.

The central processing computer 11 also includes a receiver 11G, for receiving signals and/or data and/or information from any one or more of the user communication device(s) 20, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or to any other central processing computer(s) 11 and/or any other individual computer(s) or individual communication device(s) which may be utilized in conjunction with the apparatus 100 of the present invention. The receiver 11G is also connected to, or linked with, the CPU 11A.

The central processing computer 11 also includes a database(s) 11H which contains any and/or all of the data and/or information required, needed, or desired, for allowing and/or enabling the central processing computer 11 and/or the apparatus 100 to perform any and/or all of the functions and functionalities described herein as being performed, and/or as capable of being performed, by the central processing computer 11 and/or the apparatus 100 of the present invention. In this regard, and notwithstanding any specific examples of data and/or information described herein as being stored in the database 11H, it is to be understood that the database 11H contains or includes any and/or all data and/or information required, needed, or desired, for allowing and/or enabling the central processing computer 11 and/or the apparatus 100 to perform any and/or all of the functions and functionalities described herein as being performed by the central processing computer 11 and/or the apparatus 100 of the present invention.

In a preferred embodiment, the database 11H can contain and/or include data and/or information pertaining to any and/or all of the users, individuals, employees, independent contractors, freelancers, employers, hiring entities, counterparties, media providers, content providers, digital asset storage providers, educational institutions, schools, high schools, secondary schools, colleges, universities, trade schools, instructional institutions, instructional facilities, social networks, RFID systems providers, RFID tags, and/or RFID reader systems, described herein as utilizing, or as being utilized in connection with the apparatus 100 of the present invention.

In a preferred embodiment, the database 11H can also contain and/or include, for each of the users, individuals, employees, independent contractors, freelancers, employers, hiring entities, and/or counterparties, described herein, information regarding the user's or individual's name, sex, age, birth date, address, telephone number, cellular telephone number, text messaging number, videoconferencing or video chat identification (ID) name or number, email address, website address or uniform resource locator (url), and/or any other contact information, agent or representative contact information, educational information, schooling, work experience, work history, skills, work-related skills, past employers, references, salary history, salary requirements, compensation requirements, benefit requirements, school transcripts, links to registrar's offices and/or databases at respective school(s) and/or to a transcript database and/or electronic storage facility, medium, and/or device, which stores transcripts and/or other scholastic and/or educational information about an individual(s), work samples, reference letters, recommendation letters, pictures, photographs, video clips, work schedule(s) and/or work calendar(s), and/or other relevant and/or pertinent information. In this manner, the apparatus 100 of the present invention facilitates more efficient access to data and/or information pertaining to a user(s) or individual(s).

In a preferred embodiment, the database 11H can include, for each of the users, individuals, employees, independent contractors, freelancers, employers, hiring entities, and/or counterparties, described herein, any information needed or desired for allowing the users, individuals, employees, independent contractors, freelancers, employers, hiring entities, and/or counterparties, to utilize the apparatus 100 in any manner described herein or otherwise.

The database 11H can also contain and/or include data and/or information pertaining to recruiters, headhunters, management consultants, managers, and/or other intermediaries, and/or third parties, who or which utilize the apparatus 100 of the present invention in order to act on behalf of any of the users, individuals, independent contractors, freelancers, employers, and/or hiring entities, who attempt to match the needs of any of the parties described herein.

In a preferred embodiment, the database 11H can also contain and/or include, for each of the media providers, content providers, digital asset storage providers, educational institutions, instructional institutions, and/or social network providers, who or which utilize the apparatus 100 of the present invention, information regarding the respective media provider's, content provider's, digital asset storage provider's, educational institution's, instructional institution's, or social network provider's, name, address, telephone number, cellular telephone number, text messaging number, videoconferencing or video chat identification (ID) name or number, email address, website address or uniform resource locator (url), and/or any other contact information, agent or representative contact information, references, reference letters, recommendation letters, pictures, photographs, video clips, work schedule(s) and/or work calendar(s), and/or other relevant and/or pertinent information.

In a preferred embodiment, the database 11H can also contain and/or include, for each of the users, individuals, employees, independent contractors, freelancers, employers, hiring entities, counterparties, media providers, content providers, digital asset storage providers, educational institutions, instructional institutions, and/or social network providers, who or which utilize the apparatus 100 of the present invention, information regarding a user or member profile page for the respective user, individual, employee, independent contractor, freelancer, employer, hiring entity, counterparty, media provider, content provider, digital asset storage provider, educational institution, instructional institution, and/or social network provider, who or which utilize the apparatus 100 of the present invention. In a preferred embodiment, the user or member profile page can include, for the respective user, individual, employee, independent contractor, freelancer, employer, hiring entity, counterparty, media provider, content provider, digital asset storage provider, educational institution, instructional institution, and/or social network provider, information regarding the name, address, telephone number, cellular telephone number, text messaging number, videoconferencing or video chat identification (ID) name or number, email address, website address or uniform resource locator (url), and/or any other contact information, agent or representative contact information, references, reference letters, recommendation letters, a picture(s), a photograph(s), a video clip(s), a work schedule(s) and/or work calendar(s), and/or other relevant and/or pertinent information, for the respective user, individual, employee, independent contractor, freelancer, employer, hiring entity, counterparty, media provider, content provider, digital asset storage provider, educational institution, instructional institution, and/or social network provider. The profile page can also contain and/or include a link(s) or hyperlink(s) to initiate a telephone call or a videoconference or video chat communication session, with the respective user, individual, employee, independent contractor, freelancer, employer, hiring entity, counterparty, media provider, content provider, digital asset storage provider, educational institution, instructional institution, and/or social network provider, and/or to send a text message or an email message to the respective user, individual, employee, independent contractor, freelancer, employer, hiring entity, counterparty, media provider, content provider, digital asset storage provider, educational institution, instructional institution, and/or social network provider.

The database 11H can also contain and/or include data and/or information regarding all past, present or current, and/or future, job listings, job openings, job postings, project listings, project posts, requests for proposals, requests for bids, and/or any other listings or postings regarding a need to hire an employee or employees or a need to engage and independent contractor, independent contractors, a freelancer, or freelancers, which can be listed or posted by any number of employers or hiring entities. The database 11H can also include data and/or information regarding any and/or all of the herein-described users, individuals, independent contractors, or freelancers, who are available to provide work for any of the herein-described employers or hiring entities as an employee, as an independent contractor, or as a freelancer, who have registered with the apparatus 100, who have applied for any past, present or current, and/or future, job listings, job openings, job postings, project listings, project posts, requests for proposals, requests for bids, and/or any other listings or postings of or by any of the herein-described employers or hiring entities, and/or who desire to apply for any past, present or current, and/or future, job listings, job openings, job postings, project listings, project posts, requests for proposals, requests for bids, and/or any other listings or postings of or by any of the herein-described employers or hiring entities. In this regard, the apparatus 100 can also serve as an on-line job, project, and/or assignment, clearinghouse.

The data and/or information contained and/or included in the database 11H can also include information concerning events, occurrences, availability of an applicant or applicants, and/or any other information of which the employer may which to be notified, and/or can also include information regarding when an employer or hiring entity will be in need of the assistance of, and/or the services, of users, individuals, independent contractors, temporary employees, and/or freelancers. The database 11H can also contain and/or include information regarding schedules and/or work calendars which can provide notification of the human resource needs of an employer or hiring entity.

The database 11H may also contain and/or include data and/or information regarding the latest developments and/or current developments in the employment and/or recruiting field, including, but not limited to, growth areas, and/or demand information for certain jobs and/or professions, and/or any other information.

In a preferred embodiment, the database 11H can also contain and/or include, for each of the users, individuals, employees, independent contractors, freelancers, employers, hiring entities, counterparties, media providers, content providers, digital asset storage providers, educational institutions, instructional institutions, and/or social network providers, who or which utilize the apparatus 100 of the present invention, information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or content account(s), and any and/or all data and/or information stored therein, of, for, or associated with, a respective user, individual, employee, independent contractor, freelancer, employer, hiring entity, counterparty, media provider, content provider, digital asset storage provider, educational institution, instructional institution, and/or social network provider.

In a preferred embodiment, the database 11H can contain and/or include any data and/or information described herein as being contained and/or included in any of the databases 20H of any and/or all of the user communication devices 20 utilized in connection with the apparatus 100, any data and/or information described herein as being contained and/or included in any of the databases 30H of any and/or all of the employer communication devices 30 utilized in connection with the apparatus 100, any data and/or information described herein as being contained and/or included in any of the databases 40H of any and/or all of the counterparty communication devices 40 utilized in connection with the apparatus 100, any data and/or information described herein as being contained and/or included in any of the databases 50H of any and/or all of the media/content provider computers 50 utilized in connection with the apparatus 100, any data and/or information described herein as being contained and/or included in any of the databases 60H of any and/or all of the digital assets/records storage computers 60 utilized in connection with the apparatus 100, any data and/or information described herein as being contained and/or included in any of the databases 70H of any and/or all of the educational/instructional provider computers 70 utilized in connection with the apparatus 100, and/or any data and/or information described herein as being contained and/or included in any of the databases 80H of any and/or all of the social networking computers 80 utilized in connection with the apparatus 100, and/or any other data and/or information needed and/or desired fro utilizing the apparatus 100 in any and/or all of the embodiments described herein.

In a preferred embodiment, any data and/or information described herein as being contained and/or included in the each of the respective databases 20H, 30H, 40H, 50H, 60H, 70H, and/or 80H, can be contained and/or included in the database 11H for each and every computer or communication device 11, 20, 30, 40, 50, 60, 70, and/or 80, utilized in connection with the apparatus 100. In this regard, Applicant hereby incorporates by reference herein any and/or all data and/or information described herein as being contained and/or included in each of the databases 20H, 30H, 40H, 50H, 60H, 70H, and/or 80H, as being contained and/or included in the database 11H for each and every central processing computer 11, user communication device 20, employer communication device 30, counterparty communication device 40, media/content provider computer 50, digital assets/records storage computer 60, educational/institutional provider computer 70, and/or social networking computer 80, which is utilized in connection with the apparatus 100 of the present invention. In another preferred embodiment, the data and/or information, described herein as being stored in each of the databases 11H, 20H, 30H, 40H, 50H, 60H, 70H, and/or 80H, for each and every central processing computer 11, user communication device 20, employer communication device 30, counterparty communication device 40, media/content provider computer 50, digital assets/records storage computer 60, educational/institutional provider computer 70, and/or social networking computer 80, utilized in connection with the apparatus 100 can also be stored in the database 11H.

The database 11H can also contain and/or include any data and/or information, including identifying information for or regarding each RFID tag 90A and each RFID reader system 90B which is used in conjunction with, or in connection with the apparatus 100 of the present invention. The database 11 can also contain and/or include data and/or information needed or utilized for tracking each RFID tag 90A, and/or for storing information regarding any thing, item, entity, or asset, to which each respective RFID tag 90A is attached, associated, or assigned.

The database 11H can also contain and/or include, for each respective user, individual, employee, independent contractor, freelancer, employer, hiring entity, counterparty, media provider, content provider, digital asset storage provider, educational institution, instructional institution, and/or social network provider, information regarding the respective user's, individual's, employee's, independent contractor's, freelancer's, employer's, hiring entity's, counterparty's, media provider's, content provider's, digital asset storage provider's, educational institution's, instructional institution's, and/or social network provider's, name, address, telephone number(s), cellular telephone number(s), mobile or wireless telephone number(s), e-mail address or e-mail addresses, and/or text message, instant message, SMS message, or MMS message, or any other messaging, telephone number or other address or identifier, videoconferencing or video chat identification (ID) name or number, website(s), domain name, and/or IP address(es). In an preferred embodiment, each of the respective databases 20H, 30H, 40H, 50H, 60H, 70H, and/or 80H, described herein, can also contain and/or include the respective user's, individual's, employee's, independent contractor's, freelancer's, employer's, hiring entity's, counterparty's, media provider's, content provider's, digital asset storage provider's, educational institution's, instructional institution's, and/or social network provider's, name, address, telephone number(s), cellular telephone number(s), mobile or wireless telephone number(s), e-mail address or e-mail addresses, and/or text message, instant message, SMS message, or MMS message, or any other messaging, telephone number or other address or identifier, videoconferencing or video chat identification (ID) name or number, website(s), domain name, and/or IP address(es).

The database 11H can also contain and/or include, for each respective user, individual, employee, independent contractor, freelancer, employer, hiring entity, counterparty, media provider, content provider, digital asset storage provider, educational institution, instructional institution, and/or social network provider, who or which utilizes the apparatus 100, data and/or information regarding any searches for or regarding, any requests for alerts regarding, or any requests for notification messages regarding, any jobs, projects, assignments, offers to work, lessons, classes, courses, or seminars, and/or any other offerings described herein as being offered or provided by, or otherwise offered or provided by, any other user, individual, employee, independent contractor, freelancer, employer, hiring entity, counterparty, media provider, content provider, digital asset storage provider, educational institution, instructional institution, and/or social network provider.

The database 11H can also include advertisements, advertisement materials and information, marketing materials or information, commercials, video clips, infomercials, and any other information, which can include text information, video information, audio information, or any combination of same, which can be used to provide an advertisement, or advertisement material or information, to or for any user, individual, employee, independent contractor, freelancer, employer, hiring entity, counterparty, media provider, content provider, digital asset storage provider, educational institution, instructional institution, and/or social network provider, who or which utilizes the apparatus 100 of the present invention.

The database 11H can also contain and/or include news information, news reports, published reports, theses, study reports, programs, television programs, video information, and/or audio information, or any other data or information regarding any instructional, educational, academic, scholastic, health, fitness, wellness, exercise, martial arts, sports, or athletics, or any healthcare, therapeutic, or other, information, issues, news, news reports, published papers, white papers, magazine articles, television shows or programs, radio programs, Internet or World Wide Web broadcasts or programs, video clips, audio clips, videos, or any other media or information which can be provided to, for, or by, any user, individual, employee, independent contractor, freelancer, employer, hiring entity, counterparty, media provider, content provider, digital asset storage provider, educational institution, instructional institution, and/or social network provider, who or which utilizes the apparatus 100 of the present invention.

The database 11H can also include language translation information or software so that any of the data or information described herein as being stored in the database 11H, and/or in any of the databases 20H, 30H, 40H, 50H, 60H, 70H, and/or 80H, or as being provided in any of the messages, reports, or other communications, described herein, can be translated into any language or any languages.

The database 11H can also contain any notes, comments, or messages, which can be provided in text, in audio recordings or audio clips, and/or in video recordings or video clips. The database 11H can also contain any data, information, and/or software programs for translating audio information into text information and for translating text information into audio information. The database 11H can also contain any data, information, and/or software programs for translating text information or audio information from one language to another so as to provide a multi-lingual communications platform and system. The database 11H can also contain any notes, comments, or messages, which can be provided by or for user, individual, employee, independent contractor, freelancer, employer, hiring entity, counterparty, media provider, content provider, digital asset storage provider, educational institution, instructional institution, and/or social network provider, described herein who or which utilizes the apparatus 100 of the present invention.

In a preferred embodiment, any text or audio information described herein can be translated into or from text to audio or from audio into text, and any text or audio information can be translated from one language to any other language or languages.

The database 11H can also contain any other data and/or information, including software for performing any and all of the operations, routines, processing routines, and other functions and/or functionality, described herein as being capable of being performed by the apparatus 100, and/or by the central processing computer(s) 11 and/or by any of the herein-described user communication device(s) 20, employer communication device(s) 30, counterparty communication device(s) 40, media/content provider computer(s) 50, digital assets/records storage computer(s) 60, educational/instructional provider computer(s) 70, and/or social networking computer(s) 80.

The database 11H can also contain any data and/or information to or regarding, as well as any links or hyperlinks to, any of the herein-described user communication device(s) 20, employer communication device(s) 30, counterparty communication device(s) 40, media/content provider computer(s) 50, digital assets/records storage computer(s) 60, educational/instructional provider computer(s) 70, and/or social networking computer(s) 80, described herein, and/or their any of their respective databases 20H, 30H, 40H, 50H, 60H, 70H, and/or 80H, and/or can contain data and/or information and/or links or hyperlinks to any data and/or information located in, or stored at, or in, any of the user communication device(s) 20, employer communication device(s) 30, counterparty communication device(s) 40, media/content provider computer(s) 50, digital assets/records storage computer(s) 60, educational/instructional provider computer(s) 70, and/or social networking computer(s) 80, described herein, and/or stored in any of the respective databases 20H, 30H, 40H, 50H, 60H, 70H, and/or 80H, of same.

In any and/or all of the embodiments described herein, any of the data and/or information which is, or which may be, stored in the database 11H, and/or in any of the other databases 20H, 30H, 40H, 50H, 60H, 70H, and/or 80H described herein, can be utilized in and/or can appear in any of the reports, messages, alerts, alert messages, notification messages, or any other information, described herein as being generated by the apparatus 100 of the present invention.

The database 11H can also contain and/or include, for each user, individual, employee, independent contractor, freelancer, employer, hiring entity, counterparty, media provider, content provider, digital asset storage provider, educational institution, instructional institution, and/or social network provider, who or which utilizes the apparatus 100 of the present invention, information regarding any search criteria or alert or notification criteria of or associated with the respective user, individual, employee, independent contractor, freelancer, employer, hiring entity, counterparty, media provider, content provider, digital asset storage provider, educational institution, instructional institution, and/or social network provider. The database 11H can also contain and/or include, for each user, individual, employee, independent contractor, freelancer, employer, hiring entity, counterparty, media provider, content provider, digital asset storage provider, educational institution, instructional institution, and/or social network provider, who or which utilizes the apparatus 100 of the present invention, information regarding any alerts, alert messages, notifications, or notification messages, the subject matter or desired contents of same, and any other information regarding any requests to receive the same.

The databases 11H can also contain and/or include copies of any all recordings of videoconference calls, video and audio recordings, audio recordings, and/or any other communications which take place by and/or between any of the users, individuals, employees, independent contractors, freelancers, employers, hiring entities, counterparties, media providers, content providers, digital asset storage providers, educational institutions, instructional institutions, and/or social network providers, who or which utilize the apparatus 100 of the present invention.

The database 11H can also contain and/or include any data and/or information regarding any interactions, transactions, employment applications, submitted resumes, submitted proposals, interviews, conference calls, consultations, and/or any other activities, which take place by and between any of the users, individuals, employees, independent contractors, freelancers, employers, hiring entities, counterparties, media providers, content providers, digital asset storage providers, educational institutions, instructional institutions, and/or social network providers, who or which utilize the apparatus 100, and data and/or information regarding any considerations, outcomes, results, and/or decisions, relating to, or deriving or resulting from the same.

In a preferred embodiment, the database 11H can also contain and/or include any software programs, software algorithms, and/or software applications ("apps") deemed to be necessary, desirable, and/or useful, in utilizing the apparatus 100 and method of the present invention in the various embodiments described herein. In a preferred embodiment, the database 11H can also contain and/or include any other data and/or information deemed to be necessary, desirable, and/or useful, in utilizing the apparatus 100 and method of the present invention in the various embodiments described herein. The database 11H can also contain and/or include any other data and/or information which is or may be needed and/or desired in performing any and/or all of the features and/or functionality described herein as being provided by the apparatus 100 of the present invention and/or the central processing computer 11, and/or any of the herein-described user communication devices 20, employer communication devices 30, counterparty communication devices 40, media/content provider computers 50, digital assets/records storage computers 60, educational/instructional provider computers 70, and/or social networking computers 80.

The database 11H can also contain and/or include any other data and/or information which is or may be needed and/or desired in performing any and/or all of the features and/or functionality described herein as being provided by the apparatus 100 of the present invention and/or described herein as being provided by the central processing computer 10 and/or any of the communication devices or computers 20, 30, 40, 50, 60, 70, and/or 80. The database 11H can also contain and/or include any other data and/or information which is or may be stored in any of the herein-described databases 20H, 30H, 40H, 50H, 60H, 70H, and/or 80H.

The database 11H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices 11, 20, 30, 40, 50, 60, 70, and/or 80. The database 11H can also contain and/or include any other data and/or information which is, or may be, needed and/or desired in performing any and/or all of the features and/or functionality described herein as being provided by the apparatus 100 of the present invention and/or the central processing computer 11.

It is important to note, and it is to be understood, that the database 11H can contain and/or include any data and/or information which is described herein as be input into, received by, processed by, generated by, and/or transmitted from, the central procession computer(s) 11, and/or any of the herein-described user communication devices 20, employer communication devices 30, counterparty communication devices 40, media/content provider computers 50, digital assets/records storage computers 60, educational/instructional provider computers 70, and/or social networking computers 80.

The central processing computer 11 also includes an output device 11I for outputting any of the data, information, or reports, described herein or otherwise. In the preferred embodiment, the output device 11I can be a printer, a display, a transmitter, a modem, a speaker, and/or any other device which can be used to output data.

The central processing computer 11 can also include a video and/or audio recording device(s) 11J which can include a camera and/or a video recording device, for recording pictures or video and/or video clips, and/or a microphone or an audio recording device, for recording audio or audio clips, which can be recorded by, and/or transmitted live, by or from the central processing computer 11, or which can be recorded by, and stored at or in, the central processing computer 11 for transmission by or from the central processing computer 11 at a later time. The video and/or audio recording device(s) 11J can also be utilized to facilitate one-way broadcasts from the central processing computer 11, and/or can be utilized to facilitate video conferencing, video chatting, and/or audio conferencing, and/or video and audio conferencing, between users of the central processing computer 11 and any of the herein-described users, individuals, persons, or entities, who or which utilize the apparatus 100 of the present invention.

The central processing computer 11 can also include a global positioning device 11K. In a preferred embodiment, the global positioning device 11K determines or can determine a position or location of the central processing computer 11.

In a preferred embodiment, the central processing computer 11 can also be equipped, and/or can be programmed, for voice activation operation and/or voice control operation of and/or regarding any and/or all of the herein-described operations and functions which are capable of being performed by the central processing computer 11.

Figure 3:
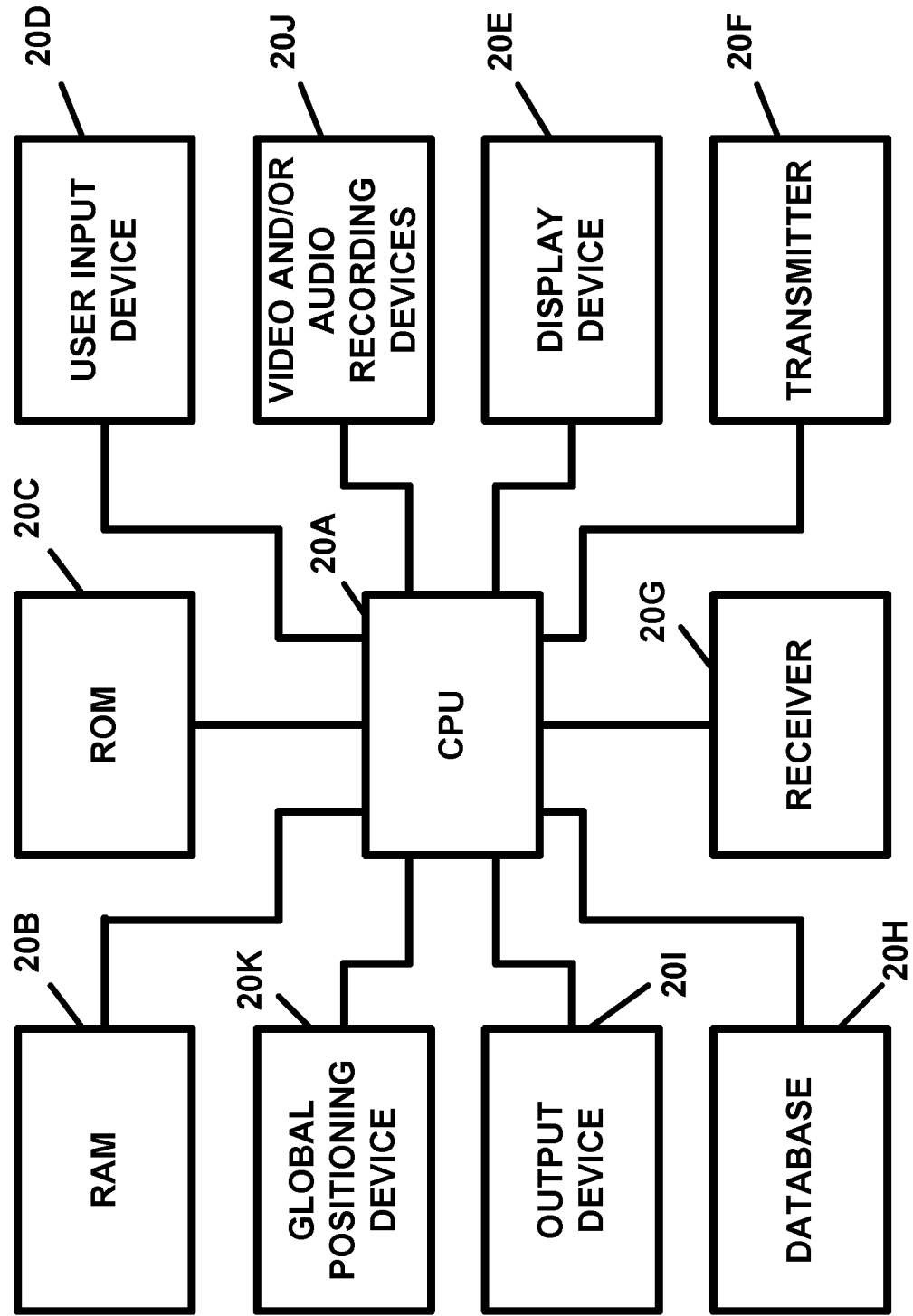
FIG. 3 illustrates the user communication device of FIG. 1, in block diagram form.

FIG. 3 illustrates the user communication device 20 of the apparatus 100, in block diagram form. The user communication device 20, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a user communication device 20. In the preferred embodiment, the user communication device 20 includes a central processing unit or CPU 20A, which, in the preferred embodiment, is a microprocessor. The CPU 20A can also be a microcomputer, a minicomputer, a macrocomputer, and/or a mainframe computer, depending upon the application.

The user communication device 20 also includes a random access memory device(s) 20B (RAM) and a read only memory device(s) 20C (ROM), each of which is connected to, or linked with, the CPU 20A, and a user input device 20D, for entering data and/or information and/or commands into the user communication device 20, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the user communication device 20. The user input device(s) 20D is/are also connected to, or linked with, the CPU 20A. The user communication device 20 also includes a display device 20E for displaying data and/or information to a user or individual. The display device 20E is also connected to, or linked with, the CPU 20A.

The user communication device 20 also includes a transmitter(s) 20F, for transmitting signals and/or data and/or information to any one or more of the central processing computer(s) 11, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or to any other user communication device(s) 20, and/or any other individual computer(s) or individual communication device(s) which may be utilized in conjunction with the apparatus 100 of the present invention. The transmitter 20F is also connected to, or linked with, the CPU 20A.

The user communication device 20 also includes a receiver 20G, for receiving signals and/or data and/or information from any one or more of the central processing computer(s) 11, the employer communication device(s) 30, the counterparty communication device(s) 40, the media/content provider computer(s) 50, the digital assets/records storage computer(s) 60, the educational/instructional provider computer(s) 70, and/or the social networking computer(s) 80, and/or from any other user communication device(s) 20, and/or any other individual computer(s) or individual communication device(s) which may be utilized in conjunction with the apparatus 100 of the present invention. The receiver 20G is also connected to, or linked with, the CPU 20A.

The user communication device 20 also includes a database(s) 20H which contains any and/or all of the data and/or information required, needed, or desired, for allowing and/or enabling the user communication device 20 and/or the apparatus 100 to perform any and/or all of the functions and functionalities described herein as being performed, and/or as capable of being performed, by the user communication device 20 and/or the apparatus 100. In this regard, and notwithstanding any specific examples of data and/or information described herein as being stored in the database 20H, it is to be understood that the database 20H contains and/or includes any and/or all data and/or information required, needed, or desired, for allowing and/or enabling the user communication device 20 and/or the apparatus 100 to perform any and/or all of the functions and functionalities described herein as being performed by the user communication device 30 and/or the apparatus 100 of the present invention.

In a preferred embodiment, the database 20H can contain and/or include any data and/or information regarding the user or individual, including, but not limited to, the name, sex, age, birth date, address, telephone number, cellular telephone number, text messaging number, videoconferencing or video chat identification (ID) name or number, email address, website address or uniform resource locator (url), and/or any other contact information, agent or representative contact information, of the user or individual. In a preferred embodiment, the database 20H can also contain and/or include educational and/or training information for or regarding the user or individual, educational or training transcripts or records of or for the user or individual, work experience and/or work history information for or regarding the user or individual, and/or any other data and/or information for or regarding the user or individual.

In a preferred embodiment, the database 20H can also include work schedule(s) and/or work calendar(s), including project schedules and/or calendars, work scheduling information, and/or work schedule information, for or regarding the user or individual. This data and/or information can also include information concerning when the user or individual may be in need of work or a project or assignment, and/or when the user or individual is or may be available to take a job, accept employment, or be available for a project or assignment. This data and/or information can also include information concerning when the user or individual is scheduled to work and/or when the user or individual is available to take work assignments.

In a preferred embodiment, the database 20H can also contain and/or include information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or content account(s), of, for, or associated with, the user or individual. In a preferred embodiment, the database 20H can also contain and/or include video recordings, video calls, video conference recordings, video chat recordings, audio recordings, telephone call recordings, video and audio recordings, photographs, pictures, and/or any records regarding any transactions or activities, involving, regarding, or relating to any interests of or regarding, the user or individual.

The database 20H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 20H can also contain and/or include any other data and/or information which is, or may be, needed and/or desired in performing any and/or all of the features and/or functionality described herein as being provided by the apparatus 100 of the present invention and/or the user communication device 20.

The user communication device 20 also includes an output device 20I for outputting any of the data, information, or reports, described herein or otherwise. In the preferred embodiment, the output device 20I can be a printer, a display, a transmitter, a modem, a speaker, and/or any other device which can be used to output data.

The user communication device 20 can also include a video and/or audio recording device(s) 20J which can include a camera and/or a video recording device, for recording pictures or video and/or video clips, and/or a microphone or an audio recording device, for recording audio or audio clips, which can be recorded by, and/or transmitted live, by or from the user communication device 20, or which can be recorded by, and stored at or in, the user communication device 20 for transmission by or from the user communication device 20 at a later time. The video and/or audio recording device(s) 20J can also be utilized to facilitate one-way broadcasts from the user communication device 20, and/or can be utilized to facilitate video conferencing, video chatting, and/or audio conferencing, and/or video and audio conferencing, between a user of the user communication device 20 and any of the herein-described users, individuals, persons, or entities, who or which utilize the apparatus 100 of the present invention.

The user communication device 20 can also include a global positioning device 20K. In a preferred embodiment, the global positioning device 20K determines or can determine a position or location of the user communication device 20.

In a preferred embodiment, the user communication device 20 can also be equipped, and/or can be programmed, for voice activation operation and/or voice control operation of and/or regarding any and/or all of the herein-described operations and functions which are capable of being performed by the user communication device 20.

Figure 4:
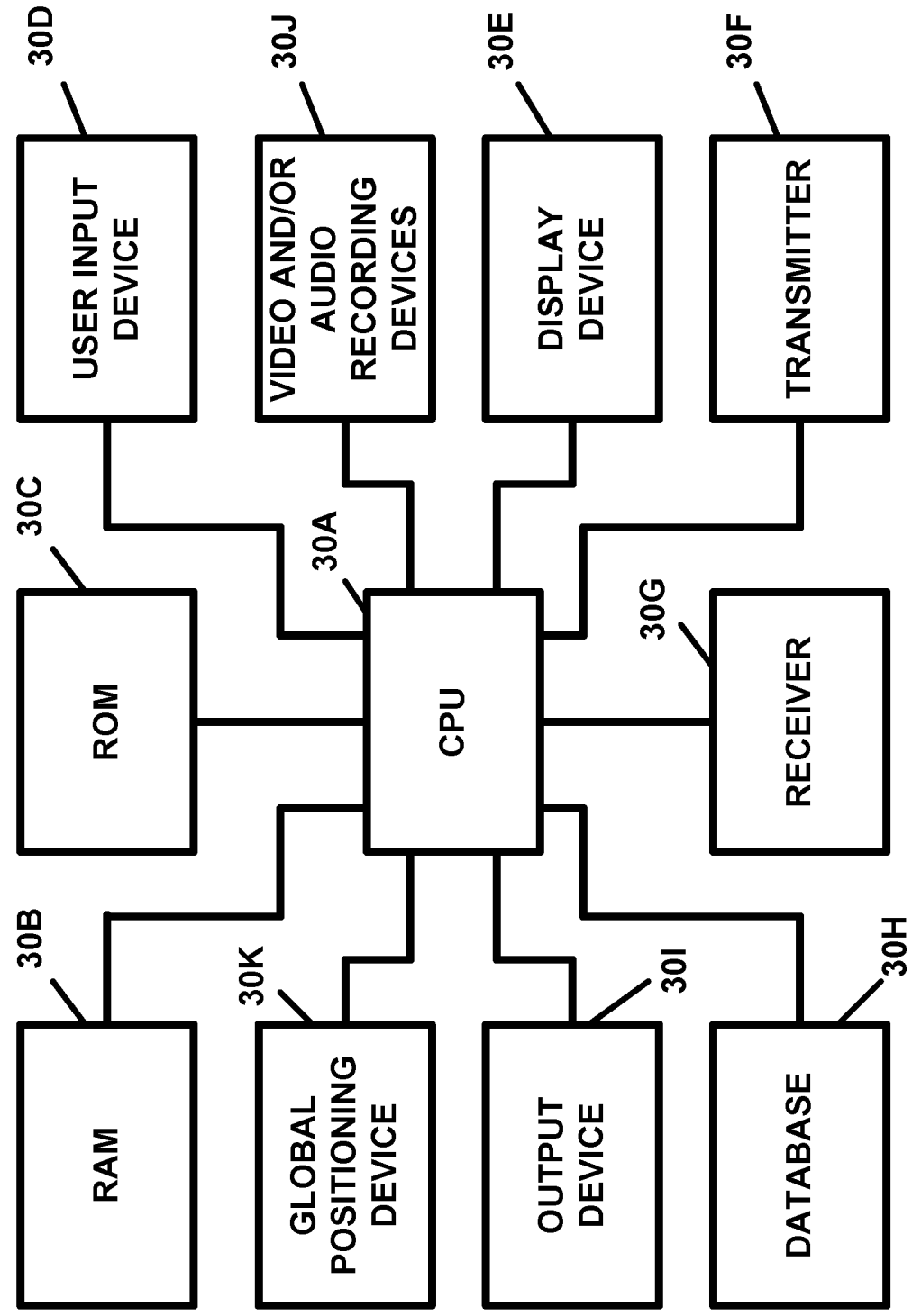
FIG. 4 illustrates the employer communication device of FIG. 1, in block diagram form.

FIG. 4 illustrates the employer communication device 30 of the apparatus 100, in block diagram form. The employer communication device 30, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as an employer communication device 30. In the preferred embodiment, the employer communication device 30 includes a central processing unit or CPU 30A, which, in the preferred embodiment, is a microprocessor. The CPU 30A can also be a microcomputer, a minicomputer, a macro-computer, and/or a mainframe computer, depending upon the application.

The employer communication device 30 also includes a random access memory device(s) 30B (RAM) and a read only memory device(s) 30C (ROM), each of which is connected to, or linked with, the CPU 30A, and a user input device 30D, for entering data and/or information and/or commands into the employer communication device 30, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the employer communication device 30. The user input device(s) 30D is/are also connected to, or linked with, the CPU 30A. The employer communication device 30 also includes a display device 30E for displaying data and/or information to a user or individual. The display device 30E is also connected to, or linked with, the CPU 30A.

The employer communication device 30 also includes a transmitter(s) 30F, for transmitting signals and/or data and/or information to any one or more of the central processing computer(s) 11, the user communication device(s) 20, the counterparty communication device(s) 40, the media/content provider computer(s) 50, the digital assets/records storage computer(s) 60, the educational/instructional provider computer(s) 70, and/or the social networking computer(s) 80, and/or to any other employer communication device(s) 30, and/or any other individual computer(s) or individual communication device(s) which may be utilized in conjunction with the apparatus 100 of the present invention. The transmitter 30F is also connected to, or linked with, the CPU 30A.

The employer communication device 30 also includes a receiver 30G, for receiving signals and/or data and/or information from any one or more of the central processing computer(s) 11, the user communication device(s) 20, the counterparty communication device(s) 40, the media/content provider computer(s) 50, the digital assets/records storage computer(s) 60, the educational/instructional provider computer(s) 70, and/or the social networking computer(s) 80, and/or to any other employer communication device(s) 30, and/or any other individual computer(s) or individual communication device(s) which may be utilized in conjunction with the apparatus 100 of the present invention. The receiver 30G is also connected to, or linked with, the CPU 30A.

The employer communication device 30 also includes a database(s) 30H which contains and/or includes any and/or all of the data and/or information required, needed, or desired, for allowing and/or enabling the employer communication device 30 and/or the apparatus 100 to perform any and/or all of the functions and functionalities described herein as being performed, and/or as capable of being performed, by the employer communication device 30 and/or the apparatus 100 of the present invention. In this regard, and notwithstanding any specific examples of data and/or information described herein as being stored in the database 30H, it is to be understood that the database 30H contains and/or includes any and/or all data and/or information required, needed, or desired, for allowing and/or enabling the employer communication device 30 and/or the apparatus 100 to perform any and/or all of the functions and functionalities described herein as being performed by the employer communication device 30 and/or the apparatus 100 of the present invention.

In a preferred embodiment, the database 30H can contain and/or include any data and/or information regarding the employer or hiring entity, including, but not limited to, the name, address, telephone number, cellular telephone number, text messaging number, videoconferencing or video chat identification (ID) name or number, email address, website address or uniform resource locator (url), and/or any other contact information, agent or representative contact information, of or regarding the employer or hiring entity.

In a preferred embodiment, the database 30H can contain and/or include information regarding and/or all employees, independent contractors, freelancers, or other individuals, who work for, or who are engaged by, the employer or hiring entity. In a preferred embodiment, the database 30H can contain and/or include information regarding job postings, job listings, project postings, project listings, request for proposals, requests for buds, or any other information regarding the employer or hiring entity. In a preferred embodiment, the database 30H can contain and/or include information regarding any job offerings, job openings, job(s) or position(s) needed to be filled, job(s) or position(s) desired to be filled, employer size, employer location, regional location, jobs or positions employed, benefits offered, employer history, salary information, compensation information, customer information, supplier information, information from past employees, information from current employees, past and/or current employment agencies or recruiters representing the employer, types of positions, including, but not limited to, permanent and/or temporary positions, references, pictures of facilities, video clips, fringe benefits, work hours, work requirements, recommendation letters, salary and/or compensation information, of or regarding the employer or hiring entity.

In a preferred embodiment, the database 30H can also include work schedule(s) and/or work calendar(s), including project schedules and/or calendars, work scheduling information, and/or work schedule information, for or regarding the employer or hiring entity. This data and/or information can also include information concerning when the employer or hiring entity may be in need of individuals, independent contractors, and/or freelancers, and/or when the employer and/or hiring entity may not be in need of same.

In a preferred embodiment, the database 30H can also contain and/or include any recruitment information, candidate search information, and/or other information for enabling or allowing the employer or hiring entity to recruit or locate new hires, employees, independent contractors, or freelancers, for any of their recruitment or manpower needs.

In a preferred embodiment, the database 30H can also contain and/or include information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or or content account(s), of, for, or associated with, the employer or hiring entity. In a preferred embodiment, the database 30H can also contain and/or include video recordings, video calls, video conference recordings, video chat recordings, audio recordings, telephone call recordings, video and audio recordings, photographs, pictures, and/or any records regarding any transactions or activities, involving, regarding, or relating to any interests of or regarding, the employer or hiring entity.

The database 30H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 30H can also contain and/or include any other data and/or information which is, or may be, needed and/or desired in performing any and/or all of the features and/or functionality described herein as being provided by the apparatus 100 of the present invention and/or the employer communication device 30.

The employer communication device 30 also includes an output device 30I for outputting any of the data, information, or reports, described herein or otherwise. In the preferred embodiment, the output device 30I can be a printer, a display, a transmitter, a modem, a speaker, and/or any other device which can be used to output data.

The employer communication device 30 can also include a video and/or audio recording device(s) 30J which can include a camera and/or a video recording device, for recording pictures or video and/or video clips, and/or a microphone or an audio recording device, for recording audio or audio clips, which can be recorded by, and/or transmitted live, by or from the employer communication device 30, or which can be recorded by, and stored at or in, the employer communication device 30 for transmission by or from the employer communication device 30 at a later time. The video and/or audio recording device(s) 30J can also be utilized to facilitate one-way broadcasts from the employer communication device 30, and/or can be utilized to facilitate video conferencing, video chatting, and/or audio conferencing, and/or video and audio conferencing, between a user of the employer communication device 30 and any of the herein-described users, individuals, persons, or entities, who or which utilize the apparatus 100 of the present invention.

The employer communication device 30 can also include a global positioning device 30K. In a preferred embodiment, the global positioning device 30K determines or can determine a position or location of the employer communication device 30.

In a preferred embodiment, the employer communication device 30 can also be equipped, and/or can be programmed, for voice activation operation and/or voice control operation of and/or regarding any and/or all of the herein-described operations and functions which are capable of being performed by the employer communication device 30.

Figure 5:
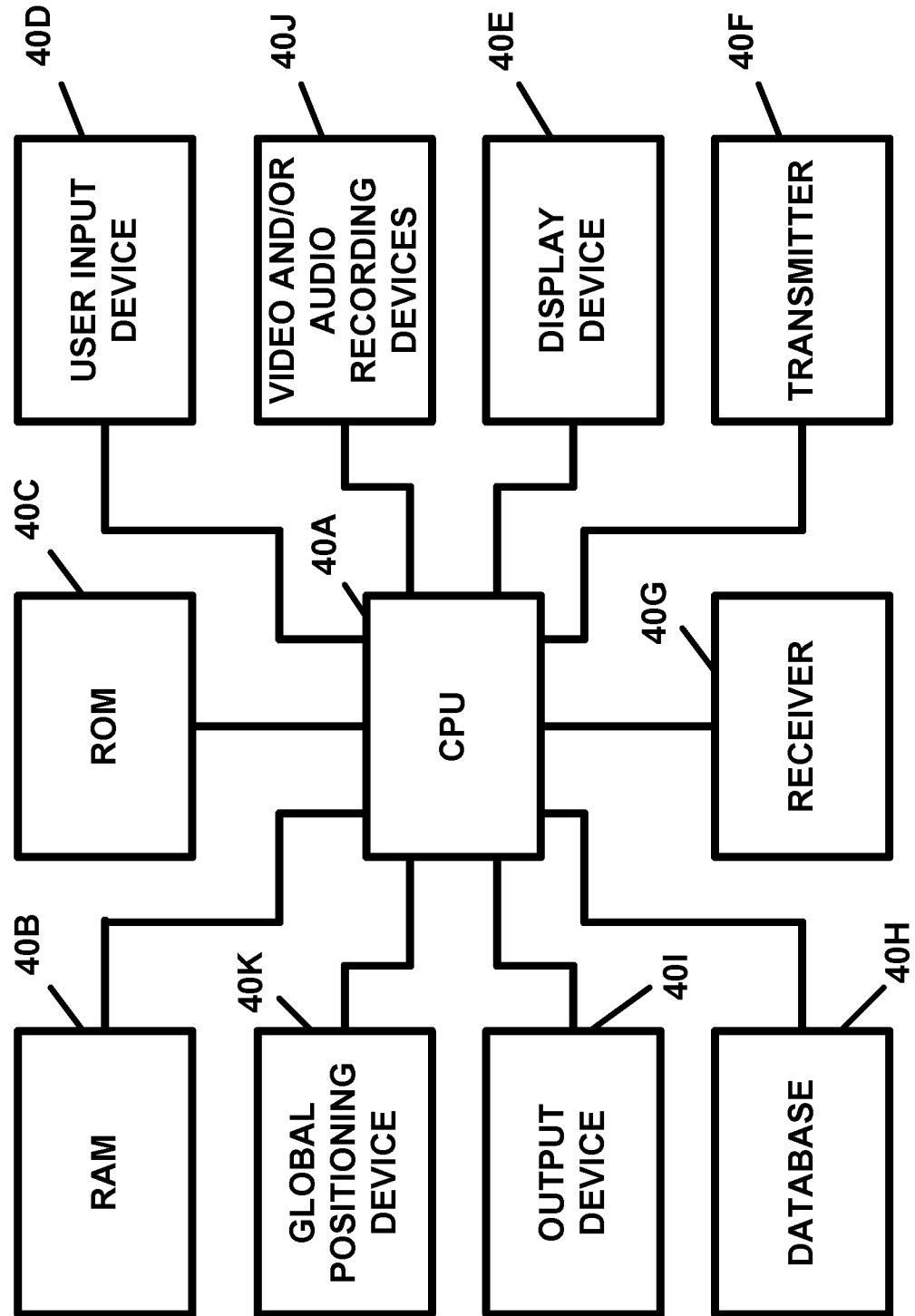
FIG. 5 illustrates the counterparty communication device of FIG. 1, in block diagram form.

FIG. 5 illustrates the counterparty communication device 40 of the apparatus 100, in block diagram form. The counterparty communication device 40, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a counterparty communication device 40. In the preferred embodiment, the counterparty communication device 40 includes a central processing unit or CPU 40A, which, in the preferred embodiment, is a microprocessor. The CPU 40A can also be a microcomputer, a minicomputer, a macro-computer, and/or a mainframe computer, depending upon the application.

The counterparty communication device 40 also includes a random access memory device(s) 40B (RAM) and a read only memory device(s) 40C (ROM), each of which is connected to, or linked with, the CPU 40A, and a user input device 40D, for entering data and/or information and/or commands into the counterparty communication device 40, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the counterparty communication device 40. The user input device(s) 40D is/are also connected to, or linked with, the CPU 40A. The counterparty communication device 40 also includes a display device 40E for displaying data and/or information to a user or individual. The display device 40E is also connected to, or linked with, the CPU 40A.

The counterparty communication device 40 also includes a transmitter(s) 40F, for transmitting signals and/or data and/or information to any one or more of the central processing computer(s) 11, the user communication device(s) 20, the employer communication device(s) 30, the media/content provider computer(s) 50, the digital assets/records storage computer(s) 60, the educational/instructional provider computer(s) 70, and/or the social networking computer(s) 80, and/or to any other counterparty communication device(s) 40, and/or any other individual computer(s) or individual communication device(s) which may be utilized in conjunction with the apparatus 100 of the present invention. The transmitter 40F is also connected to, or linked with, the CPU 40A.

The counterparty communication device 40 also includes a receiver 40G, for receiving signals and/or data and/or information from any one or more of the central processing computer(s) 11, the user communication device(s) 20, the employer communication device(s) 30, the media/content provider computer(s) 50, the digital assets/records storage computer(s) 60, the educational/instructional provider computer(s) 70, and/or the social networking computer(s) 80, and/or to any other counterparty communication device(s) 40, and/or any other individual computer(s) or individual communication device(s) which may be utilized in conjunction with the apparatus 100 of the present invention. The receiver 40G is also connected to, or linked with, the CPU 40A.

The counterparty communication device 40 also includes a database(s) 40H which contains any and/or all of the data and/or information required, needed, or desired, for allowing and/or enabling the counterparty communication device 40 and/or the apparatus 100 to perform any and/or all of the functions and functionalities described herein as being performed, and/or as capable of being performed, by the counterparty communication device 40 and/or the apparatus 100 of the present invention. In this regard, and notwithstanding any specific examples of data and/or information described herein as being stored in the database 40H, it is to be understood that the database 40H contains and/or includes any and/or all data and/or information required, needed, or desired, for allowing and/or enabling the counterparty communication device 40 and/or the apparatus 100 to perform any and/or all of the functions and functionalities described herein as being performed by the counterparty communication device 40 and/or the apparatus 100 of the present invention.

In a preferred embodiment, the database 40H can contain and/or include any data and/or information regarding the counterparty, including, but not limited to, the name, sex, age, birth date, address, telephone number, cellular telephone number, text messaging number, videoconferencing or video chat identification (ID) name or number, email address, website address or uniform resource locator (url), and/or any other contact information, agent or representative contact information, of the counterparty. In a preferred embodiment, the database 40H can also contain and/or include information regarding any digital asset account(s), digital memorabilia account(s), a digital souvenir account(s), or any other digital account(s), instructional record(s), instructional records account(s), educational record(s), and/or educational records account(s), educational or instructional account(s), media account(s), and/or content account(s), of, for, or associated with, the counterparty. In a preferred embodiment, the database 40H can also contain and/or include video recordings, video calls, video conference recordings, video chat recordings, audio recordings, telephone call recordings, video and audio recordings, photographs, pictures, and/or any records regarding any transactions or activities, involving, regarding, or relating to any interests of or regarding, the counterparty.

The database 40H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 40H can also contain and/or include any other data and/or information which is, or may be, needed and/or desired in performing any and/or all of the features and/or functionality described herein as being provided by the apparatus 100 of the present invention and/or the counterparty communication device 40.

The counterparty communication device 40 also includes an output device 40I for outputting any of the data, information, or reports, described herein or otherwise. In the preferred embodiment, the output device 40I can be a printer, a display, a transmitter, a modem, a speaker, and/or any other device which can be used to output data.

The counterparty communication device 40 can also include a video and/or audio recording device(s) 40J which can include a camera and/or a video recording device, for recording pictures or video and/or video clips, and/or a microphone or an audio recording device, for recording audio or audio clips, which can be recorded by, and/or transmitted live, by or from the counterparty communication device 40, or which can be recorded by, and stored at or in, the counterparty communication device 40 for transmission by or from the counterparty communication device 40 at a later time. The video and/or audio recording device(s) 40J can also be utilized to facilitate one-way broadcasts from the counterparty communication device 40, and/or can be utilized to facilitate video conferencing, video chatting, and/or audio conferencing, and/or video and audio conferencing, between a user of the counterparty communication device 40 and any of the herein-described users, individuals, persons, or entities, who or which utilize the apparatus 100 of the present invention.

The counterparty communication device 40 can also include a global positioning device 40K. In a preferred embodiment, the global positioning device 40K determines or can determine a position or location of the counterparty communication device 40.

In a preferred embodiment, the counterparty communication device 40 can also be equipped, and/or can be programmed, for voice activation operation and/or voice control operation of and/or regarding any and/or all of the herein-described operations and functions which are capable of being performed by the counterparty communication device 40.

Figure 6:
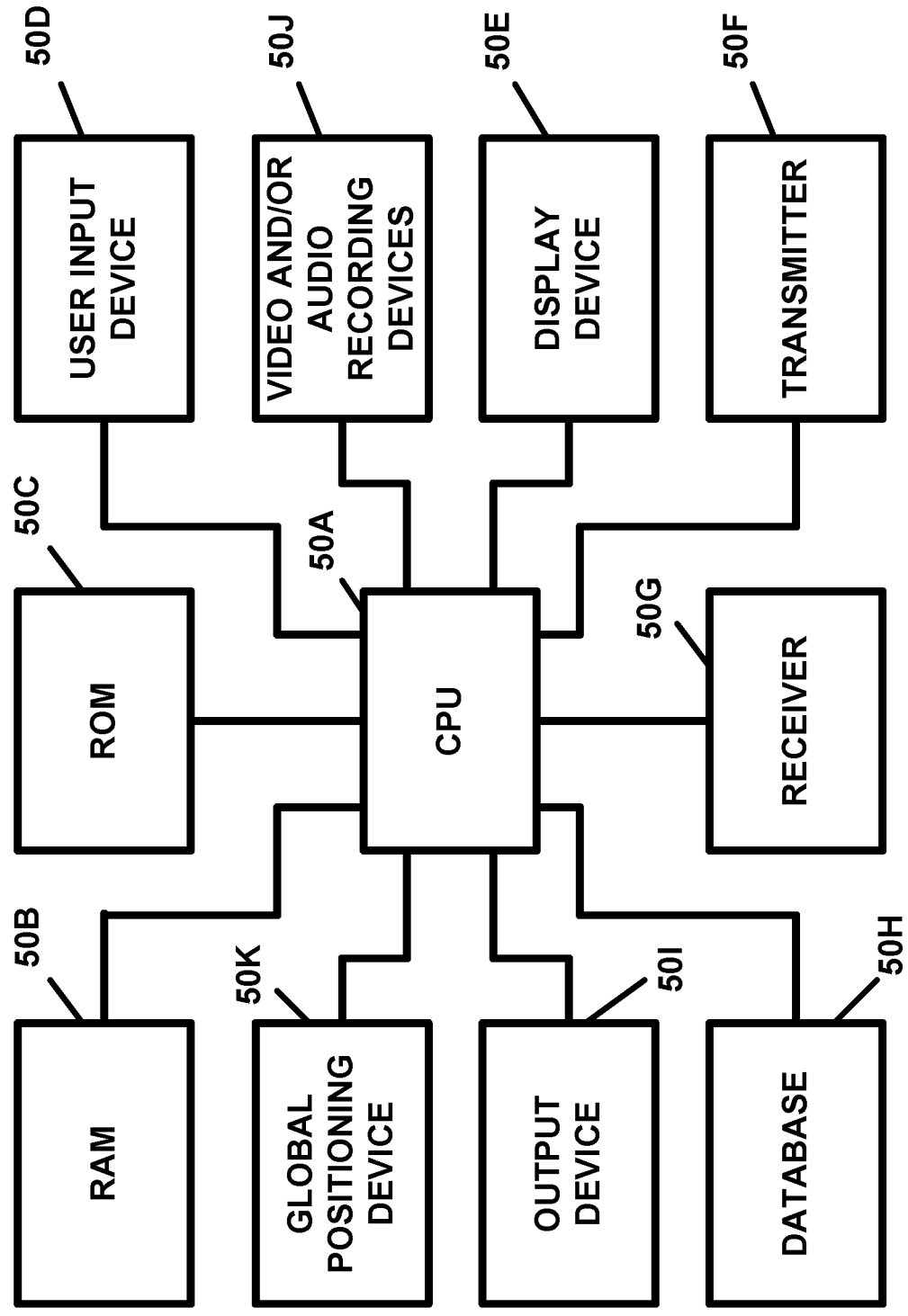
FIG. 6 illustrates the media/content provider computer of FIG. 1, in block diagram form.

FIG. 6 illustrates the media/content provider computer 50 of the apparatus 100, in block diagram form. The media/content provider computer 50, in the preferred embodiment, can be a computer or computer system, a server computer, a network computer, or any other communication device, which can provide the functionality of, and which can be utilized as a media/content provider computer 50, such as an Internet server computer and/or a web site server computer. The media/content provider computer 50, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a media/content provider computer 50. In the preferred embodiment, the media/content provider computer 50 includes a central processing unit or CPU 50A, which, in the preferred embodiment, is a microprocessor. The CPU 50A can also be a microcomputer, a minicomputer, a macro-computer, and/or a mainframe computer, depending upon the application.

The media/content provider computer 50 also includes a random access memory device(s) 50B (RAM) and a read only memory device(s) 50C (ROM), each of which is connected to, or linked with, the CPU 50A, and a user input device 50D, for entering data and/or information and/or commands into the media/content provider computer 50, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the media/content provider computer 50. The user input device(s) 50D is/are also connected to, or linked with, the CPU 50A. The media/content provider computer 50 also includes a display device 50E for displaying data and/or information to a user or individual. The display device 50E is also connected to, or linked with, the CPU 50A.

The media/content provider computer 50 also includes a transmitter(s) 50F, for transmitting signals and/or data and/or information to any one or more of the central processing computer(s) 11, the user communication device(s) 20, the employer communication device(s) 30, the counterparty communication device(s) 40, the digital assets/records storage computer(s) 60, the educational/instructional provider computer(s) 70, and/or the social networking computer(s) 80, and/or to any other media/content provider computer(s) 50, and/or any other individual computer(s) or individual communication device(s) which may be utilized in conjunction with the apparatus 100 of the present invention. The transmitter 50F is also connected to, or linked with, the CPU 50A.

The media/content provider computer 50 also includes a receiver 50G, for receiving signals and/or data and/or information from any one or more of the central processing computer(s) 11, the user communication device(s) 20, the employer communication device(s) 30, the counterparty communication device(s) 40, the digital assets/records storage computer(s) 60, the educational/instructional provider computer(s) 70, and/or the social networking computer(s) 80, and/or to any other media/content provider computer(s) 50, and/or any other individual computer(s) or individual communication device(s) which may be utilized in conjunction with the apparatus 100 of the present invention. The receiver 50G is also connected to, or linked with, the CPU 50A.

The media/content provider computer 50 also includes a database(s) 50H which contains and/or includes any and/or all of the data and/or information required, needed, or desired, for allowing and/or enabling the media/content provider computer 50 and/or the apparatus 100 to perform any and/or all of the functions and functionalities described herein as being performed, and/or as capable of being performed, by the media/content provider computer 50 and/or the apparatus 100 of the present invention. In this regard, and notwithstanding any specific examples of data and/or information described herein as being stored in the database 50H, it is to be understood that the database 50H contains or includes any and/or all data and/or information required, needed, or desired, for allowing and/or enabling the media/content provider computer 50 and/or the apparatus 100 to perform any and/or all of the functions and functionalities described herein as being performed by the media/content provider computer 50 and/or the apparatus 100 of the present invention.

In a preferred embodiment, the database 50H can contain and/or include, and/or can be linked to or with, any media content, entertainment content, educational content, instructional content, news content, recruitment content, recruitment news content, job searching content, job searching news content, advertising content, marketing content, promotional content, and/or any other content, which can be in text content, video content, audio content, and/or video and audio content, which can be provided by the apparatus 100 of the present invention. The databases 50H can also contain and/or include any data and/or information, or any link to same, which can be offered or provided by any provider or media content providers or content providers of any type or kind.

The database 50H can also contain and/or include information regarding any media account(s) or content account(s) assigned to, or associated with, each party, user, individual, independent contractor, freelancer, employer, or hiring entity. In the preferred embodiment, each respective party, user, individual, independent contractor, freelancer, employer, or hiring entity, can requested or otherwise be provided with media content or any other content, and/or can subscribe to same. Information regarding the media content or other content requested by, provided to, and/or or subscribed to by, each respective party, user, individual, independent contractor, freelancer, employer, or hiring entity, can be stored in the respective media account(s) or content account(s) of, for, or associated with, the respective party, user, individual, independent contractor, freelancer, employer, or hiring entity.

In a preferred embodiment, each media provider or content provider can provide media or content via the apparatus 100 to each respective party, user, individual, independent contractor, freelancer, employer, or hiring entity. In a preferred embodiment, each respective party, user, individual, independent contractor, freelancer, employer, or hiring entity, can have a media account or a content account for each respective media provider or content provider from which the respective party, user, individual, independent contractor, freelancer, employer, or hiring entity, is provided media content or other content. Information regarding any and/or all media accounts and/or content accounts associated with each party, user, individual, independent contractor, freelancer, employer, or hiring entity, can be stored in the database 50H.

The database 50H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 50H can also contain and/or include any other data and/or information which is, or may be, needed and/or desired in performing any and/or all of the features and/or functionality described herein as being provided by the apparatus 100 of the present invention and/or the media/content provider computer 50.

The media/content provider computer 50 also includes an output device 50I for outputting any of the data, information, or reports, described herein or otherwise. In the preferred embodiment, the output device 50I can be a printer, a display, a transmitter, a modem, a speaker, and/or any other device which can be used to output data.

The media/content provider computer 50 can also include a video and/or audio recording device(s) 50J which can include a camera and/or a video recording device, for recording pictures or video and/or video clips, and/or a microphone or an audio recording device, for recording audio or audio clips, which can be recorded by, and/or transmitted live, by or from the media/content provider computer 50, or which can be recorded by, and stored at or in, the media/content provider computer 50 for transmission by or from the media/content provider computer 50 at a later time. The video and/or audio recording device(s) 50J can also be utilized to facilitate one-way broadcasts from the media/content provider computer 50, and/or can be utilized to facilitate video conferencing, video chatting, and/or audio conferencing, and/or video and audio conferencing, between a user of the media/content provider computer 50 and any of the herein-described users, individuals, persons, or entities, who or which utilize the apparatus 100 of the present invention.

The media/content provider computer 50 can also include a global positioning device 50K. In a preferred embodiment, the global positioning device 50K determines or can determine a position or location of the media/content provider computer 50.

In a preferred embodiment, the media/content provider computer 50 can also be equipped, and/or can be programmed, for voice activation operation and/or voice control operation of and/or regarding any and/or all of the herein-described operations and functions which are capable of being performed by the media/content provider computer 50.

Figure 7:
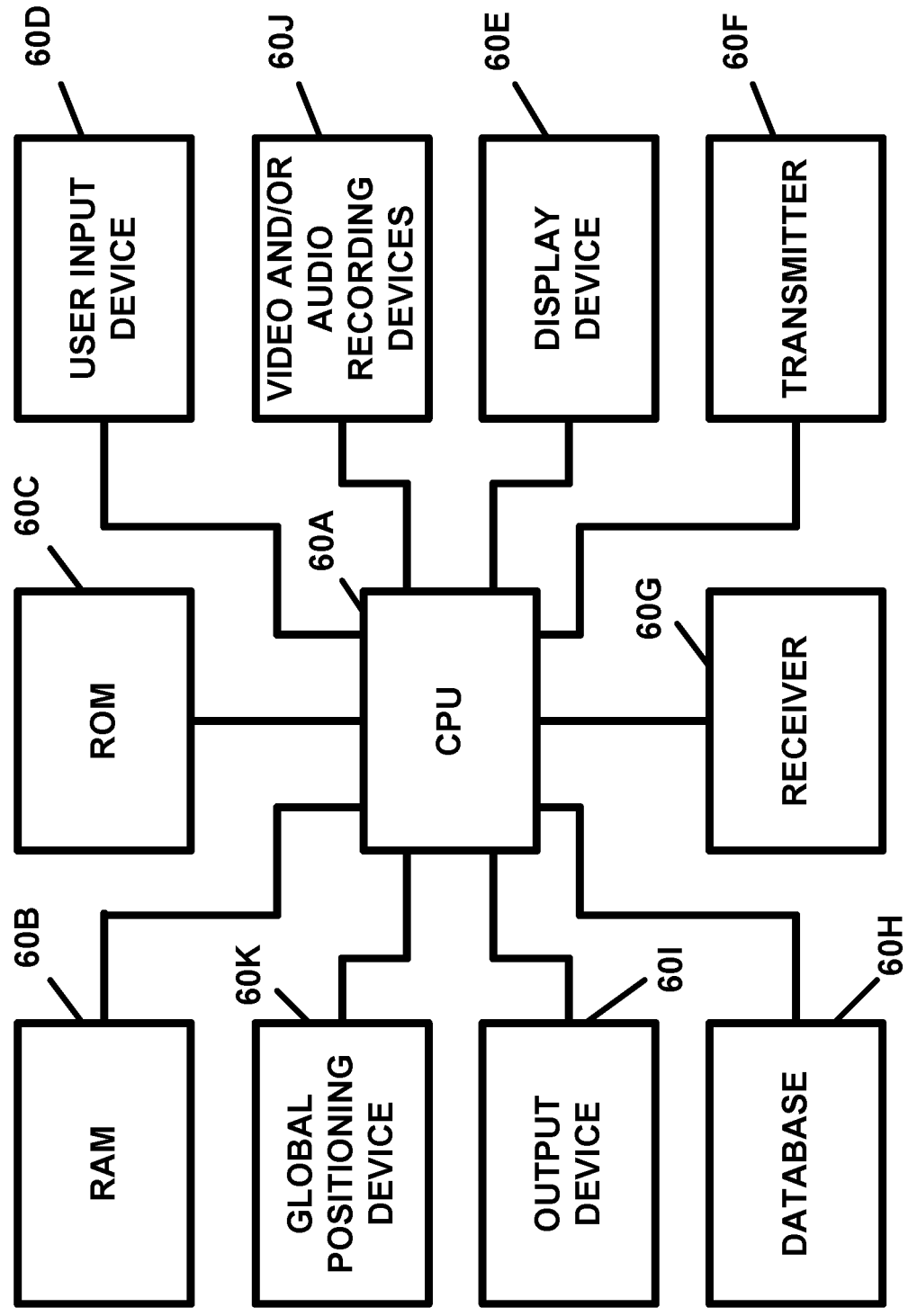
FIG. 7 illustrates the digital assets/records storage computer of FIG. 1, in block diagram form.

FIG. 7 illustrates the digital assets/records storage computer 60 of the apparatus 100, in block diagram form. The digital assets/records storage computer 60, in the preferred embodiment, can be a computer or computer system, a server computer, a network computer, or any other communication device, which can provide the functionality of, and which can be utilized as a digital assets/records storage computer 60, such as an Internet server computer and/or a web site server computer. The digital assets/records storage computer 60, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a digital assets/records storage computer 60. In the preferred embodiment, the digital assets/records storage computer 60 includes a central processing unit or CPU 60A, which, in the preferred embodiment, is a microprocessor. The CPU 60A can also be a microcomputer, a minicomputer, a macro-computer, and/or a mainframe computer, depending upon the application.

The digital assets/records storage computer 60 also includes a random access memory device(s) 60B (RAM) and a read only memory device(s) 60C (ROM), each of which is connected to, or linked with, the CPU 60A, and a user input device 60D, for entering data and/or information and/or commands into the digital assets/records storage computer 60, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the digital assets/records storage computer 60. The user input device(s) 60D is/are also connected to, or linked with, the CPU 60A. The digital assets/records storage computer 60 also includes a display device 60E for displaying data and/or information to a user or individual. The display device 60E is also connected to, or linked with, the CPU 60A.

The digital assets/records storage computer 60 also includes a transmitter(s) 60F, for transmitting signals and/or data and/or information to any one or more of the central processing computer(s) 11, the user communication device(s) 20, the employer communication device(s) 30, the counterparty communication device(s) 40, the media/content provider computer(s) 50, the educational/instructional provider computer(s) 70, and/or the social networking computer(s) 80, and/or to any other digital assets/records storage computer(s) 60, and/or any other individual computer(s) or individual communication device(s) which may be utilized in conjunction with the apparatus 100 of the present invention. The transmitter 60F is also connected to, or linked with, the CPU 60A.

The digital assets/records storage computer 60 also includes a receiver 60G, for receiving signals and/or data and/or information from any one or more of the central processing computer(s) 11, the user communication device(s) 20, the employer communication device(s) 30, the counterparty communication device(s) 40, the media/content provider computer(s) 50, the educational/instructional provider computer(s) 70, and/or the social networking computer(s) 80, and/or to any other digital assets/records storage computer(s) 60, and/or any other individual computer(s) or individual communication device(s) which may be utilized in conjunction with the apparatus 100 of the present invention. The receiver 60G is also connected to, or linked with, the CPU 60A.

The digital assets/records storage computer 60 also includes a database(s) 60H which contains any and/or all of the data and/or information required, needed, or desired, for allowing and/or enabling the digital assets/records storage computer 60 and/or the apparatus 100 to perform any and/or all of the functions and functionalities described herein as being performed, and/or as capable of being performed, by the digital assets/records storage computer 60 and/or the apparatus 100 of the present invention. In this regard, and notwithstanding any specific examples of data and/or information described herein as being stored in the database 60H, it is to be understood that the database 60H contains or includes any and/or all data and/or information required, needed, or desired, for allowing and/or enabling the digital assets/records storage computer 60 and/or the apparatus 100 to perform any and/or all of the functions and functionalities described herein as being performed by the digital assets/records storage computer 60 and/or the apparatus 100 of the present invention.

The digital assets/records storage computer 60 also includes a database 60H which can include, for each user, individual, independent contractor, freelancer, employer, or hiring entity, who or which utilizes the apparatus 100 and method of the present invention, information regarding the respective user's, individual's, independent contractor's, freelancer's, employer's, or hiring entity's, name, sex, age, birth date, address, telephone number, cellular telephone number, text messaging number, videoconferencing or video chat identification (ID) name or number, email address, website address or uniform resource locator (url), and/or any other contact information, agent or representative contact information, and/or digital asset account information.

In a preferred embodiment, a digital asset account can be utilized to digitally store and/or to safeguard, assets of any type or kind for a user, individual, independent contractor, freelancer, employer, or hiring entity. In a preferred embodiment, the assets can include, among other things, monetary assets, currency assets, cryptocurrency assets, non-monetary assets, and/or any other assets which can be used to effectuate payment for services rendered, or to be rendered, by any user, individual, independent contractor, freelancer, employer, or hiring entity, who or which utilizes the apparatus 100 of the present invention. In a preferred embodiment, any of the monetary assets, currency assets, cryptocurrency assets, non-monetary assets, and/or any other assets, can be used to effectuate a payment to a respective party, user, individual, independent contractor, freelancer, employer, or hiring entity, or to receive a payment from a respective party, user, individual, independent contractor, freelancer, employer, or hiring entity.

In a preferred embodiment, the assets can also include any of the herein described, memorabilia, digital memorabilia, souvenirs, digital souvenirs, video recordings, video and audio recordings, pictures, photographs, autographs, digital autographs, and/or any other items or things have a memorabilia, nostalgic, or sentimental, value to any user, individual, independent contractor, freelancer, employer, or hiring entity. In a preferred embodiment, any of the herein described, memorabilia, digital memorabilia, souvenirs, digital souvenirs, video recordings, video and audio recordings, photographs, pictures, autographs, digital autographs, and/or any other items or things which have a memorabilia, nostalgic, or sentimental, value, can also be stored in a digital memorabilia account, a digital souvenir account, or any other digital account for storing things and/or items having nostalgic or sentimental value, each of which accounts can be stand alone accounts or can be stored in, or as a component account of, or sub-account of, a respective digital asset account of, for, or associated with, any user, individual, independent contractor, freelancer, employer, or hiring entity.

In a preferred embodiment, the database 60H can contain and/or include, for each digital asset account, and/or for each digital memorabilia account, digital souvenir account, or any other digital account, held by, owned by, or associated with, a respective user, individual, independent contractor, freelancer, employer, or hiring entity, data and/or information regarding each asset held by the respective user, individual, independent contractor, freelancer, employer, or hiring entity, and for each asset, data and/or information regarding the name of the asset the date the asset was acquired, a description of the asset, an assigned value for the asset, and/or any other information regarding the asset. In a preferred embodiment, the digital asset account can also include information regarding currencies or cryptocurrencies which can be used by a respective user, individual, independent contractor, freelancer, employer, or hiring entity, to make a payment to another respective user, individual, independent contractor, freelancer, employer, or hiring entity. In another preferred embodiment, the digital asset account can also include information regarding currencies or cryptocurrencies which can represent, or include, a payment or payments received by a respective user, individual, independent contractor, freelancer, employer, or hiring entity, from another respective user, individual, independent contractor, freelancer, employer, or hiring entity.

The database 60H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 60H can also contain and/or include any other data and/or information which is, or may be, needed and/or desired in performing any and/or all of the features and/or functionality described herein as being provided by the apparatus 100 of the present invention and/or the digital assets/records storage computer 60.

The digital assets/records storage computer 60 also includes an output device 60I for outputting any of the data, information, or reports, described herein or otherwise. In the preferred embodiment, the output device 60I can be a printer, a display, a transmitter, a modem, a speaker, and/or any other device which can be used to output data.

The digital assets/records storage computer 60 can also include a video and/or audio recording device(s) 60J which can include a camera and/or a video recording device, for recording pictures or video and/or video clips, and/or a microphone or an audio recording device, for recording audio or audio clips, which can be recorded by, and/or transmitted live, by or from the digital assets/records storage computer 60, or which can be recorded by, and stored at or in, the digital assets/records storage computer 60 for transmission by or from the digital assets/records storage computer 60 at a later time. The video and/or audio recording device(s) 60J can also be utilized to facilitate one-way broadcasts from the digital assets/records storage computer 60, and/or can be utilized to facilitate video conferencing, video chatting, and/or audio conferencing, and/or video and audio conferencing, between a user of the digital assets/records storage computer 60 and any of the herein-described users, individuals, persons, or entities, who or which utilize the apparatus 100 of the present invention.

The digital assets/records storage computer 60 can also include a global positioning device 60K. In a preferred embodiment, the global positioning device 60K determines or can determine a position or location of the digital assets/records storage computer 60.

Figure 8:
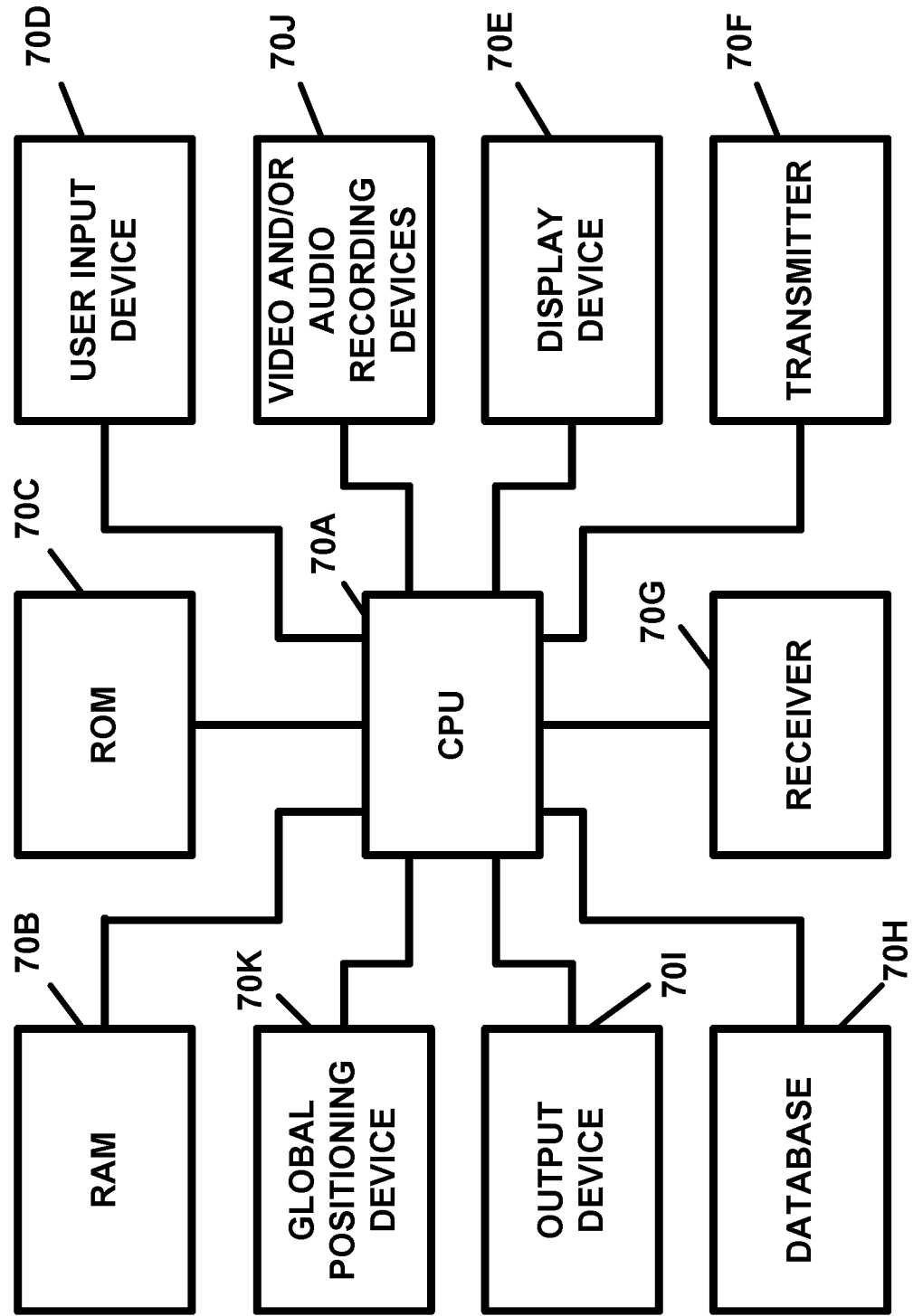
FIG. 8 illustrates the educational/instructional provider computer of FIG. 1, in block diagram form.
Figure 9:
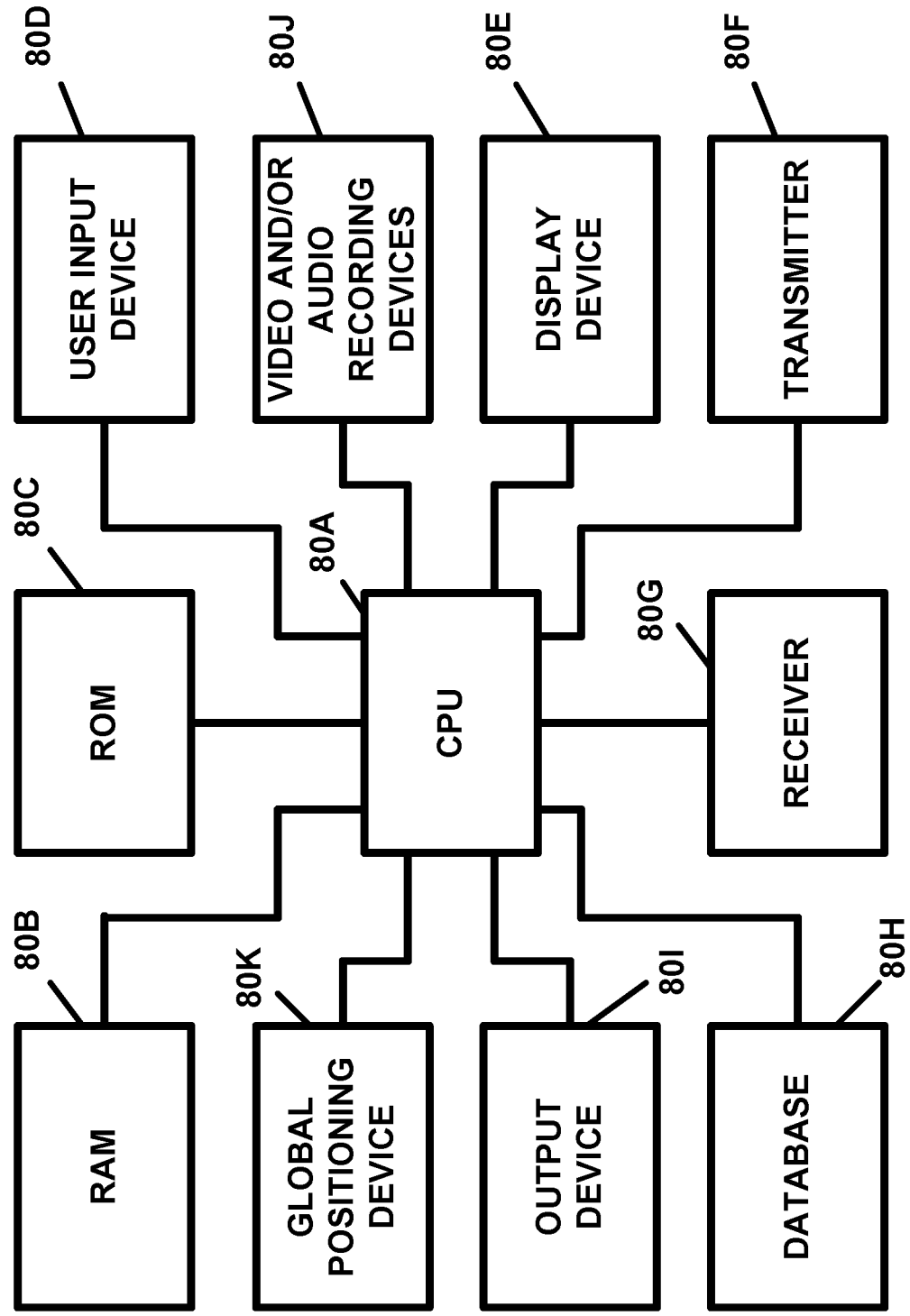
FIG. 9 illustrates the social networking computer of FIG. 1, in block diagram form.

In a preferred embodiment, the digital assets/records storage computer 60 can also be equipped, and/or can be programmed, for voice activation operation and/or voice control operation of and/or regarding any and/or all of the herein-described operations and functions which are capable of being performed by the digital assets/records storage computer 60. FIG. 8 illustrates the educational/instructional provider computer 70 of the apparatus 100, in block diagram form. The educational/instructional provider computer 70, in the preferred embodiment, can be a computer or computer system, a server computer, a network computer, or any other communication device, which can provide the functionality of, and which can be utilized as an educational/instructional provider computer 70, such as an Internet server computer and/or a web site server computer. The educational/instructional provider computer 70, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as an educational/instructional provider computer 70. In the preferred embodiment, the educational/instructional provider computer 70 includes a central processing unit or CPU 70A, which, in the preferred embodiment, is a microprocessor. The CPU 70A can also be a microcomputer, a minicomputer, a macrocomputer, and/or a mainframe computer, depending upon the application.

The educational/instructional provider computer 70 also includes a random access memory device(s) 70B (RAM) and a read only memory device(s) 70C (ROM), each of which is connected to, or linked with, the CPU 70A, and a user input device 70D, for entering data and/or information and/or commands into the educational/instructional provider computer 70, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the educational/instructional provider computer 70. The user input device(s) 70D is/are also connected to, or linked with, the CPU 70A. The educational/instructional provider computer 70 also includes a display device 70E for displaying data and/or information to a user or individual. The display device 70E is also connected to, or linked with, the CPU 70A.

The educational/instructional provider computer 70 also includes a transmitter(s) 70F, for transmitting signals and/or data and/or information to any one or more of the central processing computer(s) 11, the user communication device(s) 20, the employer communication device(s) 30, the counterparty communication device(s) 40, the media/content provider computer(s) 50, the digital assets/records storage computer(s) 60, and/or the social networking computer (s) 80, and/or to any other educational/instructional provider computer(s) 70, and/or any other individual computer(s) or individual communication device(s) which may be utilized in conjunction with the apparatus 100 of the present invention. The transmitter 70F is also connected to, or linked with, the CPU 70A.

The educational/instructional provider computer 70 also includes a receiver 70G, for receiving signals and/or data and/or information from any one or more of the central processing computer(s) 11, the user communication device(s) 20, the employer communication device(s) 30, the counterparty communication device(s) 40, the media/content provider computer(s) 50, the digital assets/records storage computer(s) 60, and/or the social networking computer(s) 80, and/or to any other educational/instructional provider computer(s) 70, and/or any other individual computer(s) or individual communication device(s) which may be utilized in conjunction with the apparatus 100 of the present invention. The receiver 70G is also connected to, or linked with, the CPU 70A.

The educational/instructional provider computer 70 also includes a database(s) 70H which contains any and/or all of the data and/or information required, needed, or desired, for allowing and/or enabling the educational/instructional provider computer 70 and/or the apparatus 100 to perform any and/or all of the functions and functionalities described herein as being performed, and/or as capable of being performed, by the educational/instructional provider computer 70 and/or the apparatus 100 of the present invention. In this regard, and notwithstanding any specific examples of data and/or information described herein as being stored in the database 70H, it is to be understood that the database 70H contains or includes any and/or all data and/or information required, needed, or desired, for allowing and/or enabling the educational/instructional provider computer 70 and/or the apparatus 100 to perform any and/or all of the functions and functionalities described herein as being performed by the educational/instructional provider computer 70 and/or the apparatus 100 of the present invention.

The educational/instructional provider computer 70 also includes a database 70H which can include, for each user, individual, independent contractor, freelancer, employer, or hiring entity, who or which utilizes the apparatus 100 and method of the present invention, information regarding the respective user's, individual's, independent contractor's, freelancer's, employer's, or hiring entity's, name, sex, age, birth date, address, telephone number, cellular telephone number, text messaging number, videoconferencing or video chat identification (ID) name or number, email address, website address or uniform resource locator (url), and/or any other contact information, agent or representative contact information, and/or educational or instructional account information. In a preferred embodiment, each user, individual, independent contractor, freelancer, employer, or hiring entity, can be assigned, and/or can utilize, an educational or instructional account which can include information regarding any schools, high schools, secondary schools, colleges, universities, trade schools, gyms, training centers, fitness centers, fitness schools, martial arts schools, or any other educational or instructional institutions, attended by the respective user, individual, independent contractor, freelancer, employer, or hiring entity, or in which the respective user, individual, independent contractor, freelancer, employer, or hiring entity, is or was a student or member, and any in-person or online degree programs, any in-person or online certificate programs, any in-person or online courses, any in-person or online classes, any in-person or online lessons, any in-person or online seminars, any other in-person or online educational or instructional offerings, attended by or viewed by the respective user, individual, independent contractor, freelancer, employer, or hiring entity.

The database 70H can also contain and/or include video recordings and/or audio recordings of any and/or all classes, lectures, seminars, and/or lessons, offered by, or provided by, any of the schools, high schools, secondary schools, colleges, universities, trade schools, gyms, training centers, fitness centers, fitness schools, martial arts schools, or any other educational or instructional institutions, which utilize the apparatus 100 of the present invention. The database 70H can also contain and/or include video recordings and/or audio recordings of any and/or all classes, lectures, seminars, and/or lessons, offered by, or provided by, any of the respective users, individuals, independent contractors, freelancers, employers, or hiring entities, which or which utilize the apparatus 100 of the present invention.

The database 70H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 70H can also contain and/or include any other data and/or information which is, or may be, needed and/or desired in performing any and/or all of the features and/or functionality described herein as being provided by the apparatus 100 of the present invention and/or the educational/instructional provider computer 70.

The educational/instructional provider computer 70 also includes an output device 70I for outputting any of the data, information, or reports, described herein or otherwise. In the preferred embodiment, the output device 70I can be a printer, a display, a transmitter, a modem, a speaker, and/or any other device which can be used to output data.

The educational/instructional provider computer 70 can also include a video and/or audio recording device(s) 70J which can include a camera and/or a video recording device, for recording pictures or video and/or video clips, and/or a microphone or an audio recording device, for recording audio or audio clips, which can be recorded by, and/or transmitted live, by or from the educational/instructional provider computer 70, or which can be recorded by, and stored at or in, the educational/instructional provider computer 70 for transmission by or from the educational/instructional provider computer 70 at a later time. The video and/or audio recording device(s) 70J can also be utilized to facilitate one-way broadcasts from the educational/instructional provider computer 70, and/or can be utilized to facilitate video conferencing, video chatting, and/or audio conferencing, and/or video and audio conferencing, between a user of the educational/instructional provider computer 70 and any of the herein-described users, individuals, persons, or entities, who or which utilize the apparatus 100 of the present invention.

The educational/instructional provider computer 70 can also include a global positioning device 70K. In a preferred embodiment, the global positioning device 70K determines or can determine a position or location of the educational/instructional provider computer 70.

In a preferred embodiment, the educational/instructional provider computer 70 can also be equipped, and/or can be programmed, for voice activation operation and/or voice control operation of and/or regarding any and/or all of the herein-described operations and functions which are capable of being performed by the educational/instructional provider computer 70.

FIG. 8 illustrates the social networking computer 80 of the apparatus 100, in block diagram form. The social networking computer 80, in the preferred embodiment, can be a computer or computer system, a server computer, a network computer, or any other communication device, which can provide the functionality of, and which can be utilized as a social networking computer 80, such as an Internet server computer and/or a web site server computer. The social networking computer 80, in the preferred embodiment, can also be any communication device, computer, personal computer, laptop computer, notebook computer, Smart phone or smartphone, smart telephone, cellular telephone, personal digital assistant, wireless telephone, wireless communication device, tablet, tablet computer, watch, smart watch, or wearable device or computer, or any combination of same, or any equivalent of same, or any other computer or communication device, which can provide the functionality of, and which can be utilized as a social networking computer 80. In the preferred embodiment, the social networking computer 80 includes a central processing unit or CPU 80A, which, in the preferred embodiment, is a microprocessor. The CPU 80A can also be a microcomputer, a minicomputer, a macro-computer, and/or a mainframe computer, depending upon the application.

The social networking computer 80 also includes a random access memory device(s) 80B (RAM) and a read only memory device(s) 80C (ROM), each of which is connected to, or linked with, the CPU 80A, and a user input device 80D, for entering data and/or information and/or commands into the social networking computer 80, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the social networking computer 80. The user input device(s) 80D is/are also connected to, or linked with, the CPU 80A. The social networking computer 80 also includes a display device 80E for displaying data and/or information to a user or individual. The display device 80E is also connected to, or linked with, the CPU 80A.

The social networking computer 80 also includes a transmitter(s) 80F, for transmitting signals and/or data and/or information to any one or more of the central processing computer(s) 11, the user communication device(s) 20, the employer communication device(s) 30, the counterparty communication device(s) 40, the media/content provider computer(s) 50, the digital assets/records storage computer(s) 60, and/or the educational/instructional provider computer(s) 70, and/or to any other social networking computer(s) 80, and/or any other individual computer(s) or individual communication device(s) which may be utilized in conjunction with the apparatus 100 of the present invention. The transmitter 80F is also connected to, or linked with, the CPU 80A.

The social networking computer 80 also includes a receiver 80G, for receiving signals and/or data and/or information from any one or more of the central processing computer(s) 11, the user communication device(s) 20, the employer communication device(s) 30, the counterparty communication device(s) 40, the media/content provider computer(s) 50, the digital assets/records storage computer(s) 60, and/or the educational/instructional provider computer(s) 70, and/or to any other social networking computer(s) 80, and/or any other individual computer(s) or individual communication device(s) which may be utilized in conjunction with the apparatus 100 of the present invention. The receiver 80G is also connected to, or linked with, the CPU 80A.

The social networking computer 80 also includes a database(s) 80H which contains any and/or all of the data and/or information required, needed, or desired, for allowing and/or enabling the social networking computer 80 and/or the apparatus 100 to perform any and/or all of the functions and functionalities described herein as being performed, and/or as capable of being performed, by the social networking computer 80 and/or the apparatus 100 of the present invention. In this regard, and notwithstanding any specific examples of data and/or information described herein as being stored in the database 80H, it is to be understood that the database 80H contains or includes any and/or all data and/or information required, needed, or desired, for allowing and/or enabling the social networking computer 80 and/or the apparatus 100 to perform any and/or all of the functions and functionalities described herein as being performed by the social networking computer 80 and/or the apparatus 100 of the present invention.

The social networking computer 80 also includes a database(s) 80H. The database 80H can contain and/or included, and/or can be linked to or with, any of the data and/or information typically found in, or utilized by, a social networking computer, or any information regard any members of the social network serviced thereby, as well as any data and/or information typically utilized in providing or in performing the functionality and/or services described herein as being provided by, or offered by, the social network associated with the social networking computer 80.

The database 80H can also contain and/or include, and/or can be linked to or with, any of the data and/or information described herein as being stored in any of the respective databases 11H, 20H, 30H, 30H, 50H, 60H, 70H, and/or 80H, of any of the herein-described computers or communication devices. The database 80H can also contain and/or include any other data and/or information which is, or may be, needed and/or desired in performing any and/or all of the features and/or functionality described herein as being provided by the apparatus 100 of the present invention and/or the social networking computer 80.

The social networking computer 80 also includes an output device 80I for outputting any of the data, information, or reports, described herein or otherwise. In the preferred embodiment, the output device 80I can be a printer, a display, a transmitter, a modem, a speaker, and/or any other device which can be used to output data.

The social networking computer 80 can also include a video and/or audio recording device(s) 80J which can include a camera and/or a video recording device, for recording pictures or video and/or video clips, and/or a microphone or an audio recording device, for recording audio or audio clips, which can be recorded by, and/or transmitted live, by or from the social networking computer 80, or which can be recorded by, and stored at or in, the social networking computer 80 for transmission by or from the social networking computer 80 at a later time. The video and/or audio recording device(s) 80J can also be utilized to facilitate one-way broadcasts from the social networking computer 80, and/or can be utilized to facilitate video conferencing, video chatting, and/or audio conferencing, and/or video and audio conferencing, between a user of the social networking computer 80 and any of the herein-described users, individuals, persons, or entities, who or which utilize the apparatus 100 of the present invention.

The social networking computer 80 can also include a global positioning device 80K. In a preferred embodiment, the global positioning device 80K determines or can determine a position or location of the social networking computer 80.

In a preferred embodiment, the social networking computer 80 can also be equipped, and/or can be programmed, for voice activation operation and/or voice control operation of and/or regarding any and/or all of the herein-described operations and functions which are capable of being performed by the social networking computer 80.

In a preferred embodiment, any of the herein-described databases 11H, 20H, 30H, 40H, 50H, 60H, 70H, and/or 80H, can also contain and/or include any of the data and/or information described as being stored in any of the databases which are disclosed or described in U.S. Pat. No. 6,662,194, filed Jul. 7, 2000, entitled "APPARATUS AND METHOD FOR PROVIDING RECRUITMENT INFORMATION" and as being stored in any of the databases which are disclosed or described in U.S. patent application Ser. No. 14/714,365, filed May 18, 2015, and entitled "APPARATUS AND METHOD FOR REMOTELY PROVIDING INSTRUCTIONAL AND/OR EDUCATIONAL INFORMATION AND/OR SERVICES IN A NETWORK ENVIRONMENT".

The apparatus 100 of the present invention can also be utilized to perform any and/or all of the functions and/or functionalities described as being performed by the various apparatuses, systems, inventions, computers, and/or communications devices, disclosed or described in U.S. Pat. No. 6,662,194, filed Jul. 7, 2000, entitled "APPARATUS AND METHOD FOR PROVIDING RECRUITMENT INFORMATION", and disclosed or described in U.S. patent application Ser. No. 14/714,365, filed May 18, 2015, and entitled "APPARATUS AND METHOD FOR REMOTELY PROVIDING INSTRUCTIONAL AND/OR EDUCATIONAL INFORMATION AND/OR SERVICES IN A NETWORK ENVIRONMENT".

Applicant hereby incorporates by reference hereby the subject and teachings of U.S. Pat. No. 6,662,194, filed Jul. 7, 2000, entitled "APPARATUS AND METHOD FOR PROVIDING RECRUITMENT INFORMATION", the subject matter and teachings of which are hereby incorporated by reference herein in their entirety.

In a preferred embodiment, any of the herein-described databases 11H, 20H, 30H, 40H, 50H, 60H, 70H, and/or 80H, can also contain and/or include any of the data and/or information described as being stored in any of the databases which are described. Applicant hereby incorporates by reference hereby the subject and teachings of U.S. patent application Ser. No. 14/714,365, filed May 18, 2015, and entitled "APPARATUS AND METHOD FOR REMOTELY PROVIDING INSTRUCTIONAL AND/OR EDUCATIONAL INFORMATION AND/OR SERVICES IN A NETWORK ENVIRONMENT", the subject matter and teachings of which is described herein in their entirety.

It is important to note, and it is to be understood, that the respective databases 11H, 20H, 30H, 40H, 50H, 60H, 70H, and/or 80H, can contain and/or include any data and/or information which is described herein, or otherwise, as being input into, received by, processed by, generated by, and/or transmitted from, each of the herein-described central procession computer(s) 11, user communication devices 20, employer communication devices 30, counterparty communication devices 40, media/content provider computers 50, digital assets/records storage computers 60, educational/instructional provider computers 70, and/or social networking computers 80.

In a preferred embodiment, the apparatus 100 can be utilized by any user, individual, independent contractor, or freelancer, in order to manage and/or monitor his, her, or its, job seeking, employment, and/or work, activities. In a preferred embodiment, it is envisioned that each user, individual, independent contractor, or freelancer, and each employer or hiring entity, will create, and/or have associated therewith, a user or member account. In a preferred embodiment, the user or member account can be utilized in order to perform any of the herein-described activities described herein as being capable of being performed while using the apparatus 100 of the present invention.

In a preferred embodiment, the user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases 11H, 20H, 30H, 40H, 50H, 60H, 70H, and/or 80H, along with identification information, contact information, user or member profile information, and/or user work schedule or work calendar information.

In a preferred embodiment, the user, individual, independent contractor, or freelancer, can utilize the apparatus 100 of the present invention in order to search for jobs, projects, or assignments, and/or to search for postings or listings for jobs, projects, or assignments, to submit resumes and/or job applications for jobs, projects, or assignments, to submit proposals or bids for jobs, projects, or assignments, to submit cover letters, to submit video messages, to ascertain the status of a submission(s) or application(s) for or regarding a job(s), a project(s), or an assignment(s), to request an interview, to request information, in applying for, or submitting a proposal for, a job, project, or assignment, to check on the status of an application or proposal for a job, project, or assignment, and/or to perform any other action or activity in finding a job, project, or assignment, and/or a listing or posting for same. In a preferred embodiment, the user, individual, independent contractor, or freelancer, can also request to be notified when employer or hiring entity receives, views, considers, or acts upon, his or her application for a job, project, or assignment. In a preferred embodiment, the user, individual, independent contractor, or freelancer, can also request to be notified regarding new job, project, or assignment, postings or listings.

Figure 10:
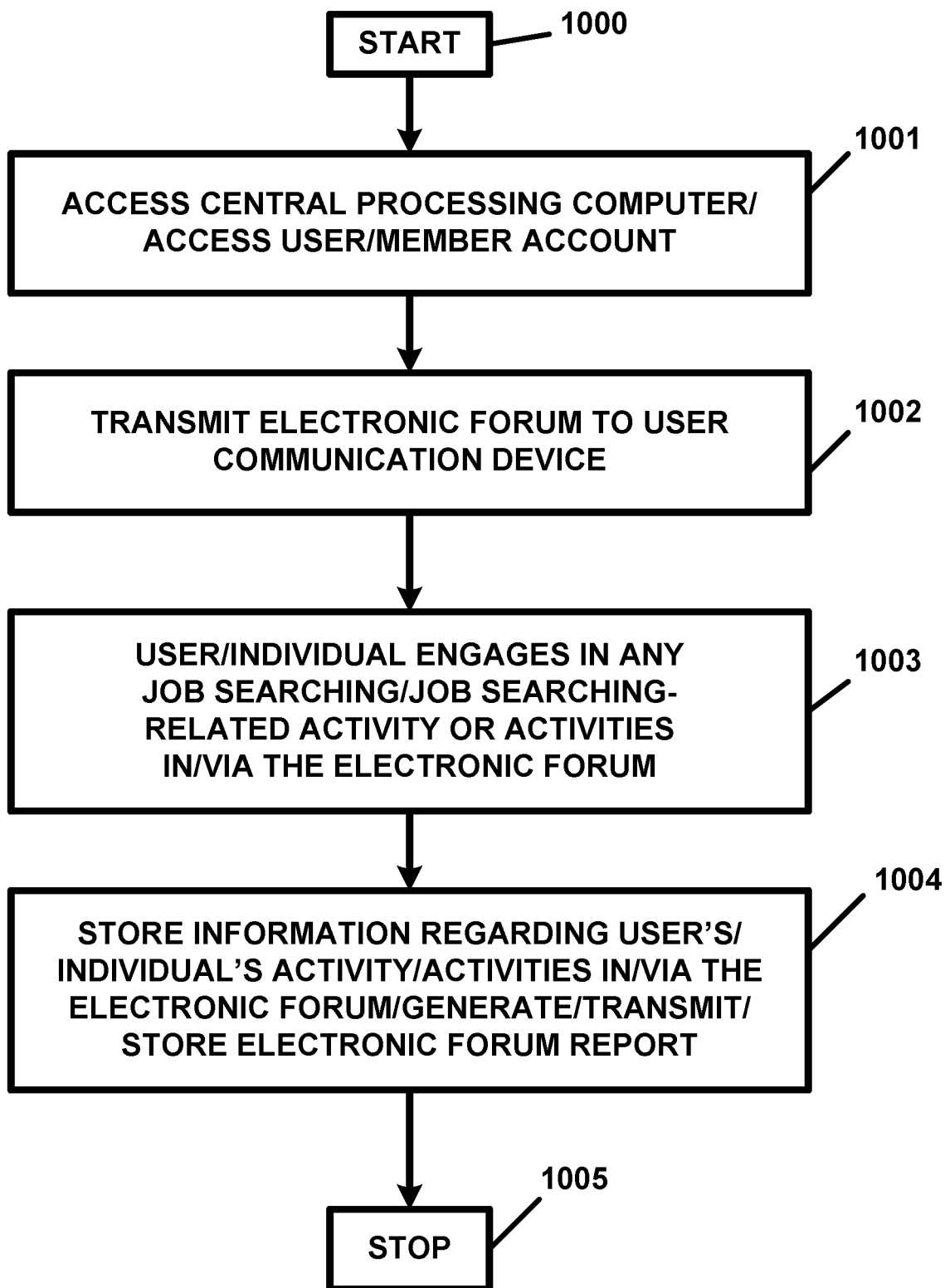
FIG. 10 illustrates a preferred embodiment method for utilizing the apparatus of the present invention, in flow diagram form.

FIG. 10 illustrates a preferred embodiment method for utilizing the apparatus 100 of the present invention, in flow diagram form. With reference to FIG. 10, the operation of the apparatus 100 commences at step 1000. At step 1001, the user or individual, who can be any individual seeking a job, or any independent contractor or freelancer seeking a project or assignment, can access the central processing computer 11 using his or her user communication device 20. At step 1001, the user or individual can access, or can log into, his or her user or member account by transmitting an access request message, or login information, from his or her user communication device 20 to the central processing computer 11. At step 1001, the central processing computer 11 can receive and process the information contained in the access request message, or the login information, and can grant the user or individual access to his or her user or member account.

At step 1002, the central processing computer 11 can transmit an electronic job search forum (hereinafter referred to as an "electronic forum"), or web page, to the user communication device 20. In a preferred embodiment, the central processing computer 11 can transmit the electronic forum to the user communication device 20. In another preferred embodiment, the central processing computer 20 can transmit a web page to the user communication device 20. In a preferred embodiment, the electronic forum, or web page, can be displayed on, and viewed via, the display device 20E of the user communication device 20. Thereafter, the operation of the apparatus 100 can proceed to step 1003.

At step 1003, the user or individual can engage in any job searching, project searching, or assignment searching, activity or activities while in and/or via the electronic forum. At step 1003, the user or individual can perform a search or searches for any type or kind of job, project, or assignment, postings or listings and can be provided with search results containing any number of postings or listings of available jobs, projects, or assignments. In a preferred embodiment, the user or individual can perform searches by entering search information using a keyword or keywords, location(s), category or categories, and/or any other searching method or methodology.

In another preferred embodiment, the user or individual can search for jobs, projects, or locations, in a same geographic area in which his or her user communication device 20 is located at the time of the performing of the search. In such an embodiment, information regarding the position or location of the user communication device 20, as determined by the global positioning device 20K, can also be transmitted to the central processing computer 11 along with any search information. In a preferred embodiment, the search information, along with any position or location information, if utilized, can be transmitted from the user communication device 20 to the central processing computer 11. At step 1003, the central processing computer 11 can receive and process the search information and can generate a job, project, or assignment, search report and can transmit the same to the user communication device 20.

At step 1003, the user communication device 20 can receive the job, project, or assignment, search report and can display information contained therein to the user or individual via the electronic forum and/or the display device 20E. At step 1003, the user or individual can apply for any job, project, or assignment, posted or listed in the job, project, or assignment, search report. For each job, project, or assignment, for which the user or individual applies, the user or individual can submit a resume, fill out a job application, submit a cover letter, submit a video message, or submit information regarding references, in applying for the job, project, or assignment. In a preferred embodiment, the user or individual can also submit work samples, video recordings of presentations, video recordings or pictures of work samples, video messages from prior or existing employers, customers, or clients, video reference messages, marketing materials, promotional materials, and/or any other information.

At step 1003, all of the information submitted by the user or individual, in applying for the job, project, or assignment can be transmitted to the central processing computer 11 and/or to the employer communication device 30 of or associated with the employer or hiring entity for each job, project, or assignment, posting or listing for which the user or individual applies. Thereafter, at step 1003, the central processing computer 11 or each respective employer communication device 30, which receives a job, project, or assignment, application from the user or individual, can store the same and can generate an application confirmation message. At step 1003, the central processing computer 11 or each respective employer communication device 30 can, thereafter, transmit the application confirmation message to the user communication device 20.

In a preferred embodiment, the electronic forum can also display information regarding and/or all of the jobs, projects, or assignments, for which the user or individual has previously applied along with information regarding a status of each of the same. The information regarding the status of an application can include information regarding a date of application, a date of consideration, feedback information from the employer or hiring entity, a decision, or a date on which a decision is to be made. The information regarding the status of an application can also include information indicating that the job, project, or assignment, has been filled or withdrawn.

In a preferred embodiment, it is envisioned that each time an employer communication device 30 of an employer or hiring entity receives an application for a job, a project, or an assignment, and/or each time the application is reviewed and/or acted upon in any manner or way, the employer communication device 30 can automatically generate a status message, and can transmit the status message to the user communication device 20 of the user or individual. In this regard, in a preferred embodiment, a status message can be used to indicate that the application has been received, that the application has been reviewed, that the application and the user or individual has been referred in the organization for further consideration, the name and/or position of the person or persons who have reviewed the application, the name and/or position of the person or persons who have reviewed, or who are reviewing, or who will be reviewing, the application, or a decision rejecting the application, a decision to hire the user or individual, or a decision referring the application for a further interview or review.

In a preferred embodiment, the employer communication device 30 can automatically generate any status message(s), and can transmit the same to the user's or individual's user communication device 20, at any time before, during, or after, the occurrence of the electronic forum, or before, during, or after, any occurrence of any electronic forum.

At step 1003, any and all status messages can also be stored in the database 20H of the user communication device 20, in the database 30H of the employer communication device 30, and/or in the database 11H of the central processing computer and/or in the distributed ledger/Blockchain technology system 12 of the central processing computer and distributed ledger and Blockchain technology system 10.

At step 1003, the user or individual can review the status of each job, project, or assignment, application which was previously made. At step 1003, the user or individual can also review the user or member profile for each employer or hiring entity to or with whom he or she has applied for a job, project, or assignment. At step 1003, the user or individual can schedule a videoconference call with any employer or hiring entity to or with whom he or she has applied for a job, project, or assignment. At step 1003, the user or individual can conduct a videoconference call with any employer or hiring entity to or with whom he or she has applied for a job, project, or assignment. At step 1003, the user or individual can also submit an application status inquiry for any job, project, or assignment, for which he or she has applied, and/or can transmit the application status inquiry to the respective employer communication device 30 associated with the employer or hiring entity to or with whom the user or individual has applied for a job, project, or assignment.

At step 1003, the user or individual can also supplement any previously made or submitted application for a job, project, or assignment, by submitting and transmitting, to a respective employer communication device 30, any additional information and/or materials. In a preferred embodiment, the user or individual can also enter information regarding a request to receive status alerts and/or status messages from any employer or hiring entity regarding any activities or developments relating to, or pertaining to, any previously made or submitted application for a job, project, or assignment. At step 1003, for any project or assignment, the user or individual can also submit a proposal, an estimate, or a bid, for any project or assignment posted or listed by an employer or hiring entity. At step 1003, the user or individual can engage in, and/or can perform, any other action or activity in searching for and/or in securing a job, project, or assignment. Once the user or individual completes his or her activities in the electronic forum, the operation of the apparatus 100 can proceed to step 1004.

At step 1004, any and/or all information regarding the user's or individual's activities performed in and/or via the electronic forum, any information regarding any job, project, or assignment, application(s), submitted by the user or individual in and/or via the electronic forum, any video conference calls made in or via the electronic forum, and/or any information regarding any activity performed by the user or individual in or via the electronic forum, and/or any information provided to the user or individual in or via the electronic forum, can be stored in an electronic forum report which can be generated by the central processing computer 11. In a preferred embodiment, the electronic forum report can thereafter, at step 1004, be stored in the database 20H of the user's or individuals user communication device 20, in the database 11H of the central processing computer 11, and/or in the distributed ledger/Blockchain technology system 12 of the central processing computer and distributed ledger and Blockchain technology system 10. Thereafter, the operation of the apparatus 100 will cease at step 1005.

In another preferred embodiment of the embodiment of FIG. 10, any of the herein-described status alerts and/or status messages can be generated and transmitted, from an employer communication device 30 and/or by the central processing computer 11 to the user communication device 20 at any time and/or upon the any occurrence or happening of any event or activity of interest to the user or individual. In a preferred embodiment, in addition to containing information regarding the occurrence or happening, the status alert or status message can also contain a link or hyperlink to the electronic forum via which the user or individual can enter or re-enter the electronic forum at any time.

In another preferred embodiment of the embodiment of FIG. 10, the user or individual can use his or her user communication device 20 in order to program the central processing computer 11 in order to detect the posting of jobs, projects, or assignments, of interest to the user or individual. Upon detecting the posting of any jobs, projects, or assignments, of interest to the user or individual, the central processing computer 11 can generate a job alert message or a project alert message automatically and can automatically transmit the same to the user's or individual's user communication device 20. In a preferred embodiment, the job alert message or a project alert message can contain information regarding the job, project, or assignment, and can also contain a link or hyperlink to the electronic forum.

In another preferred embodiment, the apparatus 100 can be utilized by any employer or hiring entity in order to manage and/or monitor his, her, or its, recruitment and/or manpower procurement and/or management activities. In a preferred embodiment, it is envisioned that each user, individual, independent contractor, or freelancer, and each employer or hiring entity, will create, and/or have associated therewith, a user or member account. In a preferred embodiment, the user or member account can be utilized in order to perform any of the herein-described activities described herein as being capable of being performed while using the apparatus 100 of the present invention. In a preferred embodiment, the user or member account can contain and/or can include any information regarding the respective user, individual, independent contractor, or freelancer, and each employer or hiring entity, including, but not limited to, any and/or all of the information described herein as being stored, for the respective user, individual, independent contractor, or freelancer, and each employer or hiring entity, in any of the databases 11H, 20H, 30H, 40H, 50H, 60H, 70H, and/or 80H, along with identification information, contact information, user or member profile information, and/or user work schedule or work calendar information.

In a preferred embodiment, the employer or hiring entity, can utilize the apparatus 100 of the present invention in order to search for individuals, independent contractors, or freelancers, who can perform services for the employer or hiring entity, and/or to search for employees or candidates for jobs, projects, or assignments, to receive and review resumes and/or job applications from individuals, independent contractors, or freelancers, to submit requests for proposals or bids for jobs, projects, or assignments to individuals, independent contractors, or freelancers, to receive cover letters, to receive video messages, to ascertain the status of an individual, independent contractor, or freelancer, to request an interview, to request information, and/or to check on the status of an applicant for a job, project, or assignment, and/or to perform any other action or activity in finding an employee or candidate for a job, project, or assignment. In a preferred embodiment, the employer or hiring entity can also request to be notified when an individual, an independent contractor, or a freelancer, becomes available for a job, project, or assignment.

Figure 11:
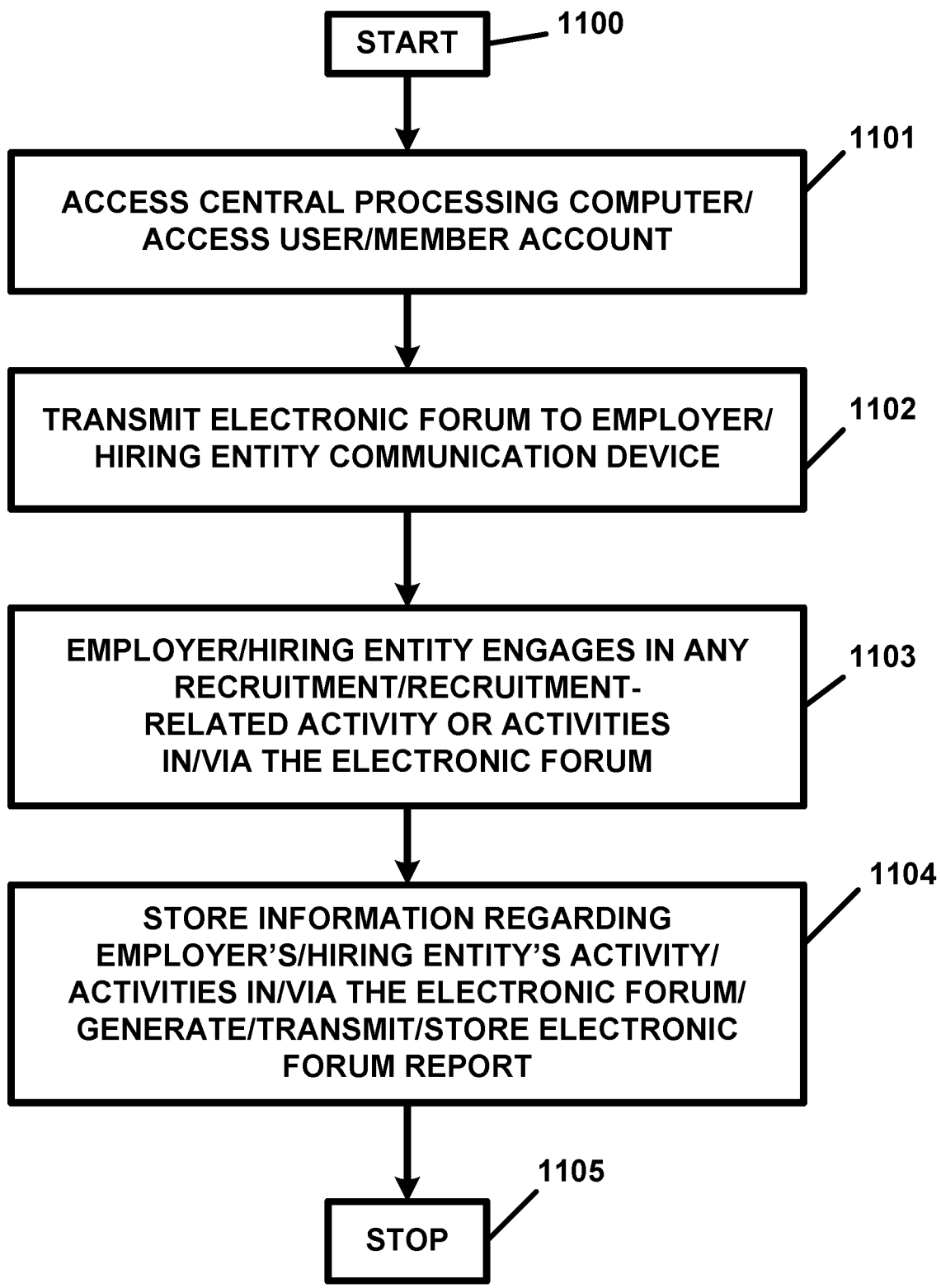
FIG. 11 illustrates another preferred embodiment method for utilizing the apparatus of the present invention, in flow diagram form.

FIG. 11 illustrates a preferred embodiment method for utilizing the apparatus 100 of the present invention, in flow diagram form. With reference to FIG. 11, the operation of the apparatus 100 commences at step 1100. At step 1101, the employer or hiring entity can access the central processing computer 11 using his or her employer communication device 30. At step 1101, the employer or hiring entity can access, or can log into, his or her user or member account by transmitting an access request message, or login information, from his or her employer communication device 30 to the central processing computer 11. At step 1101, the central processing computer 11 can receive and process the information contained in the access request message, or the login information, and can grant the employer or hiring entity access to his or her user or member account.

At step 1102, the central processing computer 11 can transmit an electronic job search forum (hereinafter referred to as an "electronic forum"), or web page, to the employer communication device 30. In a preferred embodiment, the central processing computer 11 can transmit the electronic forum to the employer communication device 30. In another preferred embodiment, the central processing computer 20 can transmit a web page to the employer communication device 30. In a preferred embodiment, the electronic forum, or web page, can be displayed on, and viewed via, the display device 30E of the employer communication device 30. Thereafter, the operation of the apparatus 100 can proceed to step 1103.

At step 1103, the employer or hiring entity can engage in any recruitment activity or activities while in and/or via the electronic forum. At step 1103, the employer or hiring entity can perform a search or searches for candidates for any open or available job, project, or assignment, and can be provided with search results containing any number of individuals, independent contractors, or freelancers, who might be available for, or who can be a candidate for, an available job, project, or assignment. In a preferred embodiment, the employer or hiring entity can perform searches for candidates by entering search information using a keyword or keywords, location(s), category or categories, names of potential candidates, and/or any other searching method or methodology.

In another preferred embodiment, the employer or hiring entity can search for candidates in a same geographic area in which his or her employer communication device 30 is located at the time of the performing of the search. In such an embodiment, information regarding the position or location of the employer communication device 30, as determined by the global positioning device 30K, can also be transmitted to the central processing computer 11 along with any search information. In a preferred embodiment, the search information, along with any position or location information, if utilized, can be transmitted from the employer communication device 30 to the central processing computer 11. At step 1103, the central processing computer 11 can receive and process the search information and generate a candidate search report and can transmit the same to the employer communication device 30.

At step 1103, the employer communication device 40 can receive the candidate search report and can display information contained therein to the employer or hiring entity via the electronic forum and/or the display device 30E. At step 1103, the employer or hiring entity can identify one or more candidates from the search report, and the employer communication device 30 can generate a recruitment message, and, thereafter, can transmit the recruitment message to the user communication device 20 associated with the identified candidate or to the respective communication devices associates with each of the identified candidates. In a preferred embodiment, the recruitment message can contain and/or include information regarding the job, project, or assignment, a description of same, a proposed salary or project price for same, a request for a proposal for same, or a request for an estimate for same, and/or any other information regarding the job, project, or assignment. The recruitment message can also include a link or a hyperlink to the user or member profile for the employer or hiring entity, a website of the employer or hiring entity, and/or any other information regarding the employer or hiring entity.

At step 1103, the recruitment message, and/or any and/or all of the information described as being contained therein, can also be transmitted to the central processing computer 11. Thereafter, at step 1103, the central processing computer 11 and/or each respective user communication device 20 that received the recruitment message can store the same and can generate a message received confirmation message. At step 1103, the central processing computer 11, and each respective user communication device 20 which received the recruitment message, can transmit the message received confirmation message to the employer communication device 30.

In a preferred embodiment, the electronic forum can also display information regarding all applicants for the job, project, or assignment, and/or for and/or all applicants for any other available jobs, projects, or assignments, of the employer or hiring entity. In a preferred embodiment, the electronic forum can also display information regarding a listing of all individuals, independent contractors, or freelancers, who have previously applied for the job, project, or assignment, and/or who have previously applied for any of the other jobs, projects, or assignment, and/or information regarding each respective individual, independent contractor, or freelancer, and/or his or her application and/or application status. The information regarding the status of an application can include information regarding a date of application, a date of consideration, feedback information from the employer or hiring entity, a decision, or a date on which a decision is to be made. The information regarding the status of an application can also include information indicating that an individual, independent contractor, or freelancer, has withdrawn his or her application, was extended an offer, or has rejected the offer.

In a preferred embodiment, it is envisioned that each time an employer communication device 30 of an employer or hiring entity receives an application for a job, a project, or an assignment, and/or each time the application is reviewed and/or acted upon in any manner or way, the employer communication device 30 can automatically generate a status message which can be utilized to update the status information for each candidate and/or for each job, project, or assignment, for later viewing in the electronic forum. In a preferred embodiment, the status message can contain information which can indicate that the application has been received, that the application has been reviewed, that the application and the individual, independent contractor, or freelancer, has been referred for further consideration, the name and/or position of the person or persons who have reviewed the application, the name and/or position of the person or persons who have reviewed, or who are reviewing, or who will be reviewing, the application, or a decision rejecting the application, a decision to hire the user or individual, or a decision referring the application for a further interview or review. In a preferred embodiment, the employer communication device 30 can automatically generate any status message(s), and can store the same in the database 30H of the employer's communication device 30, at any time before, during, or after, the occurrence of the electronic forum, or before, during, or after, any occurrence of any electronic forum.

At step 1103, any and all status messages, whenever the same are generated, can also be transmitted to the user communication device(s) 20, of any applicant(s) for any job, project, or assignment, of the employer or hiring entity, and to the central processing computer 11. At step 1103, the any and/or all status messages can also be stored in the database 20H of the user communication device 20, and/or in the database 11H of the central processing computer 11 and/or in the distributed ledger/Blockchain technology system 12 of the central processing computer and distributed ledger and Blockchain technology system 10.

At step 1103, the employer or hiring entity can review the status of each application for each job, project, or assignment, application which was previously made. At step 1103, the employer or hiring entity can also review the user or member profile for each candidate identified in the search report or for any applicant(s) for the job, project, or assignment, or any applicants for any other previously posted or listed jobs, projects, or assignments, of the employer or hiring entity. At step 1103, the employer or hiring entity can schedule a videoconference call with any applicant(s) for the job, project, or assignment, or with any applicant(s) for any other previously posted or listed jobs, projects, or assignments, of the employer or hiring entity. At step 1103, the employer or hiring entity can conduct a videoconference call, or schedule an interview or follow-up interview, with any applicant or with any number of applicants for the job, project, or assignment, or with any applicant(s) for any other previously posted or listed jobs, projects, or assignments, of the employer or hiring entity. At step 1103, the employer or hiring entity can also transmit a message, requesting additional information from any one or more applicants for the job, project, or assignment, or from any applicant(s) for any other previously posted or listed jobs, projects, or assignments, of the employer or hiring entity, and can transmit the message to the communication device 20 of or associated with each applicant from who the additional information is requested.

In a preferred embodiment, the employer or hiring entity can also enter information regarding a request to receive status alerts and/or status messages from the central processing computer 11 or from any of the user communication devices 20 of or associated with and individuals, independent contractors, or freelancers, regarding an availability of an individual, independent contractor, or freelancer, the unavailability of an individual, independent contractor, or freelancer, or any change in circumstances regarding any individual(s), independent contractor(s), or freelancer(s), and/or any other change of circumstances regarding the employment environment of the employer or hiring entity.

At step 1103, the employer or hiring entity can also engage in, and/or can perform, any other action or activity in searching for candidates for any job(s), project(s), or assignment(s). Once the employer or hiring entity completes his or her activities in the electronic forum, the operation of the apparatus 100 can proceed to step 1104.

At step 1104, any and/or all information regarding the employer's or hiring entity's activities performed in and/or via the electronic forum, any information regarding any candidates and/or any job, project, or assignment, application(s), any video conference calls made in or via the electronic forum, and any information regarding any activity performed by the employer to hiring entity in or via the electronic forum, and/or any information provided to the employer or hiring entity in or via the electronic forum, can be stored in an electronic forum report which can be generated by the central processing computer 11. In a preferred embodiment, the electronic forum report can thereafter, at step 1104, be stored in the database 30H of the employer's or hiring entity's communication device 30, in the database 11H of the central processing computer 11, and/or in the distributed ledger/Blockchain technology system 12 of the central processing computer and distributed ledger and Blockchain technology system 10. Thereafter, the operation of the apparatus 100 will cease at step 1105.

In another preferred embodiment of the embodiment of FIG. 11, any of the herein-described status alerts and/or status messages can be generated and transmitted, by and/or from a user communication device 20, or from the central processing computer 11, to the employer communication device 30 at any time and/or upon the any occurrence or happening of any event or activity of interest to the employer or hiring entity. In a preferred embodiment, in addition to containing information regarding the occurrence or happening, the status alert or status message can also contain a link or hyperlink to the electronic forum via which the employer or hiring entity can enter or re-enter the electronic forum at any time.

In another preferred embodiment of the embodiment of FIG. 11, the employer or hiring entity can use his or her employer communication device 30 in order to program the central processing computer 11 in order to detect the posting of a user or member profile or a resume of or for potential candidates, potential employees, independent contractors, or freelancers, who may be of interest to the employer or hiring entity. Upon detecting the posting of a user or member profile or a resume of or for a potential candidate, a potential employee, an independent contractor, or a freelancer, of interest to the employer or hiring entity, the central processing computer 11 can generate a candidate alert message automatically and can automatically transmit the same to the employer communication device 30 of the employer or hiring entity. In a preferred embodiment, the candidate alert message can contain information regarding the potential candidate, potential employee, independent contractor, or freelancer, and can also contain a link or hyperlink to the electronic forum.

In another preferred embodiment, the apparatus 100 of the present invention can be utilized in order to allow any of the herein-described users or individuals to schedule an appointment with an independent contractor or a freelancer for or regarding the performing of a work project or an assignment, or for or regarding obtaining a consultation, or a work estimate, and/or for or regarding a project or an assignment. In such a preferred embodiment, the apparatus 100 can be utilized to schedule appointments with independent contractors and/or freelancers for any and/or all types of kinds of services. In this regard, the apparatus 100 of the present invention can be utilized to schedule appointments with independent contractors and/or freelancers who can perform any service or services in any field or sector of the global economy.

As and for an example, users or individuals can utilize the apparatus 100 in order to schedule an appointment with a healthcare professional, a doctor, a dentist, an attorney, an accountant, a business consultant, a tradesman, and/or any other service provider.

Figure 12:
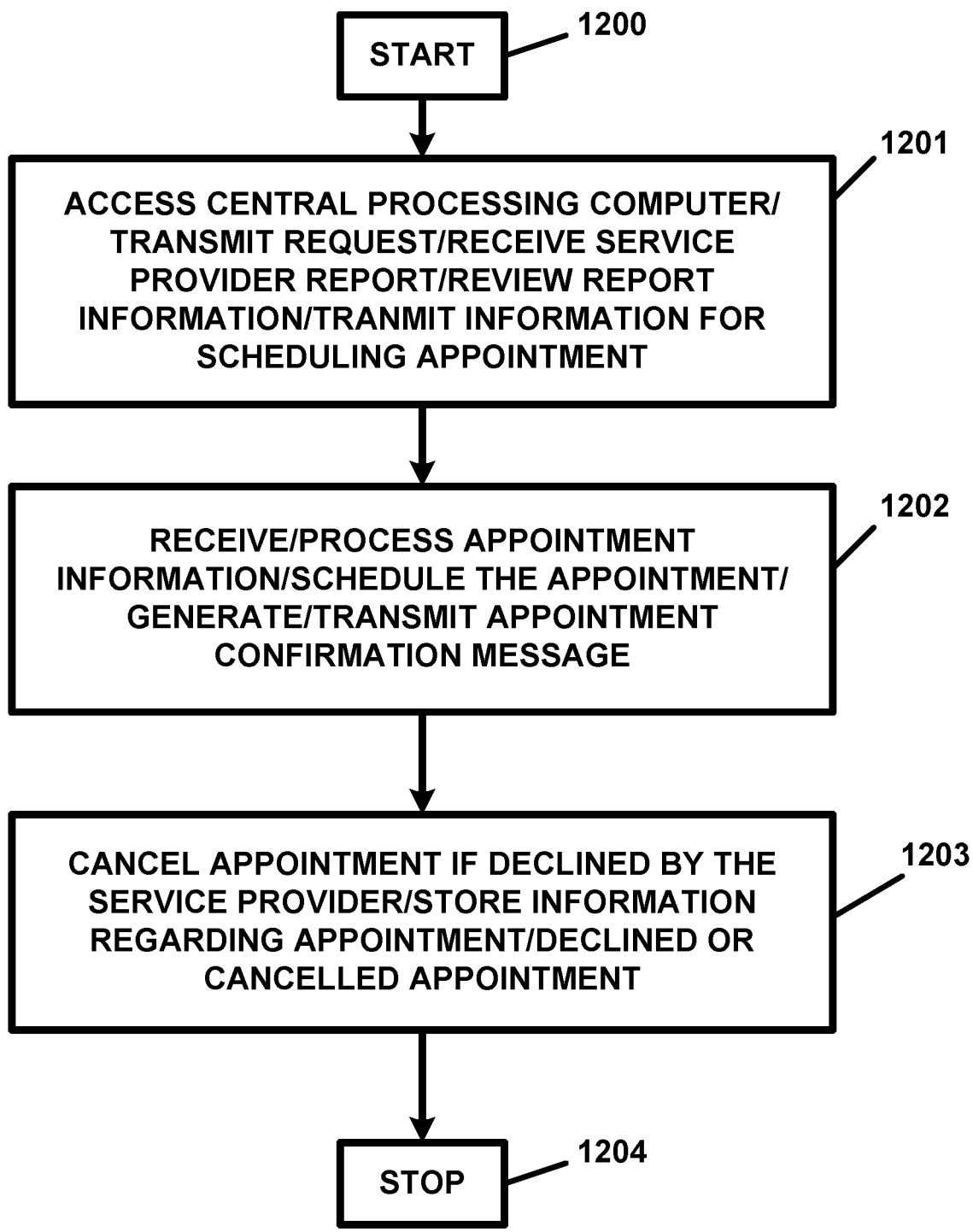
FIG. 12 illustrates still another preferred embodiment method for utilizing the apparatus of the present invention, in flow diagram form.

FIG. 12 illustrates another preferred embodiment method for utilizing the apparatus 100 of the present invention, in flow diagram form. In the preferred embodiment of FIG. 12, the apparatus 100 is described herein as being utilized to schedule an appointment with any service provider, professional or otherwise.

With reference to FIG. 12, the operation of the apparatus 100 commences at step 1200. At step 1201, the user or individual can access the central processing computer 11 by using his or her user communication device 20. At step 1201, the user or individual can transmit, from his or her user communication device 20 to the central processing computer 11 component of the central processing computer and distributed ledger and Blockchain technology system 10, his or her request to locate one or more service providers who can perform the needed service or services for the user or individual.

At step 1201, the central processing computer 11 can receive and process the information regarding the request, and can generate a service provider report which can include a listing of identified and/or available service providers. In a preferred embodiment, the service report can contain and/or include information regarding each identified and/or available service providers and link to hyperlink to their respective user or member profile and work schedule(s) and/or work calendar. Thereafter, the user or individual can review the information contained in the service provider report and/or any user or member profile and/or work schedule(s) or work calendar(s) for any service provider or for any service providers identified in the service provider report. Thereafter, at step 1201, the user or individual can transmit, to the central processing computer 11, information for scheduling an appointment with a service provider identified in the service provider report.

At step 1202, the central processing computer 11 can receive and process the information for scheduling the appointment with the service provider, can process any information needed to make or to schedule the appointment with the service provider, and can update the service provider's work schedule or work calendar so as to include the scheduled appointment. Thereafter, the central processing computer 11 can generate an appointment confirmation message which can contain and/or include information regarding the scheduled appointment, the date and the time(s) of the same, the scheduled time duration of the same, a link or hyperlink to, or information regarding, the user or member profile of, or other information regarding, the service provider, a link or hyperlink to, or other information regarding, the user or member profile of, or other information regarding, the user or individual, and/or any other information regarding the scheduled appointment.

At step 1202, the central processing computer 11 can transmit the appointment confirmation message to the user communication device 20 of the user or individual and to the user communication device 20 of the service provider. In a preferred embodiment, the appointment confirmation message can be transmitted in or as, or as an attachment to, an electronic communication, and electronic transmission, an email message, a text message, or any other transmission or communication which can be transmitted from the central processing computer 11 to the respective user communication devices 20 of each of the user or individual and the service provider. In the case of an email message, the email message can be transmitted to an email server of or for each of the user or individual and the service provider and can, in a preferred embodiment, be transmitted to or otherwise received at each of the respective user communication devices 20 of each of the user or individual and the service provider.

Thereafter, at step 1202, the service provider can, if he or she desires and before the appointment, review the user's or individual's user or member profile in order to become familiar with the user or individual. If, after reviewing the user's or individual's user or member profile, the service provide decides to decline the appointment, the service provider can, at step 1202, transmit an appointment decline message from his or her user communication device 20, to the central processing computer 11.

If, at step 1202, the service provider transmits an appointment decline message in response to the appointment confirmation message, then the central processing computer 11 will process information for canceling the appointment and will process information for clearing that appointment time or slot in the service provider's work schedule or work calendar. Thereafter, at step 1202, the central processing computer 11 will generate an appointment cancellation message and transmit the same to the user's or individual's user communication device 20.

At step 1203, information regarding the appointment, the appointment confirmation message, the appointment decline message, or the appointment cancellation message, can be stored in the database 20H of the service provider's user communication device 20, in the database 20H of the user's or individuals user communication device 20, and/or in the database 11H of the central processing computer 11. At step 1203, the information regarding the appointment, the appointment confirmation message, the appointment decline message, or the appointment cancellation message, can be stored in the distributed ledger/Blockchain technology system 12 of the central processing computer and distributed ledger and Blockchain technology system 10. Thereafter, the operation of the apparatus 100 will cease at step 1204.

In another preferred embodiment, the apparatus 100 of the present invention can be utilized in order to allow any of the herein-described users or individuals to schedule, and/or to participate in, videoconference calls, video chat sessions, telephone calls, or telephone conference calls, with any independent contractor, freelancer, consultant, or other user or individual.

As and for an example, users or individuals can utilize the apparatus 100 in order to schedule, and to participate in, a video conference call, a video chat session, a telephone call, or a telephone conference call, with any independent contractor, freelancer, consultant, or counterparty, for any reason or purpose. In a preferred embodiment, the video conference call, the video chat session, the telephone call, or the telephone conference call, between the user or individual and the independent contractor, freelancer, consultant, or counterparty, can be recorded, and a digitally recorded copy of the same can be stored in a digital asset account of or associated with the user or individual.

In a preferred embodiment, in the case of a video conference call or video chat session, the user or individual and/or the respective independent contractor, freelancer, consultant, or counterparty, can also, at any time during the video conference call or video chat session, take a screenshot picture or photograph of the user or individual and the respective independent contractor, freelancer, consultant, or counterparty, so as to record any information provided during the video conference call or video chat session.

Figure 13:
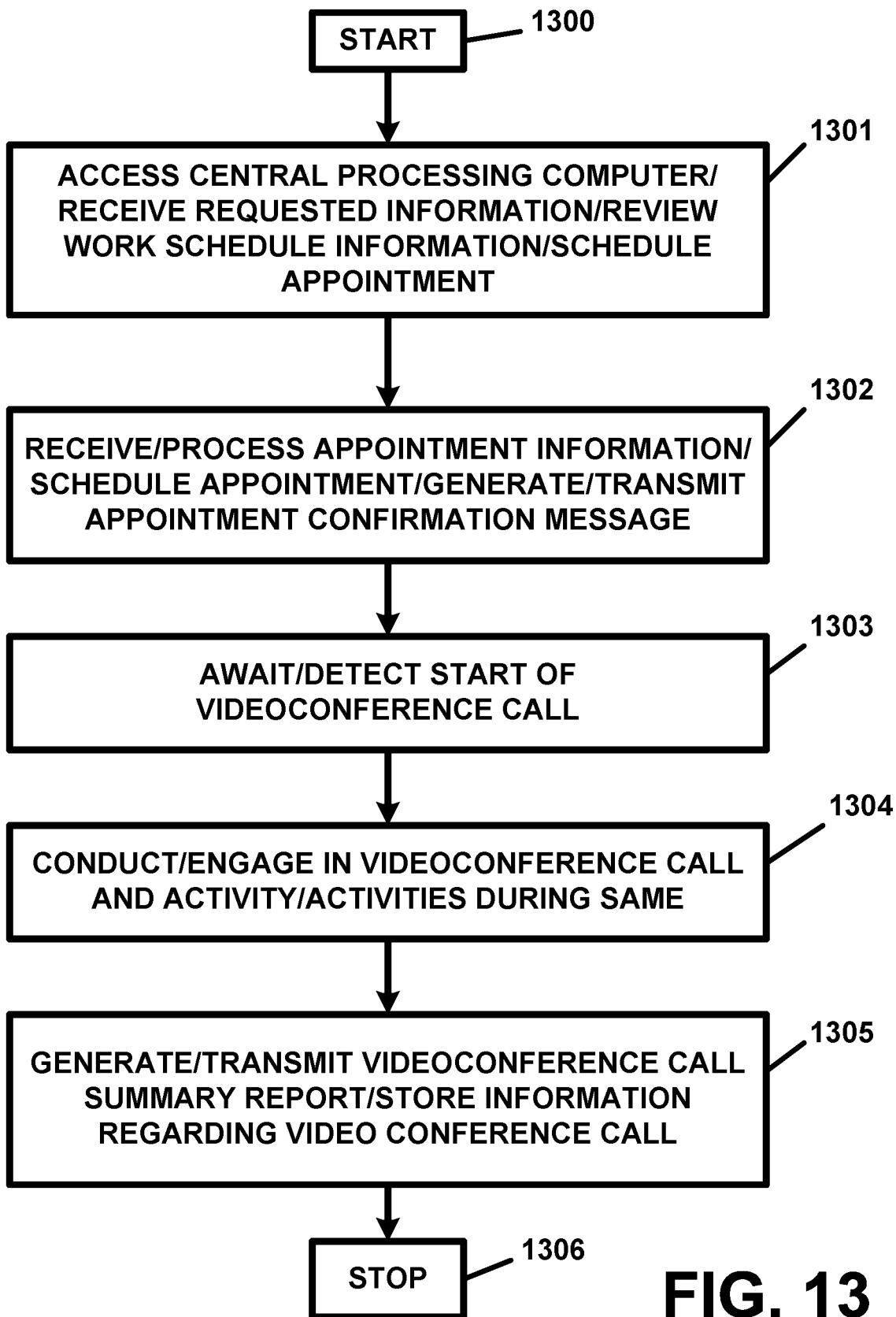
FIG. 13 illustrates yet preferred embodiment method for utilizing the apparatus of the present invention, in flow diagram form.

FIG. 13 illustrates another preferred embodiment method for utilizing the apparatus 100 of the present invention, in flow diagram form. In the preferred embodiment of FIG. 13, the apparatus 100 is described herein as being utilized to facilitate and to record a scheduled videoconference call between a user or individual and a consultant. Although described in a preferred embodiment as being utilized in connection a scheduled videoconference call between a user or individual and a consultant, it is important to note that the apparatus 100 of the embodiment of FIG. 13 can also be utilized in a same, a similar, and/or an analogous, manner in connection with any scheduled, or unscheduled, or arranged, or unarranged, or spur of the moment, video conference call, the video chat session, the telephone call, or the telephone conference call, between and with any user or individual and any independent contractor, freelancer, consultant, or counterparty.

With reference to FIG. 13, the operation of the apparatus 100 commences at step 1300. At step 1301, the user or individual can access the central processing computer 11 by using his or her user communication device 20. At step 1301, the user or individual can transmit, from his or her user communication device 20 to the central processing computer 11 component of the central processing computer and distributed ledger and Blockchain technology system 10, his or her request to access the user or member profile and/or the work schedule of or for the consultant with whom he or she desires to engage in a videoconference call. At step 1301, the central processing computer 11 can transmit the requested information regarding the consultant's user or member profile and/or the work schedule to the user communication device 20. Thereafter, at step 1301, the user or individual can review the consultant's work schedule and can transmit, to the central processing computer 11, information for scheduling a videoconference call with the consultant. In a preferred embodiment, the user or individual can schedule the videoconference call for any desired length of time. In a preferred embodiment, the consultant may require compensation or payment for the videoconference call, may require a monetary or non-monetary contribution or donation to a charity, or may opt to participate in the videoconference call without seeking any compensation or donation.

At step 1302, the central processing computer 11 can receive and process the information for scheduling the videoconference call with the consultant and can update the consultant's work schedule to include the scheduled videoconference call for the scheduled date and time. Thereafter, the central processing computer 11 can generate a videoconference call confirmation message which can contain and/or include information regarding the scheduled videoconference call, the date and the time(s) of the same, the scheduled time duration of the same, a link or hyperlink to, or information regarding, the user or member profile of, or other information regarding, the consultant, a link or hyperlink to, or other information regarding, the user or member profile of, or other information regarding, the user or individual, and/or a link, hyperlink, or uniform resource locator (url), or any other information, needed or desired for initiating and/or engaging in the scheduled videoconference call, and/or information regarding whom, the user or individual or the consultant, is to initiate the videoconference call at the scheduled time.

At step 1302, the central processing computer 11 can transmit the videoconference call confirmation message to the user communication device 20 of the user or individual and to the user communication device 20 of the consultant. In a preferred embodiment, the videoconference call confirmation message can be transmitted in or as, or as an attachment to, an electronic communication, and electronic transmission, an email message, a text message, or any other transmission or communication which can be transmitted from the central processing computer 11 to the respective user communication devices 20 of each of the user or individual and the consultant. In the case of an email message, the email message can be transmitted to an email server of or for each of the user or individual and the consultant and can, in a preferred embodiment, be transmitted to or otherwise received at each of the respective user communication devices 20 of each of the user or individual and the consultant. Thereafter, at step 1302, the consultant can, if he or she desires and before the videoconference call, review the user's or individual's user or member profile in order to become familiar with the user or individual.

At step 1303, the apparatus 100 will await the start of the videoconference call. In a preferred embodiment, the videoconference call can be initiated either by the user or individual or by the consultant. At step 1303, the apparatus 100 can detect the start of the videoconference call. Thereafter, the operation of the apparatus 100 will proceed to step 1304.

At step 1304, the user or individual and the consultant can engage in the video conference call, for the scheduled amount of time or for any amount of time permitted. In a preferred embodiment, the entirety, or any portion, of the videoconference call can be recorded or digitally recorded by the consultant's user communication device 20, by the user's or individual's user communication device 20, and/or by the central processing computer 11. In a preferred embodiment, the entirety, or any portion, of the videoconference call can be recorded or digitally recorded and stored, as a digital recording of the videoconference call, in the database 20H of the consultant's user communication device 20, in the database 20H of the user's or individuals user communication device 20, and/or in the database 11H of the central processing computer 11.

In a preferred embodiment, as noted hereinafter, the recording or digital recording of the entirety, or any portion, of the videoconference call can also be stored, as a digital recording, in the user's or individual's digital asset account in the database 60H of the digital assets/records storage computer 60, in the database 20H of the user's or individual's user communication device 20, and/or in the database 11H of the central processing computer 11. In a preferred embodiment, as noted hereinafter, the recording or digital recording of the entirety, or any portion, of the videoconference call can also be stored, as a digital recording, in the distributed ledger/Blockchain technology system 12 of the central processing computer and distributed ledger and Blockchain technology system 10.

At step 1304, the user or individual and the consultant can engage in any discussions and/or activities during the videoconference call. In a preferred embodiment, at step 1304, and at any time during the videoconference call, the user or individual and/or the consultant, can take a screenshot picture or photograph, or any number of screenshots or photographs of the user or individual and the consultant, or of any information provided by the user or individual or provided by the consultant, during the videoconference call. In a preferred embodiment, at step 1304, or during the videoconference call, or at any time after the videoconference call, the user or individual or the consultant can affix or attach a digital signature to, or digitally sign, any screenshot picture or photograph, or any number of screenshot pictures or photographs, taken during the videoconference call.

In a preferred embodiment, the user or individual and/or the consultant can also, at step 1304, or during the videoconference call, or at any time after the videoconference call, can affix or attach a digital signature to, or digitally sign, the digitally recorded copy of the videoconference call (also referred to interchangeably as "digital videoconference call recording") at the conclusion of the videoconference call.

In a preferred embodiment, at step 1304, the audio conversation between to the consultant and the user or individual, during the videoconference call, can be recorded and translated into a written transcript. In another preferred embodiment, the written transcript can be translated into any desired language. At step 1304, the videoconference call can continue until its conclusion. Thereafter, the operation of the apparatus 100 will proceed to step 1305.

At step 1305, the central processing computer 11, or the consultant's user communication device 20, or the user's or individual's user communication device 20, can generate a videoconference call summary report. In a preferred embodiment, the videoconference call summary report can include information regarding the date and time of the videoconference call, the name of the user or individual, and the name of the consultant, who participated in the videoconference call, information regarding, and/or a link or hyperlink to, the digital videoconference call recording which was recorded and stored, information regarding, and/or a link or hyperlink to, any written transcript of the audio conversation during the videoconference call, any information regarding, and/or a link or hyperlink to, any screenshot picture(s) or photograph(s), taken during the videoconference call, and/or any other information regarding the videoconference call.

At step 1305, the videoconference call summary report can be transmitted and stored in or at any one or more of the central processing computer 11, the consultant's user communication device 20, and/or the user's or individual's user communication device 20. At step 1305, the videoconference call summary report, the digital videoconference call recording, any written transcript of the audio conversation during the videoconference call, any information regarding any screenshot picture(s) or photograph(s) taken during the videoconference call, and/or any other information, can be stored in the database 11H of the central processing computer 11, and in the distributed ledger/Blockchain technology system 12 of the central processing computer and distributed ledger and Blockchain technology system 10.

At step 1305, the videoconference call summary report, the digital videoconference call recording, any written transcript of the audio conversation during the videoconference call, any information regarding any screenshot picture(s) or photograph(s) taken during the videoconference call, and/or any other information, can be stored in the database 60H of the digital assets/records storage computer 60 and/or in the user's or individual's digital asset account. At step 1305, the videoconference call summary report, the digital videoconference call recording, any written transcript of the audio conversation during the videoconference call, any information regarding any screenshot picture(s) or photograph(s) taken during the videoconference call, and/or any other information, can also be stored in the database 20H of the consultant's user communication device 20 and in the database 20H of the user's or individual's user communication device. Thereafter, the operation of the apparatus 100 will cease at step 1306.

In another preferred embodiment of the embodiment of FIG. 13, the user or individual can, at any time, access the central processing computer 11, the distributed ledger/Blockchain technology system 12 of the central processing computer and distributed ledger and Blockchain technology system 10, and/or the digital assets/records storage computer 60, and can request access to, and can be provided, via his or her user communication device 20, with access to, any videoconference call summary report, any digital videoconference call recording, any written transcript of the audio conversation during the videoconference call, and/or any information regarding any screenshot picture(s) or photograph(s) taken during any videoconference call or video conference calls involving the user or individual. In another preferred embodiment, the user or individual can access the central processing computer 11 and can obtain, and can be provided with via his or her user communication device 20, a translation of any written transcript from one language to another. In another preferred, the user or individual can access the central processing computer 11 and can request, and can be provided with, a written transcript of any video conference call. In another preferred embodiment, any written transcript can also be digitally signed, with a digital signature of the user or individual or of the consultant who participated in the respective videoconference call, and such digital signature can be assigned a serial number or an authentication number.

As noted herein, the apparatus 100 of FIG. 13 can be utilized in a same, a similar, and/or an analogous, manner in connection with allowing a user or individual to engage in a video conference call, a video chat session, a telephone call, or a telephone conference call, with any independent contractor, freelancer, consultant, or counterparty, described herein or otherwise. The apparatus 100 of FIG. 13 can also be utilized by any user or individual to create, store, and/or collect, information as a digital asset of any type or kind.

In another preferred embodiment, the apparatus 100 of the present invention can be utilized in order to allow any of the herein-described users or individuals to schedule, and/or to participate in, videoconference calls, video chat sessions, telephone calls, or telephone conference calls, with athletes, active or retired, of any and/or all ages and/or of any and/or all types or kinds, with actors or actresses, active or retired, of any and/or all ages and/or of any and/or all types or kinds, with entertainers, active or retired, of any and/or all ages and/or of any and/or all types or kinds, with any other celebrities, active or retired, of any and/or all ages and/or of any and/or all types or kinds, or with any other notable individuals or groups of individuals of any and/or all ages and/or of any and/or all types or kinds. In a preferred embodiment, any of the athletes, actors, actresses, or entertainers, can be professional, amateur, college, high school or secondary school-aged, athletes, actors, actresses, entertainers, celebrities, and/or other notable people.

As and for an example, users or individuals can utilize the apparatus 100 in order to schedule, and to participate in, a video conference call, a video chat session, a telephone call, or a telephone conference call, with an athlete, with an actor or actress, or with a celebrity. In such a preferred embodiment, the respective athlete, actor or actress, entertainer, or celebrity, can utilize the apparatus 100 as an independent contractor or as a freelancer. In a preferred embodiment, the respective athlete, actor or actress, entertainer, or celebrity, can agree to participate in the video conference call, the video chat session, the telephone call, or the telephone conference call, in return for, or in exchange for, compensation, in return for, or in exchange for, a donation to a designated or undesignated charity, or for no compensation.

In a preferred embodiment, the user or individual and the respective athlete, actor or actress, entertainer, or celebrity, can engage in the video conference call, the video chat session, the telephone call, or the telephone conference call, for any scheduled or unscheduled amount of time. In a preferred embodiment, the video conference call, the video chat session, the telephone call, or the telephone conference call, can be recorded, and a digitally recorded copy of the video conference call, the video chat session, the telephone call, or the telephone conference call, between the user or individual and the respective athlete, actor or actress, entertainer, or celebrity, can be stored as a digital memorabilia asset or as digital memorabilia in a digital asset account or in digital memorabilia account of or associated with the user or individual.

In a preferred embodiment, in the case of a video conference call or video chat session, the user or individual and/or the respective athlete, actor or actress, entertainer, or celebrity, can also, at any time during the same, take a screenshot picture or photograph of the user or individual and the respective athlete, actor or actress, entertainer, or celebrity, and can affix, attach, or digitally sign, a digital autograph to or on the same. In a preferred embodiment, the digital autograph can be a digitized copy of any actual autograph of the respective athlete, actor or actress, entertainer, or celebrity, or any other recognized electronic, or other digital, signature. In a preferred embodiment, a digital autograph can also be affixed, attached, or digitally signed, to or on the digitally recorded copy of the video conference call, the video chat session, the telephone call, or the telephone conference call. The apparatus 100 can assign a serial number, or an authentication number, to the digitally recorded copy of the video conference call, the video chat session, the telephone call, or the telephone conference call, and/or to each screenshot picture or photograph of the user or individual and the respective athlete, actor or actress, entertainer, or celebrity, taken during the respective video conference call or video chat session, and can store the same, along with information regarding the same, in the distributed ledger/Blockchain technology system 12 of the central processing computer and distributed ledger and Blockchain technology system 10.

In this regard, the apparatus 100 of the present invention can also be utilized by any user or individual to create, store, and/or collect, digital memorabilia of any and/or all types or kinds. Further, the apparatus 100 of the present invention can also be utilized in order to facilitate and/or to provide athlete, actor or actress, entertainer, or celebrity, meetings, introductions, meet and greets, and/or personalized autograph sessions, with any of the herein-described users or individuals.

Figure 14:
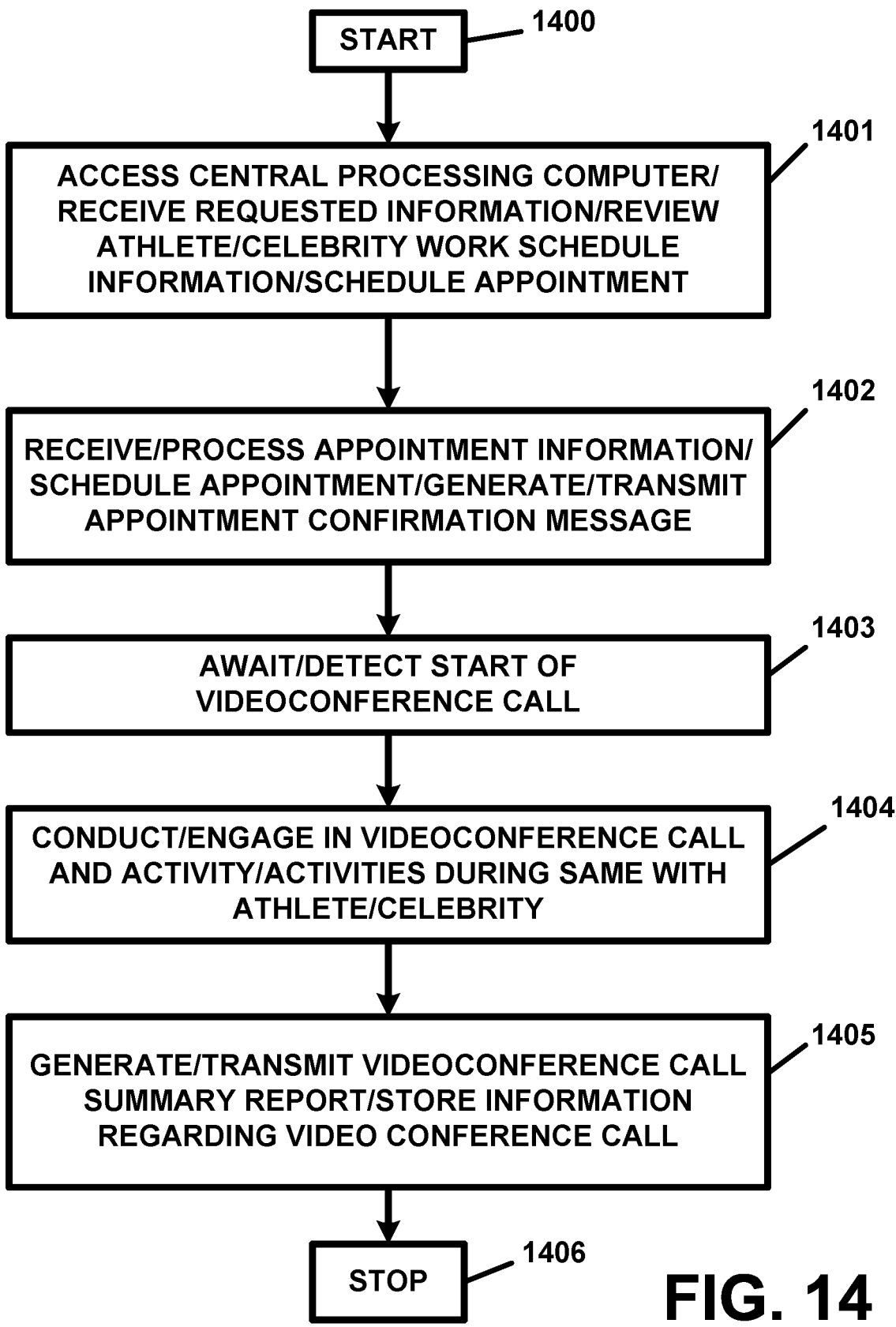
FIG. 14 illustrates another preferred embodiment method for utilizing the apparatus of the present invention, in flow diagram form.

FIG. 14 illustrates another preferred embodiment method for utilizing the apparatus 100 of the present invention, in flow diagram form. In the preferred embodiment of FIG. 14, the apparatus 100 is described herein as being utilized to facilitate and to record a scheduled videoconference call between a user or individual and an athlete. The athlete can be an active athlete or a retired athlete. Although described in a preferred embodiment as being utilized in connection a scheduled videoconference call between a user or individual and an athlete, it is important to note that the apparatus 100 of the embodiment of FIG. 14 can also be utilized in a same, a similar, and/or an analogous, manner in connection with any scheduled, or unscheduled, or arranged, or unarranged, or spur of the moment, video conference call, the video chat session, the telephone call, or the telephone conference call, between and with any user or individual and any athlete, actor or actress, entertainer, or celebrity.

With reference to FIG. 14, the operation of the apparatus 100 commences at step 1400. At step 1401, the user or individual can access the central processing computer 11 by using his or her user communication device 20. At step 1401, the user or individual can transmit, from his or her user communication device 20 to the central processing computer 11 component of the central processing computer and distributed ledger and Blockchain technology system 10, his or her request to access the user or member profile and/or the work schedule of or for the athlete with whom he or she desires to engage in a videoconference call. At step 1401, the central processing computer 11 can transmit the requested information regarding the athlete's user or member profile and/or the work schedule to the user communication device 20. Thereafter, at step 1401, the user or individual can review the athlete's work schedule and can transmit, to the central processing computer 11, information for scheduling a videoconference call with the athlete. In a preferred embodiment, the user or individual can schedule the videoconference call for any desired length of time. In a preferred embodiment, the athlete may require compensation or payment for the videoconference call, may require a monetary or non-monetary contribution or donation to a charity, or may opt to participate in the videoconference call without seeking any compensation or donation.

At step 1402, the central processing computer 11 can receive and process the information for scheduling the videoconference call with the athlete and can update the athlete's work schedule to include the scheduled videoconference call for the scheduled date and time. Thereafter, the central processing computer 11 can generate a videoconference call confirmation message which can contain and/or include information regarding the scheduled videoconference call, the date and the time(s) of the same, the scheduled time duration of the same, a link or hyperlink to, or information regarding, the user or member profile of, or other information regarding, the athlete, a link or hyperlink to, or other information regarding, the user or member profile of, or other information regarding, the user or individual, and/or a link, hyperlink, or uniform resource locator (url), or any other information, needed or desired for initiating and/or engaging in the scheduled videoconference call, and/or information regarding whom, the user or individual or the athlete, is to initiate the videoconference call at the scheduled time.

At step 1402, the central processing computer 11 can transmit the videoconference call confirmation message to the user communication device 20 of the user or individual and to the user communication device 20 of the athlete. In a preferred embodiment, the videoconference call confirmation message can be transmitted in or as, or as an attachment to, an electronic communication, and electronic transmission, an email message, a text message, or any other transmission or communication which can be transmitted from the central processing computer 11 to the respective user communication devices 20 of each of the user or individual and the athlete. In the case of an email message, the email message can be transmitted to an email server of or for each of the user or individual and the athlete and can, in a preferred embodiment, be transmitted to or otherwise received at each of the respective user communication devices 20 of each of the user or individual and the athlete. Thereafter, at step 1402, the athlete can, if he or she desires and before the videoconference call, review the user's or individual's user or member profile in order to become familiar with the user or individual.

At step 1403, the apparatus 100 will await the start of the videoconference call. In a preferred embodiment, the videoconference call can be initiated either by the user or individual or by the athlete. At step 1403, the apparatus 100 can detect the start of the videoconference call. Thereafter, the operation of the apparatus 100 will proceed to step 1404.

At step 1404, the user or individual and the athlete can engage in the video conference call, for the scheduled amount of time or for any amount of time permitted. In a preferred embodiment, the entirety, or any portion, of the videoconference call can be recorded or digitally recorded by the athlete's user communication device 20, by the user's or individual's user communication device 20, and/or by the central processing computer 11. In a preferred embodiment, the entirety, or any portion, of the videoconference call can be recorded or digitally recorded and stored, as a digital recording of the videoconference call, in the database 20H of the athlete's user communication device 20, in the database 20H of the user's or individuals user communication device 20, and/or in the database 11H of the central processing computer 11.

In a preferred embodiment, as noted hereinafter, the recording or digital recording of the entirety, or any portion, of the videoconference call can also be stored, as a digital recording, in the user's or individual's digital asset account and/or digital memorabilia account in the database 60H of the digital assets/records storage computer 60, in the database 20H of the user's or individual's user communication device 20, and/or in the database 11H of the central processing computer 11. In a preferred embodiment, as noted hereinafter, the recording or digital recording of the entirety, or any portion, of the videoconference call can also be stored, as a digital recording, in the distributed ledger/Blockchain technology system 12 of the central processing computer and distributed ledger and Blockchain technology system 10.

At step 1404, the user or individual and the athlete can engage in any discussions and/or activities during the videoconference call. In a preferred embodiment, at step 1404, and at any time during the videoconference call, the user or individual and/or the athlete, can take a screenshot picture or photograph, or any number of screenshots or photographs, of the user or individual and the athlete, or of any information provided by the user or individual or provided by the athlete, during the videoconference call. In a preferred embodiment, at step 1404, or during the videoconference call, or at any time after the videoconference call, the athlete can affix, attach, or digitally sign, a digital autograph, which can be a digitized copy of any actual autograph of the athlete, or any other recognized electronic, or other digital, signature of the athlete, to or on any screenshot picture or photograph, or any number of screenshot pictures or photographs, taken during the videoconference call.

In a preferred embodiment, the athlete can also, at step 1404, or during the videoconference call, or at any time after the videoconference call, affix, attach, or digitally sign, a digital autograph, which can be a digitized copy of any actual autograph of the athlete, or any other recognized electronic, or other digital, signature of the athlete, to or on the digitally recorded copy of the videoconference call (also referred to interchangeably as "digital videoconference call recording") at the conclusion of the videoconference call. In a preferred embodiment, each digital autograph provided by the athlete will be assigned an autograph serial number or an autograph authentication number. In a preferred embodiment, the digital videoconference call recording can be assigned a videoconference call serial number or a videoconference call authentication number. In a preferred embodiment, each screenshot picture or photograph can also be assigned a screenshot serial number or a screenshot authentication number.

In a preferred embodiment, at step 1404, the audio conversation between to the athlete and the user or individual, during the videoconference call, can be recorded and translated into a written transcript. In another preferred embodiment, the written transcript can be translated into any desired language. At step 1404, the videoconference call can continue until its conclusion. Thereafter, the operation of the apparatus 100 will proceed to step 1405.

At step 1405, the central processing computer 11, or the athlete's user communication device 20, or the user's or individual's user communication device 20, can generate a videoconference call summary report. In a preferred embodiment, the videoconference call summary report can include information regarding the date and time of the videoconference call, the name of the user or individual, and the name of the athlete, who participated in the videoconference call, information regarding, and/or a link or hyperlink to, the digital videoconference call recording which was recorded and stored, information regarding, and/or a link or hyperlink to, any written transcript of the audio conversation during the videoconference call, any information regarding, and/or a link or hyperlink to, any screenshot picture(s) or photograph(s), taken during the videoconference call, any information regarding any digital autographs provided by the athlete, and/or any other information regarding the videoconference call.

At step 1405, the videoconference call summary report can be transmitted and stored in or at any one or more of the central processing computer 11, the athlete's user communication device 20, and/or the user's or individual's user communication device 20. At step 1405, the videoconference call summary report, the digital videoconference call recording, any written transcript of the audio conversation during the videoconference call, any information regarding any screenshot picture(s) or photograph(s) taken during the videoconference call, any information regarding any digital autographs provided by the athlete, and/or any other information, can be stored in the database 11H of the central processing computer 11, and in the distributed ledger/Blockchain technology system 12 of the central processing computer and distributed ledger and Blockchain technology system 10.

At step 1405, the videoconference call summary report, the digital videoconference call recording, any written transcript of the audio conversation during the videoconference call, any information regarding any screenshot picture(s) or photograph(s) taken during the videoconference call, and/or any information regarding any digital autographs provided by the athlete, can be stored in the database 60H of the digital assets/records storage computer 60 and/or in the user's or individual's digital asset account and/or digital memorabilia account. At step 1405, the videoconference call summary report, the digital videoconference call recording, any written transcript of the audio conversation during the videoconference call, any information regarding any screenshot picture(s) or photograph(s) taken during the videoconference call, and/or any information regarding any digital autographs provided by the athlete, can also be stored in the database 20H of the athlete's user communication device 20 and in the database 20H of the user's or individual's user communication device. Thereafter, the operation of the apparatus 100 will cease at step 1406.

In a preferred embodiment, a digital asset account can be utilized to digitally store and/or to safeguard, assets of any type or kind for a user, individual, independent contractor, freelancer, employer, or hiring entity. In a preferred embodiment, the assets can be or can include, among other things, monetary assets, currency assets, cryptocurrency assets, non-monetary assets, and/or any other assets which can be used to effectuate payment for services rendered, or to be rendered, by any user, individual, independent contractor, freelancer, employer, or hiring entity, who or which utilizes the apparatus 100 of the present invention. In a preferred embodiment, any of the monetary assets, currency assets, cryptocurrency assets, non-monetary assets, and/or any other assets, can be used to effectuate a payment to a respective party, user, individual, independent contractor, freelancer, employer, or hiring entity, or to receive a payment from a respective party, user, individual, independent contractor, freelancer, employer, or hiring entity.

In a preferred embodiment, the assets can also include any of the herein described, memorabilia, digital memorabilia, souvenirs, digital souvenirs, video recordings, video and audio recordings, photographs, pictures, autographs, digital autographs, and/or any other items or things have a memorabilia, nostalgic, or sentimental, value to any user, individual, independent contractor, freelancer, employer, or hiring entity. In a preferred embodiment, any of the herein described, memorabilia, digital memorabilia, souvenirs, digital souvenirs, video recordings, video and audio recordings, photographs, pictures, autographs, digital autographs, and/or any other items or things that have or may have a memorabilia, nostalgic, or sentimental, value, can also be stored in a digital memorabilia account, a digital souvenir account, or any other digital account for storing things and/or items having nostalgic or sentimental value, each of which accounts can be a stand alone accounts or can be stored in, or can be stored as a component account of, or a sub-account of, a respective digital asset account of, for, or associated with, any user, individual, independent contractor, freelancer, employer, or hiring entity.

In a preferred embodiment, the database 60H can contain and/or include, for each digital asset account, and/or for each digital memorabilia account, a digital souvenir account, or any other digital account, held by, owned by, or associated with, a respective user, individual, independent contractor, freelancer, employer, or hiring entity, data and/or information regarding each asset held by the respective user, individual, independent contractor, freelancer, employer, or hiring entity, and for each asset, data and/or information regarding the name of the asset the date the asset was acquired, a description of asset, an assigned value for asset, and/or any other information regarding the asset. In a preferred embodiment, the digital asset account can also include information regarding currencies or cryptocurrencies which can be used by a respective user, individual, independent contractor, freelancer, employer, or hiring entity, to make a payment to another respective user, individual, independent contractor, freelancer, employer, or hiring entity. In another preferred embodiment, the digital asset account can also include information regarding currencies or cryptocurrencies which can represent, or can include, a payment or payments received by a respective user, individual, independent contractor, freelancer, employer, or hiring entity, from another respective user, individual, independent contractor, freelancer, employer, or hiring entity.

Any type of Blockchain technology can be utilized in connection with the present invention. For example, the present invention can utilize a distributed ledger(s) along with any Blockchain technology or technologies, Bitcoin Blockchain technology or technologies, Ethereum Blockchain technology or technologies, Bitcoin Cash Blockchain technology or technologies, Litecoin Blockchain technology or technologies, Privacy Coin Bitcoin technology or technologies, and/or any other suitable Blockchain technology or technologies, and/or Smart contracts and/or Smart contract technology or technologies and/or decentralized autonomous organizations (DAOs), decentralized autonomous organizations (DAOs) technology or technologies, and/or any combination of same.

The present invention can also be utilized with any suitable cryptocurrency, such as, but not limited to, Bitcoin, Bitcoin Cash, Ethereum, Ripple, Dash, Monero, Zcash, Digibyte, Litecoin, any privacy coins, and/or any other cryptocurrency and/or privacy coin cryptocurrency. In this regard, any of the embodiments described herein can be performed with or utilizing any currency or any cryptocurrency. Further, any of the accounts described herein, and any of the transactions on or which can involve any of the accounts described herein can also involve or utilize any currency or cryptocurrency.

Applicant incorporates by reference herein the subject matter and teachings of "Blockchain Technology Explained" by Alan T. Norman, "Blockchain" by Abraham K. White, "Blockchain-A Practical Guide To Developing Business, Law, And Technology Solutions" by Joseph J. Bambara and Paul R. Allen, and "Blockchain-Ultimate Guide To Understanding Blockchain, Bitcoin, Cryptocurrencies, Smart Contracts And The Future of Money" by Mark Gates, in their entirety, for all of their respective subject matter and teachings regarding distributed ledger technology and/or technologies, Blockchain technology and/or technologies, Bitcoin technology and/or technologies, Bitcoin Blockchain technology and/or technologies, Ethereum technology and/or technologies, Ethereum Blockchain technology and/or technologies, cryptocurrencies, cryptocurrency technology and/or technologies, and/or smart contract technology and/or technologies, and/or decentralized autonomous organizations (DAOs) technologies, and/or peer-to-peer technology and/or technologies, and/or any other technology or technologies related thereto or which can be utilized in conjunction distributed ledgers, Blockchain technologies, Smart contracts, decentralized autonomous organizations (DAOs), and/or cryptocurrencies.

In another preferred embodiment of the embodiment of FIG. 14, the user or individual can, at any time, access the central processing computer 11, the distributed ledger/Blockchain technology system 12 of the central processing computer and distributed ledger and Blockchain technology system 10, and/or the digital assets/records storage computer 60, and can request access to, and can be provided, via his or her user communication device 20, with access to, any videoconference call summary report, any digital videoconference call recording, any written transcript of the audio conversation during the videoconference call, and/or any information regarding and/or any screenshot picture(s) or photograph(s) taken during any videoconference call or video conference calls involving the user or individual. In another preferred embodiment, the user or individual can access the central processing computer 11 and can obtain, and can be provided with via his or her user communication device 20, a translation of any written transcript from one language to another. In another preferred, the user or individual can access the central processing computer 11 and can request, and can be provided with, a written transcript of any video conference call. In another preferred embodiment, any written transcript can also be digitally autographed by the athlete who participated in the videoconference call, and such digital autograph can be assigned an autograph serial number or an autograph authentication number.

As noted herein, the apparatus 100 of FIG. 14 can be utilized in a same, a similar, and/or an analogous, manner in connection with allowing a user or individual to engage in a video conference call, a video chat session, a telephone call, or a telephone conference call, with any athlete, actor or actress, entertainer, celebrity, or other notable person. The apparatus 100 of FIG. 14 can also be utilized by any user or individual to create, store, and/or collect, digital memorabilia of any and/or all types or kinds. The apparatus 100 of FIG. 14 can also be utilized in order to facilitate and/or to provide athlete, actor or actress, entertainer, or celebrity, meetings, introductions, meet and greets, and/or personalized autograph sessions, with any of the herein-described users or individuals.

In another preferred embodiment, any of the herein-described digital assets, digital autographs, digital memorabilia, or digital souvenirs, can be tracked, monitored, and/or authenticated, and/or safeguarded, by using the serial numbers and/or authentication numbers which have been assigned to the same.

In another preferred embodiment, any digital asset(s) or digital memorabilia described herein can be stored in, and/or can be accessed via, any number of digital asset accounts, digital memorabilia accounts, or digital souvenir accounts, of or associated with the user or individual. In a preferred embodiment, an RFID tag 90A, or any number of RFID tags 90A, can be assigned to each digital asset account, digital memorabilia account, or digital souvenir account, of the user or individual.

Each RFID tag 90A can be provided to the user or individual so that the user or individual can access any of his or her digital asset accounts, digital memorabilia accounts, or digital souvenir accounts, at any time and from or at any location, and/or via a kiosk or other public communication device or computer system. In such a preferred embodiment, the RFID tag 90A, which the user or individual possesses or can possess, can be read or scanned by an RFID reader system 90B located at, or associated with, a respective kiosk or other private or public communication device or computer system. The data and/or information read or scanned by the RFID reader system 90B can be transmitted to the central processing computer 11 which can process the same and can verify or authenticate the user or individual and/or the respective digital asset account, digital memorabilia account, or digital souvenir account.

Once the user or individual and/or the respective digital asset account, digital memorabilia account, or digital souvenir account, has been verified or authenticated, the user or individual can be provided with access to his or her digital asset account, digital memorabilia account, or digital souvenir account, which is stored in the digital assets/records storage computer 60. Thereafter, the user or individual can access and/or can view any digital asset, digital memorabilia, or digital souvenir, or any number of digital assets, digital memorabilia, or digital souvenirs, which is/are stored in the respective digital asset account, digital memorabilia account, or digital souvenir account, via the respective kiosk or other private or public communication device or computer system. In another preferred embodiment, an RFID tag 90A can also be affixed to, attached to, or associated with the user communication device 20 of or associated with the user or individual.

In another preferred embodiment, the educational/instructional records computer 70 can contain, in its database 70H, video recordings and/or audio recordings of lessons, classes, courses, seminars, educational materials, instructional materials, training materials, fitness materials, sports materials, athletic materials, or any other recordings or materials. In a preferred embodiment, any of the herein-described athletes, actors or actresses, entertainers, celebrities, or other notable persons, or any educational providers or any instructional providers, can produce, record, and/or can post, any of the herein-described video recordings and/or audio recordings of lessons, classes, courses, seminars, educational materials, instructional materials, training materials, fitness materials, sports materials, athletic materials, or any other recordings or materials (hereinafter referred to as "educational/instructional content"), with the educational/instructional records computer 70, which can be stored in the database 70H of same. In a preferred embodiment, any user or individual can access the educational/instructional records computer 70 at any time using his or her user communication device 20 and can request to receive any of the herein-described educational/instructional content. Thereafter, the educational/instructional records computer 70 can transmit the request educational/instructional content to the user's or individual's user communication device 20 and the same can be viewed via the display device 20E of the same.

In a preferred embodiment, as well as any and/or all of the embodiments described herein, the herein-described educational/instructional content can be used by any of the herein-described users, individuals, independent contractors, and/or freelancers, and/or by any of the herein-described employers or hiring entities, for any educational, training, re-training, certification, change of career, continuing training, and/or any other, purpose(s).

In any and/or all of the preferred embodiments, any user, individual, independent contractor, freelancer, employer, or hiring entity, can enroll in, and can participate in any distance learning activities offered by any of the operators of any of the herein-described educational providers and/or instructional providers. In a preferred embodiment, the above-referenced distance learning activities can be, or can include, classes, lessons, seminars, degree programs, certificate programs, and/or any other educational and/or instructional products, services, offerings, and/or activities.

In any and/or all of the preferred embodiments, any user, individual, independent contractor, freelancer, employer, or hiring entity, can also access the social networking computer 80 of a social network in or to which he or she belongs for any social networking, socializing, and/or information gathering, purpose or purposes.

In any and/or all of the embodiments described herein, any data and/or information received by, processed by, generated by, and/or transmitted from, the central processing computer(s) 11, any user communication device(s) 20, any employer communication device(s) 30, any counterparty communication device(s) 40, any media/content provider computer(s) 50, any digital assets/records storage computer(s) 60, any other educational/instructional provider computer(s) 70, and/or any social networking computer(s) 80, can be stored in the distributed ledger/Blockchain technology system 12 of the central processing computer and distributed ledger and Blockchain technology system 10 as well as in the database 11H of the central processing computer 11.

In any and/or all of the embodiments described herein, any data and/or information regarding, pertaining to, indicative of, or representative of, any action(s) taken by, or any activity or activities performed by, or engaged in by, any herein-described user, individual, independent contractor, freelancer, employer, or hiring entity, can be stored in the distributed ledger/Blockchain technology system 12 of the central processing computer and distributed ledger and Blockchain technology system 10 as well as in the database 11H of the central processing computer 11.

As provided herein, the apparatus 100 and methods of the present invention can provide a distributed ledger and blockchain technology-based recruitment, job searching and/or project searching, scheduling, and/or asset and/or consideration tracking, and/or monitoring, apparatus and method, which can be used in any number and/or variety of ways.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. An apparatus, comprising:
 a first user communication device, wherein the first user communication device is associated with an individual;
 a second user communication device, wherein the second user communication device is associated with a first employer or a first hiring entity or is associated with a second employer or a second hiring entity;

a central processing computer, wherein the central processing computer provides or transmits an electronic forum to the first user communication device; and
a distributed ledger and blockchain technology system,
wherein the central processing computer transmits the electronic forum to the first user communication device, wherein the electronic forum facilitates a first job searching activity, a first project searching activity, or a first assignment searching activity, and further wherein the electronic forum facilitates a submission of a first application for a first job, a first project, or a first assignment, with the first employer or the first hiring entity, and further wherein the electronic forum displays information regarding the first application for the first job, the first project, or the first assignment, wherein the information regarding the first application for the first job, the first project, or the first assignment, includes information regarding a date of application, a date of consideration, feedback from the first employer or the first hiring entity, a decision, or a date of a decision,
wherein the central processing computer receives a request to perform a job searching activity or a project searching activity for a second job, a second project, or a second assignment, wherein the request is transmitted from the first user communication device, and further wherein, in response to the request, the central processing computer generates a search report and transmits the search report to the first user communication device, wherein the search report is displayed at the first user communication device via the electronic forum, wherein the search report contains information regarding a second job, a second project, or a second assignment, with the second employer or the second hiring entity,
wherein the central processing computer facilitates a submission of a second application for the second job, the second project, or the second assignment, with the second employer or the second hiring entity,
wherein the central processing computer facilitates or provides a videoconference call between the first user communication device and the second user communication device, and further wherein the first user communication device, the second user communication device, or the central processing computer, records the videoconference call as a digital recording, and further wherein the apparatus translates an audio conversation between the individual and a second individual during the videoconference call into a written transcript, wherein the second individual is, or is associated with, the first employer or the first hiring entity or the second employer or the second hiring entity, wherein the central processing computer stores the digital recording and the written transcript,
wherein the central processing computer generates an electronic forum report containing information regarding an activity or activities of the individual in or during the electronic forum, and further wherein the electronic forum report is stored in the distributed ledger and blockchain technology system,
wherein the central processing computer generates a videoconference call summary message, wherein the videoconference call summary message includes information regarding a date and time of the videoconference call, information regarding the videoconference call, information regarding, or a link or a hyperlink to, the digital recording, and information regarding, or a link or a hyperlink to the written transcript, and further wherein the apparatus stores the videoconference call summary message in the central processing computer and in the distributed ledger and blockchain technology system,
and further wherein the first user communication device receives a status message transmitted from the second user communication device or from a third user communication device, wherein the third user communication device is associated with the first employer or the first hiring entity or is associated with the second employer or the second hiring entity, wherein the status message contains information indicating that the first application has been received, information indicating that the first application has been reviewed, information indicating that the first application has been referred for further consideration, information regarding a name or position of a person who has reviewed, is reviewing, or will be reviewing, the first application, or information regarding a decision to hire the individual for the first job, the first project, or the first assignment, or wherein the status message contains information indicating that the second application has been received, information indicating that the second application has been reviewed, information indicating that the second application has been referred for further consideration, information regarding a name or position of a person who has reviewed, is reviewing, or will be reviewing, the second application, or information regarding a decision to hire the individual for the second job, the second project, or the second assignment,
and further wherein the status message contains a link or a hyperlink to the electronic forum, and further wherein the central processing computer generates a job alert message or a project alert message, wherein the job alert message or the project alert message contains information regarding a third job, a third project, or a third assignment, and further wherein the job alert message or the project alert message contains a link or a hyperlink to the electronic forum,
and further wherein the central processing computer receives and processes information regarding a candidate search performed by the first employer or the first hiring entity, by the second employer or the second hiring entity, or by a third employer or a third hiring entity, wherein information regarding the candidate search is entered via the electronic forum, and further wherein the central processing computer generates a candidate search report, and further wherein the central processing computer transmits the candidate search report to the second user communication device, the third user communication device, or a fourth user communication device, wherein the fourth user communication device is associated with the third employer or the third hiring entity.

2. The apparatus of claim 1, wherein the apparatus processes information for performing a scheduling activity, and wherein the individual is a job applicant, an independent contractor, or a freelancer.

3. The apparatus of claim 1, wherein the job searching activity or the project searching activity is a job application submission activity or a resume submission activity, and wherein the individual is a job applicant, an independent contractor, or a freelancer.

4. The apparatus of claim 1, wherein the first user communication device includes a global positioning device, and further wherein the central processing computer utilizes information regarding a position or location of the first user communication device, as determined by the global positioning device, in processing a job search, a project search, or an assignment search.

5. The apparatus of claim 1, wherein the first user communication device includes a global positioning device, and further wherein the central processing computer utilizes information regarding a position or location of the first user communication device, as determined by the global positioning device, in processing a recruitment search.

6. The apparatus of claim 1, wherein the apparatus processes information for scheduling an appointment or the videoconference call for the individual, wherein the appointment is an appointment with the first employer or the first hiring entity or with the second employer or the second hiring entity.

7. The apparatus of claim 1, wherein the apparatus processes information for scheduling an appointment for the individual, wherein the appointment is an appointment with a consultant.

8. The apparatus of claim 1, wherein the apparatus processes information for scheduling an appointment for the individual, wherein the appointment is an appointment with an athlete, an actor or actress, an entertainer, or a celebrity.

9. The apparatus of claim 1, wherein the central processing computer generates an application confirmation message and transmits the application confirmation message to the first user communication device.

10. The apparatus of claim 1, wherein the information regarding the first application for the first job, the first project, or the first assignment, includes information regarding a date of consideration and feedback from the first employer or the first hiring entity.

11. The apparatus of claim 1, wherein the status message contains the information indicating that the first application has been received, the information indicating that the first application has been reviewed, and the information indicating that the first application has been referred for further consideration.

12. The apparatus of claim 1, wherein the status message contains the information regarding a name or position of a person who has reviewed, is reviewing, or will be reviewing, the first application.

13. The apparatus of claim 1, wherein the status message contains the information regarding a decision to hire the individual for the first job, the first project, or the first assignment.

14. The apparatus of claim 1, wherein the status message contains the information indicating that the second application has been received, the information indicating that the second application has been reviewed, and the information indicating that the second application has been referred for further consideration.

15. The apparatus of claim 1, wherein the status message contains the information regarding a name or position of a person who has reviewed, is reviewing, or will be reviewing, the second application.

16. The apparatus of claim 1, wherein the status message contains the information regarding a decision to hire the individual for the second job, the second project, or the second assignment.

17. The apparatus of claim 1, wherein the first user communication device or the second user communication device records a screenshot picture or a screenshot photograph of the individual and the second individual during the videoconference call.

18. The apparatus of claim 1, wherein the electronic forum is a web page.

19. An apparatus, comprising:
a first user communication device, wherein the first user communication device is associated with an individual;
a second user communication device, wherein the second user communication device is associated with a first employer or a first hiring entity or is associated with a second employer or a second hiring entity;
a central processing computer, wherein the central processing computer provides or transmits an electronic forum to the first user communication device; and
a distributed ledger and blockchain technology system,
wherein the central processing computer transmits the electronic forum to the first user communication device, wherein the electronic forum facilitates a first job searching activity, a first project searching activity, or a first assignment searching activity, and further wherein the electronic forum facilitates a submission of a first application for a first job, a first project, or a first assignment, with the first employer or the first hiring entity, and further wherein the electronic forum displays information regarding the first application for the first job, the first project, or the first assignment, wherein the information regarding the first application for the first job, the first project, or the first assignment, includes information regarding a date of application, a date of consideration, feedback from the first employer or the first hiring entity, a decision, or a date of a decision,
wherein the central processing computer receives a request to perform a job searching activity or a project searching activity for a second job, a second project, or a second assignment, wherein the request is transmitted from the first user communication device, and further wherein, in response to the request, the central processing computer generates a search report and transmits the search report to the first user communication device, wherein the search report is displayed at the first user communication device via the electronic forum, wherein the search report contains information regarding a second job, a second project, or a second assignment, with the second employer or the second hiring entity,
wherein the central processing computer facilitates a submission of a second application for the second job, the second project, or the second assignment, with the second employer or the second hiring entity,
wherein the central processing computer facilitates or provides a videoconference call between the first user communication device and the second user communication device, and further wherein the first user communication device, the second user communication device, or the central processing computer, records the videoconference call as a digital recording, and further wherein the apparatus translates an audio conversation between the individual and a second individual during the videoconference call into a written transcript, wherein the second individual is, or is associated with, the first employer or the first hiring entity or the second employer or the second hiring entity, wherein the central processing computer stores the digital recording and the written transcript,
wherein the central processing computer generates an electronic forum report containing information regarding an activity or activities of the individual in or during the electronic forum, and further wherein the electronic forum report is stored in the distributed ledger and blockchain technology system, wherein the central processing computer generates a videoconference call summary message, wherein the videoconference call summary message includes information regarding a date and time of the videoconference call, information regarding the videoconference call, information regarding, or a link or a hyperlink to, the digital recording, and information regarding, or a link or a hyperlink to the written transcript, and further wherein the apparatus stores the videoconference call summary message in the central processing computer and in the distributed ledger and blockchain technology system, and further wherein the first user communication device receives a status message transmitted from the second user communication device or from a third user communication device, wherein the third user communication device is associated with the first employer or the first hiring entity or is associated with the second employer or the second hiring entity, wherein the status message contains information indicating that the first application has been received, information indicating that the first application has been reviewed, information indicating that the first application has been referred for further consideration, information regarding a name or position of a person who has reviewed, is reviewing, or will be reviewing, the first application, or information regarding a decision to hire the individual for the first job, the first project, or the first assignment, or wherein the status message contains information indicating that the second application has been received, information indicating that the second application has been reviewed, information indicating that the second application has been referred for further consideration, information regarding a name or position of a person who has reviewed, is reviewing, or will be reviewing, the second application, or information regarding a decision to hire the individual for the second job, the second project, or the second assignment, and further wherein the apparatus further comprises:

a fourth user communication device, wherein the fourth user communication device is associated with a third individual, wherein the third individual is an athlete, an actor or an actress, an entertainer, or a celebrity, wherein the central processing computer facilitates or provides a second videoconference call between the first user communication device and the fourth user communication device, and further wherein the first user communication device, the fourth user communication device, or the central processing computer, records the second videoconference call as a digital recording, and further wherein the apparatus translates an audio conversation between the individual and the third individual during the second videoconference call into a written transcript, wherein the central processing computer stores the digital recording and the written transcript, wherein the first user communication device or the fourth user communication device records a screenshot picture or a screenshot photograph of the individual and the third individual during the second videoconference call, and further wherein the fourth user communication device processes information for affixing or attaching a digital autograph of the third individual to or on the digital recording of the second videoconference call, or to or on the screenshot picture or the screenshot photograph, and further wherein the digital recording of the second videoconference call, the written transcript, or the screenshot picture or the screenshot photograph, is stored in a digital asset account or a digital memorabilia account of or associated with the individual, and further wherein the central processing computer or the fourth user communication device processes information for assigning a serial number or an authentication number to the digital recording of the second videoconference call or to the screenshot picture or to the screenshot photograph, and further wherein the central processing computer generates a second videoconference call summary message, wherein the second video conference call summary message includes information regarding a date and time of the second videoconference call, information regarding the second videoconference call, information regarding, or a link or a hyperlink to, the digital recording, and information regarding, or a link or a hyperlink to the written transcript, wherein the apparatus stores the video call summary message in the central processing computer or in the distributed ledger and blockchain technology system, and further wherein the apparatus stores information regarding the digital autograph in the central processing computer and in the distributed ledger and blockchain technology system.

20. The apparatus of claim 19, wherein the apparatus stores the digital recording of the second videoconference call and the digital autograph in a digital memorabilia account.

21. A computer-implemented method, comprising:

transmitting, from a central processing computer, an electronic forum to a first user communication device, wherein the first user communication device is associated with an individual, and further wherein the electronic forum facilitates a first job searching activity, a first project searching activity, or a first assignment searching activity, and further wherein the electronic forum facilitates a submission of a first application for a first job, a first project, or a first assignment, with a first employer or a first hiring entity;

displaying, in or via the electronic forum, information regarding the first application for the first job, the first project, or the first assignment, wherein the information regarding the first application for the first job, the first project, or the first assignment, includes information regarding a date of application, a date of consideration, feedback from the first employer or the first hiring entity, a decision, or a date of a decision;

receiving, with the central processing computer, a request to perform a job searching activity or a project searching activity for a second job, a second project, or a second assignment, wherein the request is transmitted from the first user communication device;

generating, with the central processing computer, a search report in response to the request;

transmitting, from the central processing computer, the search report to the first user communication device for display at the first user communication device via the electronic forum, wherein the search report contains information regarding a second job, a second project, or a second assignment, with the second employer or the second hiring entity;

facilitating, with or using the central processing computer, a submission of a second application for the second job, the second project, or the second assignment, with the second employer or the second hiring entity, providing, with or using the central processing computer, a videoconference call between the first user communication device and a second user communication device, wherein the second user communication device is associated with a first employer or a first hiring entity or is associated with a second employer or a second hiring entity;

recording, with or using the central processing computer, the videoconference call as a digital recording;

translating, with or using the central processing computer, an audio conversation between the individual and a second individual during the videoconference call into a written transcript, wherein the second individual is, or is associated with, the first employer or the first hiring entity or the second employer or the second hiring entity;

storing, with or using the central processing computer, the digital recording and the written transcript;

generating, with or using the central processing computer, an electronic forum report containing information regarding an activity or activities of the individual in or during the electronic forum;

storing the electronic forum report in a distributed ledger and blockchain technology system;

generating, with or using the central processing computer, a videoconference call summary message, wherein the videoconference call summary message includes information regarding a date and time of the videoconference call, information regarding the videoconference call, information regarding, or a link or a hyperlink to, the digital recording, and information regarding, or a link or a hyperlink to the written transcript;

storing the videoconference call summary message in the central processing computer and in the distributed ledger and blockchain technology system;

receiving, with or using the first user communication device, a status message transmitted from the second user communication device or from a third user communication device, wherein the third user communication device is associated with the first employer or the first hiring entity or is associated with the second employer or the second hiring entity, and further wherein the status message contains information indicating that the first application has been received, information indicating that the first application has been reviewed, information indicating that the first application has been referred for further consideration, information regarding a name or position of a person who has reviewed, is reviewing, or will be reviewing, the first application, or information regarding a decision to hire the individual for the first job, the first project, or the first assignment, or wherein the status message contains information indicating that the second application has been received, information indicating that the second application has been reviewed, information indicating that the second application has been referred for further consideration, information regarding a name or position of a person who has reviewed, is reviewing, or will be reviewing, the second application, or information regarding a decision to hire the individual for the second job, the second project, or the second assignment, and further wherein the status message contains a link or a hyperlink to the electronic forum;

generating, with or using the central processing computer, a job alert message or a project alert message, wherein the job alert message or the project alert message contains information regarding a third job, a third project, or a third assignment, and further wherein the job alert message or the project alert message contains a link or a hyperlink to the electronic forum;

receiving and processing, with or using the central processing computer, information regarding a candidate search performed by the first employer or the first hiring entity, by the second employer or the second hiring entity, or by a third employer or a third hiring entity, wherein information regarding the candidate search is entered via the electronic forum;

generating, with or using the central processing computer, a candidate search report; and transmitting, from the central processing computer, the candidate search report to the second user communication device, the third user communication device, or a fourth user communication device, wherein the fourth user communication device is associated with the third employer or the third hiring entity.

22. The computer-implemented method of claim 21, further comprising:

processing information for performing a scheduling activity, or processing information for scheduling an appointment for the individual or for scheduling the videoconference call for the individual.

23. The computer-implemented method of claim 21, further comprising:

processing, with or using the central processing computer, a job search, a project search, or an assignment search, utilizing information regarding a position or location of the first user communication device, or processing, with or using the central processing computer, a recruitment search, utilizing information regarding a position or location of the first user communication device.

24. The computer-implemented method of claim 21, further comprising:

generating, with or using the central processing computer, an application confirmation message;

transmitting the application confirmation message to the first user communication device.

25. The computer-implemented method of claim 21, wherein the status message contains the information indicating that the first application has been received, the information indicating that the first application has been reviewed, and the information indicating that the first application has been referred for further consideration, or wherein the status message contains the information regarding a name or position of a person who has reviewed, is reviewing, or will be reviewing, the first application, or wherein the status message contains the information regarding a decision to hire the individual for the first job, the first project, or the first assignment, or wherein the status message contains the information indicating that the second application has been received, the information indicating that the second application has been reviewed, and the information indicating that the second application has been referred for further consideration, or wherein the status message contains the information regarding a name or position of a person who has reviewed, is reviewing, or will be reviewing, the second application, or wherein the status message contains the information regarding a decision to hire the individual for the second job, the second project, or the second assignment.

* * * * *